US010928888B2

(12) United States Patent
Harvey et al.

(10) Patent No.: US 10,928,888 B2
(45) Date of Patent: Feb. 23, 2021

(54) SYSTEMS AND METHODS FOR CONFIGURING A HUB-CENTRIC VIRTUAL/AUGMENTED REALITY ENVIRONMENT

(71) Applicant: Logitech Europe S.A., Lausanne (CH)

(72) Inventors: Stephen Harvey, County Cork (IE); Denis O'Keeffe, Cork (IE); Andreas Connellan, Dublin (IE); Damien O'Sullivan, Cork (IE); Aidan Kehoe, Morges (CH); Noirin Curran, Dublin (IE); Thomas Rouvinez, Lausanne (CH); Mario Gutierrez, Lausanne (CH); Olivier Riviere, Lausanne (CH); Remy Zimmermann, Lausanne (CH); Mathieu Meisser, Lausanne (CH); Dennin Onorio, Lausanne (CH); Ciaran Trotman, Lausanne (CH); Pierce O'Bradaigh, Lausanne (CH); Marcel Twohig, Dublin (IE); Padraig Murphy, County Monogham (IE); Jerry Ahern, Ballincollig Cork (IE)

(73) Assignee: Logitech Europe S.A., Lausanne (CH)

(*) Notice: Subject to any disclaimer, the term of this patent is extended or adjusted under 35 U.S.C. 154(b) by 0 days.

(21) Appl. No.: 15/890,157

(22) Filed: Feb. 6, 2018

(65) Prior Publication Data

US 2018/0173323 A1 Jun. 21, 2018

Related U.S. Application Data

(63) Continuation of application No. PCT/US2017/064080, filed on Nov. 30, 2017, which
(Continued)

(51) Int. Cl.
*G06F 3/01* (2006.01)
*G06F 3/038* (2013.01)
(Continued)

(52) U.S. Cl.
CPC .............. *G06F 3/011* (2013.01); *G06F 3/014* (2013.01); *G06F 3/017* (2013.01); *G06F 3/038* (2013.01);
(Continued)

(58) Field of Classification Search
CPC ...... G06F 3/011; G06F 3/017; G06F 3/04815; G02B 2027/014
See application file for complete search history.

(56) References Cited

U.S. PATENT DOCUMENTS

| 8,830,225 B1* | 9/2014 | Karakotsios | G06T 3/60 |
| | | | 345/419 |
| 2010/0113157 A1* | 5/2010 | Chin | A63F 13/12 |
| | | | 463/42 |

(Continued)

FOREIGN PATENT DOCUMENTS

| WO | 2012/088285 A2 | 6/2012 |
| WO | 2016/041088 A1 | 3/2016 |

OTHER PUBLICATIONS

EP17876363.7, "Extended European Search Report", dated Jul. 3, 2020, 9 pages.
(Continued)

*Primary Examiner* — Laurence J Lee
(74) *Attorney, Agent, or Firm* — Kilpatrick Townsend & Stockton LLP

(57) ABSTRACT

In certain embodiments, a sensing and tracking system detects objects, such as user input devices or peripherals, and user interactions with them. A representation of the objects and user interactions are then injected into the virtual
(Continued)

reality environment. The representation can be an actual reality, augmented reality, virtual representation or any combination. For example, an actual keyboard can be injected, but with the keys pressed being enlarged and lighted.

10 Claims, 21 Drawing Sheets

Related U.S. Application Data is a continuation of application No. PCT/US2017/061649, filed on Nov. 14, 2017.

(60) Provisional application No. 62/428,339, filed on Nov. 30, 2016, provisional application No. 62/428,276, filed on Nov. 30, 2016, provisional application No. 62/428,248, filed on Nov. 30, 2016, provisional application No. 62/428,488, filed on Nov. 30, 2016, provisional application No. 62/428,241, filed on Nov. 30, 2016, provisional application No. 62/428,253, filed on Nov. 30, 2016, provisional application No. 62/421,910, filed on Nov. 14, 2016.

(51) Int. Cl.
*G06T 19/00* (2011.01)
*G06F 3/042* (2006.01)

(52) U.S. Cl.
CPC .......... *G06F 3/0426* (2013.01); *G06T 19/006* (2013.01); *G06F 3/016* (2013.01)

(56) References Cited

U.S. PATENT DOCUMENTS

| | | | |
|---|---|---|---|
| 2013/0113762 A1 | 5/2013 | Geaghan | |
| 2014/0009384 A1* | 1/2014 | Valik | G06F 3/0304 345/156 |
| 2014/0306866 A1 | 10/2014 | Miller et al. | |
| 2016/0054791 A1 | 2/2016 | Mullins et al. | |
| 2017/0358139 A1* | 12/2017 | Balan | G02B 27/0172 |

OTHER PUBLICATIONS

EP17868922.0, "Extended European Search Report", dated Sep. 2, 2020, 12 pages.

* cited by examiner

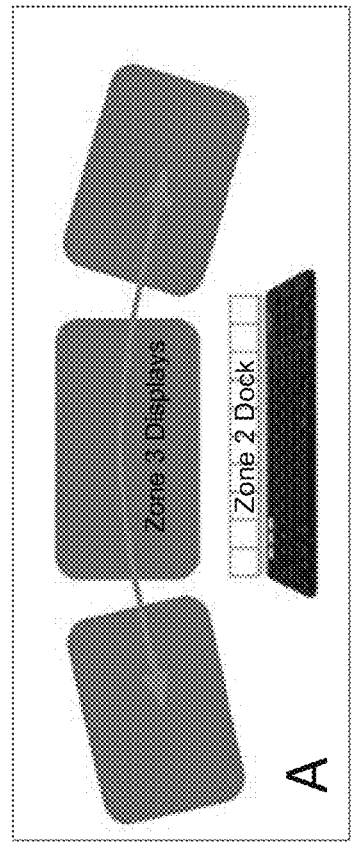
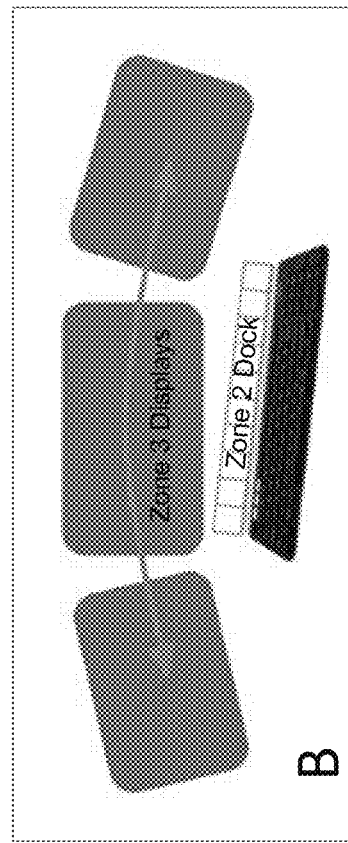
FIXED AND "STICKY" ZONES
FIG. 20
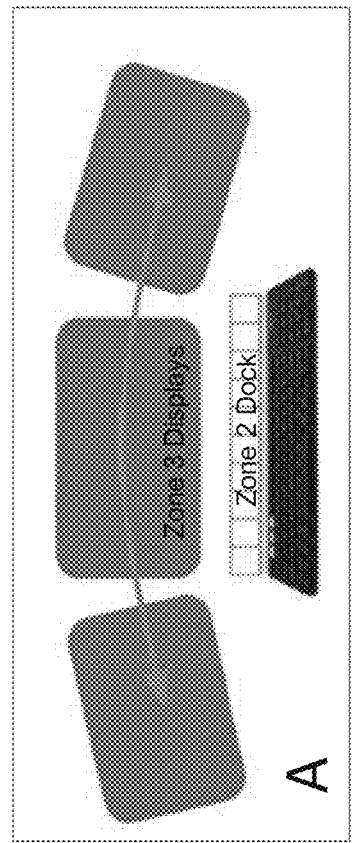
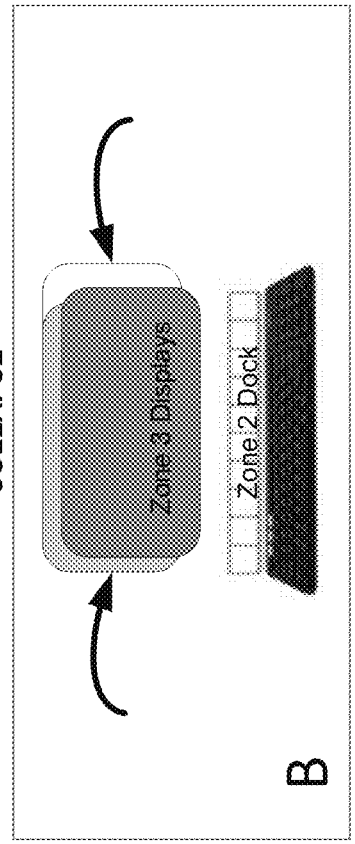
FIG. 21

SYSTEMS AND METHODS FOR CONFIGURING A HUB-CENTRIC VIRTUAL/AUGMENTED REALITY ENVIRONMENT

CROSS-REFERENCES TO RELATED APPLICATIONS

This application is a bypass continuation of PCT Application No. PCT/US2017/061649 entitled "A SYSTEM FOR IMPORTING OBJECTS AS INPUT DEVICES INTO VIRTUAL/AUGMENTED REALITY" filed Nov. 14, 2017, which is a non-provisional and claims the benefit of priority of U.S. Provisional Application No. 62/421,910, entitled, "A SYSTEM FOR IMPORTING OBJECTS AS INPUT DEVICES INTO VIRTUAL/AUGMENTED REALITY," filed on Nov. 14, 2016 and a bypass continuation of PCT Application No. PCT/US2017/064080 entitled "A SYSTEM FOR IMPORTING USER INTERFACE DEVICES INTO VIRTUAL/AUGMENTED REALITY" filed Nov. 30, 2017, which is a non-provisional of and claims the benefit of priority of U.S. Provisional Application No. 62/428,276, entitled, "A SYSTEM FOR IMPORTING USER INTERFACE DEVICES INTO VIRTUAL/AUGMENTED REALITY," filed on Nov. 30, 2016, U.S. Provisional Application No. 62/428,241, entitled, "AUGMENTED/MIXED REALITY PERIPHERAL DISCOVERY AND USAGE SYSTEM," filed on Nov. 30, 2016, U.S. Provisional Application No. 62/428,248, entitled, "SYSTEM FOR OBJECT CONTROL AND MANIPULATION IN VIRTUAL REALITY," filed on Nov. 30, 2016, U.S. Provisional Application No. 62/428,253, entitled, "SYSTEM FOR NATURAL HAND INTERACTION WITH VIRTUAL OBJECTS," filed on Nov. 30, 2016, U.S. Provisional Application No. 62/428,488, entitled, "TRACKING SYSTEM FOR REAL OBJECTS IN VIRTUAL REALITY," filed on Nov. 30, 2016, and U.S. Provisional Application No. 62/428,339, entitled, "BLIND TEXT AND CONTROL INPUT SYSTEM FOR VIRTUAL REALITY," filed on Nov. 30, 2016. The disclosures of these applications are hereby incorporated by reference in their entirety for all purposes.

TECHNICAL FIELD

The present disclosure relates generally to virtual reality systems and in particular to providing user input devices and other peripherals in a virtual reality environment.

BACKGROUND

Virtual, mixed, or augmented reality can be associated with a variety of applications that comprise immersive, highly visual, computer-simulated environments. These environments can simulate a physical presence of a user in a real or imagined world. The computer simulation of these environments can include computer rendered images, which can be presented by means of a graphical display. The display can be arranged as a head mounted display (HMD) that may encompass all or part of a user's field of view.

A user can interface with the computer-simulated environment by means of a user interface device or peripheral device, examples of which include a keyboard, game controller, joystick, mouse, stylus, speaker, and steering wheel. When immersed in the computer-simulated environment, the user may perform complex operations associated with the interface device, including actuation of one or more keys or other input elements of the interface device. However, there is need for improvement when operating within virtualized environments using physical interface devices, especially when performing productivity-based tasks.

SUMMARY

In some embodiments, a hub device for interfacing physical peripheral devices for a virtual environment can include a transceiver configured to communicate with a display system for presenting a virtual reality or augmented reality virtual reality environment to a user; a tracking subsystem configured to sense a location of a physical peripheral input device within a physical environment; and one or more processors coupled to the transceiver and the tracking subsystem, the one or more processors configured to: determine, via the tracking subsystem, the location of the physical peripheral input device within the physical environment; and transmit, via the transceiver, to the display system, the location of the physical peripheral input device within the physical environment. The one or more processors can be configured to: determine, via the tracking subsystem, the location of the physical peripheral input device in relation to the device; transform the location of the physical peripheral input device from a coordinate system used by the device to a coordinate system used by the display system; and transmit, via the transceiver, to the display system, the location of the physical peripheral input device using the coordinate system of the display system. In certain embodiments, the display system is a head-mounted display (HMD).

In certain embodiments, a hub device for determining a virtual workstation for use with a virtual environment can include a transceiver configured to communicate with a display system for presenting a virtual reality or augmented reality virtual reality environment to a user; one or more sensors configured to detect aspects of a physical environment in proximity to the device; and one or more processors configured to: determine, via the one or more sensors, the aspects of the physical environment in proximity to the device; based on determining the aspects of the physical environment, defining one or more zones for the user to interact with a physical peripheral input device and a virtual display provided by the display system; and transmit, via the transceiver, to the display system, information indicative of the one or more zones. The one or more zones can include a first zone that defines an area characterized in that a physical peripheral input device placed within the first zone is used by a user to interact with one or more virtual displays rendered by the display system. In some cases, the one or more zones can include a second zone characterized in that a virtual display can be perceived by the user as being located within the second zone and interaction with a physical peripheral device within the first zone can modify content observable by the user rendered on the virtual display within the second zone. In certain implementations, the one or more zones can include a third zone characterized in that content displayed within the third zone is viewable by a plurality of users interacting within an augmented reality or virtual reality virtual reality environment; and where content displayed within the second zone is viewable by only one user of the plurality of users. The display system may be a head-mounted display (HMD) or other suitable visual interface.

In some embodiments, a method of operating a hub to interact with one or more peripheral devices within an AR/VR workstation environment includes detecting a first physical peripheral device within a physical environment; determining a location of the first physical peripheral device within the physical environment; establishing a communicative coupling with, and receiving data from, the first physical peripheral device and an AR/VR-based display; facilitating a transfer of received data between the first physical peripheral device and the AR/VR-based display; determining an area to orient a virtual display relative to the first physical peripheral device within the physical environment based on the determined location of the first physical peripheral device; and generating control data configured to cause the AR/VR-based display to project the virtual display in the determined area. In some cases, the control data can be further configured to cause the AR/VR-based display to maintain a spatial relationship between the first physical peripheral device and the projected virtual display as the first physical peripheral device is moved within the physical environment. The method can further include receiving polling data from one or more sensors, the polling data corresponding to physical characteristics of a physical environment around the first physical peripheral device, where determining the area to orient the virtual display is further based on the physical characteristics of the physical environment. In some cases, a movement and location of a head-mounted display (HMD) of the AR/VR-based display and the hub can be tracked using a first tracking system, and the determining a location of the first physical peripheral device within the physical environment can be tracked via the hub using a second tracking system, the method further comprising: providing data corresponding to the determined location of the first physical peripheral device within the physical environment to the HMD, the provided data configured to cause an integration of tracking via the second tracking system with tracking via the first tracking system.

In certain embodiments, the method can further include detecting a second physical peripheral device within the physical environment; determining a location of the second physical peripheral device within the physical environment; establishing a communicative coupling with, and receiving data from the second physical peripheral device; and coalescing the received data from the first and second physical peripheral devices into aggregate peripheral data, where the aggregate peripheral data is transferred to the AR/VR-based display via the hub instead of the received data from each of the first and second physical peripheral devices. The display system may be a head-mounted display (HMD) or other suitable interface.

In further embodiments, a system includes one or more processors and one or more non-transitory computer-readable storage mediums containing instructions configured to cause the one or more processors to perform operations including: detecting a first physical peripheral device within a physical environment; determining a location of the first physical peripheral device within the physical environment; establishing a communicative coupling with, and receiving data from, the first physical peripheral device and an AR/VR-based display; facilitating a transfer of received data between the first physical peripheral device and the AR/VR-based display; determining an area to orient a virtual display relative to the first physical peripheral device within the physical environment based on the determined location of the first physical peripheral device; and generating control data configured to cause the AR/VR-based display to project the virtual display in the determined area. In some cases, the control data can be further configured to cause the AR/VR-based display to maintain a spatial relationship between the first physical peripheral device and the projected virtual display as the first physical peripheral device is moved within the physical environment. In certain implementations, the one or more non-transitory computer-readable storage mediums can further contain instructions configured to cause the one or more processors to perform operations including: receiving polling data from one or more sensors, the polling data corresponding to physical characteristics of a physical environment around the first physical peripheral device, where determining the area to orient the virtual display is further based on the physical characteristics of the physical environment.

In some embodiments, with respect to the system described above, a movement and location of a head-mounted display (HMD) of the AR/VR-based display and the hub can be tracked using a first tracking system, where the determining a location of the first physical peripheral device within the physical environment can be tracked via the hub using a second tracking system, and where the one or more non-transitory computer-readable storage mediums can further contain instructions configured to cause the one or more processors to perform operations including: providing data corresponding to the determined location of the first physical peripheral device within the physical environment to the HMD, the provided data configured to cause an integration of tracking via the second tracking system with tracking via the first tracking system. The one or more non-transitory computer-readable storage mediums may further contain instructions configured to cause the one or more processors to perform operations including: detecting a second physical peripheral device within the physical environment; determining a location of the second physical peripheral device within the physical environment; establishing a communicative coupling with, and receiving data from the second physical peripheral device; and coalescing the received data from the first and second physical peripheral devices into aggregate peripheral data, where the aggregate peripheral data is transferred to the AR/VR-based display via the hub instead of the received data from each of the first and second physical peripheral devices. The first and second physical peripheral devices may include at least one of a keyboard, computer mouse, stylus, AR/VR controller, remote, or presenter device.

In certain embodiments, a method of operating a virtual workstation can include determining a location of a physical peripheral input device within a physical environment and determining, based on the location of the physical peripheral input device within the physical environment, an orientation of a first virtual display to render to a user of the physical peripheral device, where content presented to the user via the rendered first virtual display can be modifiable in response to the user operating the physical peripheral input device. In some cases, the determined orientation of the first virtual display to render can be configured to remain at a fixed, perceived spatial relationship with respect to the physical peripheral input device as the physical peripheral input device moves within the physical environment. In certain embodiments, the determined orientation of the first virtual display to render can be configured to remain at a fixed, perceived spatial relationship with respect to the physical peripheral input device as the physical peripheral input device moves within the physical environment in response to a movement of the physical input device from an initial location that is greater than a threshold distance, and the determined orientation of the first virtual display to render can be configured to remain in place in response to a movement of the physical input device from the initial location that is less than the threshold distance.

In some embodiments, the method may further include determining, based on the location of the physical peripheral input device within the physical environment, an orientation of an interactive virtual display to render to the user of the physical peripheral device, where content presented to the user via the rendered interactive virtual display can be selectable by the user to modify an operation corresponding to use of the physical peripheral input device by the user, and where the interactive virtual display can be rendered to appear to the user to be in proximity to the physical peripheral device. The operation corresponding to use of the physical peripheral input device by the user may include changing a command corresponding to actuation of an input element of the physical peripheral input device, changing an appearance of the physical peripheral input device, an appearance of an input element of the physical peripheral input device, and/or changing a relationship between one or more rendered virtual displays and the physical peripheral input device.

In further embodiments, the relationship between the one or more rendered virtual displays and the physical peripheral input device may include selecting which of the one or more rendered virtual displays include content that is modifiable in response to the user operating the physical peripheral input device, selecting which of the one or more rendered virtual displays are anchored in position with respect to the physical peripheral input device, and/or selecting how one of the one or more rendered virtual displays are anchored in position with respect to the physical peripheral input device including: a threshold distance that the physical peripheral input device can be moved before the one of the one or more rendered virtual displays moves in response to the physical peripheral input device being moved; or whether the one or more rendered virtual displays move in response to the physical peripheral input device being moved. In some cases, the orientation of the interactive virtual display can be rendered to appear to the user to be at a location that is integrated on or within a periphery of the physical peripheral input device, or the interactive virtual display can be rendered to appear to the user to be located on an area of the physical peripheral input device including features that supplement functionality provided by the interactive virtual display.

In some embodiments, the features may include haptic feedback generated by a haptic feedback generator integrated within the physical peripheral input device to provide haptic feedback in response to user interaction with the interactive virtual display. The features can include a physical input element and where the content of the interactive virtual display is rendered to appear to the user to be selectable by the user by actuation of the physical input element. The interactive virtual display can be rendered to appear to the user to be located in an area in proximity to the physical peripheral input device. The content can be determined to be selected by the user, without physically contacting the physical peripheral input device, by a sensor of the physical peripheral input device. The method may further include determining a location of a second physical peripheral input device within the physical environment and determining, based on the location of the second physical peripheral input device within the physical environment, an orientation of a second interactive virtual display to render to a user of the second physical peripheral device. In such cases, the content presented to the user via the rendered display can be selectable by the user of the second physical peripheral input device to modify an operation to use of the second physical peripheral input device by the user of the second physical peripheral input device, and the second interactive virtual display can be rendered to appear to the user of the second physical peripheral input device to be in proximity to the second physical peripheral input device. In certain embodiments, the interactive virtual display can be rendered to appear to the user to be at a spatial location determined, at least in part, based on a biomechanical model of the user to enable the user to reach the interactive display with an appendage.

In further embodiments, the method may include generating control data to cause a head-mounted display device to render the first virtual display. The physical peripheral input device can be a computer keyboard, mini-tower, or other peripheral that is preferably stationary during use. The orientation of the first virtual display may be determined further based on physical characteristics of an environment that the physical peripheral input device is located within. The physical characteristics may include barriers that would block a line of sight of the user, and may be determined, in part, by a sensor of the physical peripheral input device. In some cases, the first virtual display can be rendered in response to actuation of a physical input element of the physical peripheral input device, in response to a determined proximity of the user to the physical peripheral input device, or in response to the physical peripheral input device being placed upon a working surface. Determination of the physical peripheral input device being placed upon the working surface may be based on a reading of a sensor attached to the physical peripheral input device.

In certain embodiments, the first virtual display can be rendered at a first orientation such that the first virtual display appears to the user to be at a first spatial orientation with respect to the physical peripheral input device in response to a determination that the physical peripheral input device is in a first state indicative of the user operating the physical peripheral device and the first virtual display may not be rendered at the first orientation in response to a determination that the physical peripheral input device is not in the first state. In some cases, the first virtual display can be rendered at a second orientation such that the first virtual display appears to the user to be at a second spatial orientation with respect to the physical peripheral input device in response to a determination that the physical peripheral input device is not in the first state. The first virtual display may be automatically rendered at the first orientation in response to a determination that the physical peripheral input device is in the first state. The physical peripheral input device may include features for determining the location of the physical peripheral input device within the physical environment by a tracking system and the tracking system can be used to determine an orientation of a physical display used to render the first virtual display. In some embodiments, the features can be selected from a list including a sensor, an emitter, and a marking. The sensor can be configured to detect or the emitter can be configured to emit: visible light, infrared light, ultrasound, magnetic fields, or radio waves. In some cases, the physical peripheral input device can include a plurality of the features to enable the physical peripheral input device to be tracked within the physical environment by any one of a plurality of tracking techniques. The physical peripheral input device may include an inertial measurement unit (IMU) and the location of the physical peripheral input device within the physical environment can be determined using the IMU. In certain embodiments, the orientation of the first virtual display can be determined based on a determined identity of the user of the physical peripheral input device and wherein the orientation of the first virtual display would be rendered differently for a differently identified user.

In some embodiments, a method of operating a peripheral device includes receiving polling data from one or more sensors, the polling data corresponding to physical characteristics of a physical environment around the peripheral device, determining an area to orient a virtual display relative to the peripheral device within the physical environment based on the physical characteristics, determining a spatial relationship between the peripheral device and the projected virtual display, and generating control data configured to cause an AR/VR-based head-mounted display (HMD) to project the virtual display in the determined area at a maintained spatial relationship between the peripheral device and the projected virtual display as the peripheral device is moved within the physical environment. The method can further include detecting that the peripheral device is placed on a surface or interfaced by a user, where receiving the polling data from the one or more sensors may occur in response to detecting that the peripheral device is placed on the surface or interfaced by the user. The method can include determining that the peripheral device is lifted off of the surface, and generating second control data to cause the HMD to change the spatial relationship between the peripheral device and the projected virtual display such that a volumetric area occupied by the peripheral device and the projected virtual display is reduced.

In some implementations, the method may further include determining a second area to orient a virtual interactive display relative to the peripheral device, where the interactive display can be configured to facilitate an augmentation of functional capabilities of the peripheral device, and determining a spatial relationship between the peripheral device and the projected interactive display, where the control data can be further configured to cause the HMD to project the interactive display in the determined second area and at a maintained spatial relationship between the peripheral device and the projected interactive display as the peripheral device is moved in the physical environment. The control data may cause the spatial relationship between the peripheral device and the virtual display to be maintained such that a movement of the peripheral device that is within a threshold distance from an initial location of the peripheral device does not cause the virtual display to move and a movement of the peripheral device that is greater than the threshold distance from the initial location of the peripheral device can cause the spatial relationship between the peripheral device and the projected interactive display to be fixed, where the spatial relationship between the peripheral device and the projected interactive display is fixed as the peripheral device is moved in the physical environment.

According to some embodiments, the method can include determining a third area on the peripheral device to orient a virtual overlay, where the virtual overlay can be configured to further facilitate the augmentation of the functional capabilities of the peripheral device, and determining a spatial relationship between the peripheral device and the projected virtual overlay, where the control data is further configured to cause the HMD to project the virtual overlay in the determined third area and at a maintained spatial relationship between the peripheral device and the projected interactive display as the peripheral device is moved in the physical environment.

In further embodiments, a hub device for interfacing physical peripheral devices for a virtual environment includes a transceiver configured to communicate with a display system for presenting a virtual reality or augmented reality virtual reality environment to a user, a tracking subsystem configured to sense a location of a physical peripheral input device within a physical environment, and one or more processors coupled to the transceiver and the tracking subsystem, the one or more processors configured to determine, via the tracking subsystem, the location of the physical peripheral input device within the physical environment, and transmit, via the transceiver, to the display system, the location of the physical peripheral input device within the physical environment. In some cases, the tracking subsystem can sense the location of the physical peripheral input device using a technique different from a technique used by the display system to track a location of the user or a head mounted display (HMD) worn by the user. The technique used by the tracking subsystem to track the physical peripheral input device and the technique used by the display system to track the location of the user or the HMD may be each selected from a list comprising: an ultrasonic emitter; an ultrasonic receiver; a visible light optical sensor; a visible light optical emitter; a non-visible light optical sensor; a non-visible light optical emitter; a magnetic field generator; a magnetic field sensor; a radio wave emitter; and a radio wave receiver. In some cases, the hub device can further comprising features for determining the location of the device within the physical environment by a system used to track a location of the user or a head mounted display (MHD) worn by the user. The features may be selected from a list including: a sensor; an emitter; and a marking, for example. The sensor can be configured to detect or the emitter is configured to emit: visible light, infrared light, ultrasound, magnetic fields, or radio waves.

In some embodiments, the one or more processors of the hub device can be configured to: determine, via the tracking subsystem, the location of the physical peripheral input device in relation to the device; transform the location of the physical peripheral input device from a coordinate system used by the device to a coordinate system used by the display system; and transmit, via the transceiver, to the display system, the location of the physical peripheral input device using the coordinate system of the display system. The coordinate system used by the display system may be used to track a location of the user or an HMD, or track a location of the user or an HMD. In some cases, the one or more processors of the hub device can be configured to receive, from the physical peripheral input device, a signal corresponding to actuation of an input element of the peripheral input device and transmit, via the transceiver, to the display system, a signal corresponding to the actuation of the input element.

In certain embodiments, the tracking subsystem of the hub device may be configured to sense locations each of a plurality of physical peripheral input devices within the physical environment; and the one or more processors can be configured to determine, via the tracking subsystem, the locations each of the plurality of physical peripheral input devices within the physical environment and transmit, via the transceiver, to the display system, the locations of each of the plurality of physical peripheral input devices within the physical environment. The hub device can further comprising a memory storing a plurality of profiles, each of the plurality of profiles corresponding to a different physical peripheral input device.

One of the plurality of profiles may include information for translating a signal received from a physical peripheral input device corresponding to the one of the plurality of profiles to a signal interpretable by the display system. The signal received from the physical peripheral input device corresponding to the one of the plurality of profiles may correspond to actuation of an input element of the physical peripheral input device corresponding to the one of the plurality of profiles. In some cases, one of the plurality of profiles can include information for rendering a visual representation of a physical peripheral input device corresponding to the one of the plurality of profiles, or information indicating features of a physical peripheral input device corresponding to the one of the plurality of profiles, where the features indicate capabilities of the physical peripheral input device to support augmented virtual content.

In some embodiments, the features indicate an area of the physical peripheral input device can include physical elements where augmented virtual content can be displayed to the user and wherein the elements support the augmented virtual content by providing a physical stimulus to a user interacting with the augmented virtual content or a tactile input element for interacting with the augmented virtual content. The location of the physical peripheral input device can be determined within a three-dimensional space. In some cases, the tracking subsystem may include, for determining a location of the physical peripheral input device, at least two of: an ultrasonic emitter or receiver; an optical sensor or receiver; a magnetic field generator or sensor; and a radio wave emitter or receiver.

According to certain embodiments, a hub device for determining a virtual workstation for use with a virtual environment can include a transceiver configured to communicate with a display system for presenting a virtual reality or augmented reality virtual reality environment to a user; one or more sensors configured to detect aspects of a physical environment in proximity to the device; and one or more processors configured to: determine, via the one or more sensors, the aspects of the physical environment in proximity to the device; based on determining the aspects of the physical environment, defining one or more zones for the user to interact with a physical peripheral input device and a virtual display provided by the display system; and transmit, via the transceiver, to the display system, information indicative of the one or more zones. The one or more sensors may include an optical, electromagnetic, or ultrasound imager to detect the aspects of the physical environment. The one or more zones can include a first zone that defines an area characterized in that a physical peripheral input device placed within the first zone is used by a user to interact with one or more virtual displays rendered by the display system. The first zone may be determined based on detecting a working surface that a physical peripheral input device can be placed upon. The working surface may include a substantially planar and horizontal surface. In some cases, the first zone can be determined based on identifying a location of a physical peripheral input device within the physical environment, or based on identifying one or more fiducial marks on a surface.

In certain embodiments, the one or more zones may include a second zone characterized in that a virtual display can be perceived by the user as being located within the second zone and interaction with a physical peripheral device within the first zone can modify content observable by the user rendered on the virtual display within the second zone. In some cases, the second zone can be selected to align with a vertical physical boundary detected within the physical environment. The second zone may be defined to align with a vertical physical boundary detected within the physical environment. The second zone can be defined based on a type of physical peripheral device detected within the first zone. In some implementations, the one or more zones can include a third zone, the third zone characterized in that content displayed on a virtual display can be perceived by the user as being located within the third zone and where interaction of the user with the content modifies operation of a physical peripheral input device located within the first zone. The location of the third zone can be determined based on a location of a physical peripheral input device being detected within the first zone. A plurality of third zones can be determined, each corresponding to a respective peripheral input device. The location of the third zone may be determined based on a biomechanical model of the user such that the location enables the user to physically reach the third zone using an appendage. In some cases, the information indicative of the one or more zones may include spatial coordinates of the one or more zones. The one or more zones may be determined based on a location of the hub device within the physical environment, or based on locations of each of a plurality of hub devices, where the hub device is included in the plurality of hub devices. The one or more zones can include a fourth zone characterized in that content displayed within the fourth zone is viewable by a plurality of users interacting within an augmented reality or virtual reality virtual reality environment; and where content displayed within the second zone is viewable by only one user of the plurality of users. In some cases, the one or more sensors can include an inertial measurement unit (IMU) and the one or more processors are configured to determine the location of the hub device within the physical environment via the IMU.

In some embodiments, a method of operating a hub to interact with one or more peripheral devices within an AR/VR workstation environment can include detecting a first physical peripheral device within a physical environment; determining a location of the first physical peripheral device within the physical environment; establishing a communicative coupling with, and receiving data from, the first physical peripheral device and an AR/VR-based display; facilitating a transfer of received data between the first physical peripheral device and the AR/VR-based display; determining an area to orient a virtual display relative to the first physical peripheral device within the physical environment based on the determined location of the first physical peripheral device; and generating control data configured to cause the AR/VR-based display to project the virtual display in the determined area. In certain embodiments, the control data can be further configured to cause the AR/VR-based display to maintain a spatial relationship between the first physical peripheral device and the projected virtual display as the first physical peripheral device is moved within the physical environment. The method can further include receiving polling data from one or more sensors, the polling data corresponding to physical characteristics of a physical environment around the first physical peripheral device, where determining the area to orient the virtual display can be further based on the physical characteristics of the physical environment.

In further embodiments, a movement and location of a head-mounted display (HMD) of the AR/VR-based display and the hub can be tracked using a first tracking system, and where the determining a location of the first physical peripheral device within the physical environment is tracked via the hub using a second tracking system, the method further comprising: providing data corresponding to the determined location of the first physical peripheral device within the physical environment to the HMD, the provided data configured to cause an integration of tracking via the second tracking system with tracking via the first tracking system. The method can further include detecting a second physical peripheral device within the physical environment; determining a location of the second physical peripheral device within the physical environment; establishing a communicative coupling with, and receiving data from the second physical peripheral device; and coalescing the received data from the first and second physical peripheral devices into aggregate peripheral data, where the aggregate peripheral data can be transferred to the AR/VR-based display via the hub instead of the received data from each of the first and second physical peripheral devices. In some cases, the hub may be integrated with one of a keyboard, smart device, wearable device, or standalone entity.

In some embodiments, a system to interface a user with a computer can include a display configured to present, to a user, one or more images to enable a virtual reality or augmented reality virtual reality environment for the user; and one or more processors coupled to the display, the one or more processors configured to: induce the display to render the one or more images to enable the virtual reality or augmented reality virtual reality environment for the user; and induce the display to render one or more layers to present, to the user, a representation of a physical interface device within the virtual reality or augmented reality virtual reality environment, wherein the representation appears to the user to be at a location within the virtual reality or augmented reality virtual reality environment corresponding to a physical spatial location of the physical interface device. The one or more layers to present the representation of the physical interface device may include an input element layer representing one or more input elements of the physical interface device; an indicia layer representing one or more indicia associated with the input elements; a feedback layer providing user feedback of a state of the one or more input element; or a body layer representing a body of the physical interface device. The one or more layers can include a proximal field layer representing a field proximal to the physical interface device, or a body part layer representing a body part interfacing with the physical interface device. In some implementations, one of the one or more layers can be represented as being partially transparent, where the one or more partially transparent layers can be superposed on another one of the one or more layers; or another one of the one or more layers is superposed on the one or more partially transparent layers. In some aspects, the one or more layers may include features representative of a depth of an object in relation to the physical interface device.

In certain embodiments, rendering the one or more of the layers or a change in rendering the one or more layers can be in response to trigger, the trigger including one or more of: a configuration of the physical interface device; an arrangement of the physical interface device; a detection of a physical object associated with the system; a contextual event associated with the system; and a user interaction with the system. The configuration of the physical interface device may include a change in a form factor of the physical interface device. In some aspects, the arrangement of the physical interface device can include a change in an orientation of the physical interface device and/or a location of the physical interface device. In some embodiments, the location can be a location upon a work surface; and the one or more layers can include a proximal field layer representative of the work surface. The physical object can be an interoperable user interface device with the physical interface device; and the detection of the physical object may include detecting a proximity of the physical object to the physical interface device.

In further embodiments, the user interaction with the system can include one or more of: a gesture made by the user; a user interfacing with the physical interface device; or detection of a user's intention to interface with the physical interface device. In some cases, the one or more of the layers can be user customizable. The representation of the physical interface device may include an image of the physical interface device bound to a physical size of the physical interface device; and one of the one or more of the layers can extend beyond the image of the physical interface device bound to the physical size of the physical interface device. The system can further including a sensor system configured to sense a real-world arrangement of the physical interface device, where the one or more processors can be configured to induce the display to render the one or more layers based on the sensor system sensing the real-world arrangement of the physical interface device.

BRIEF DESCRIPTION OF THE FIGURES

Aspects, features and advantages of embodiments of the present disclosure will become apparent from the following description of embodiments in reference to the appended drawings in which like numerals denote like elements.

FIG. 20 shows how content zones may track with respect to a reference peripheral, according to certain embodiments.

FIG. 21 shows how content zones may collapse and expand, according to certain embodiments.

DETAILED DESCRIPTION

Figure 1A:
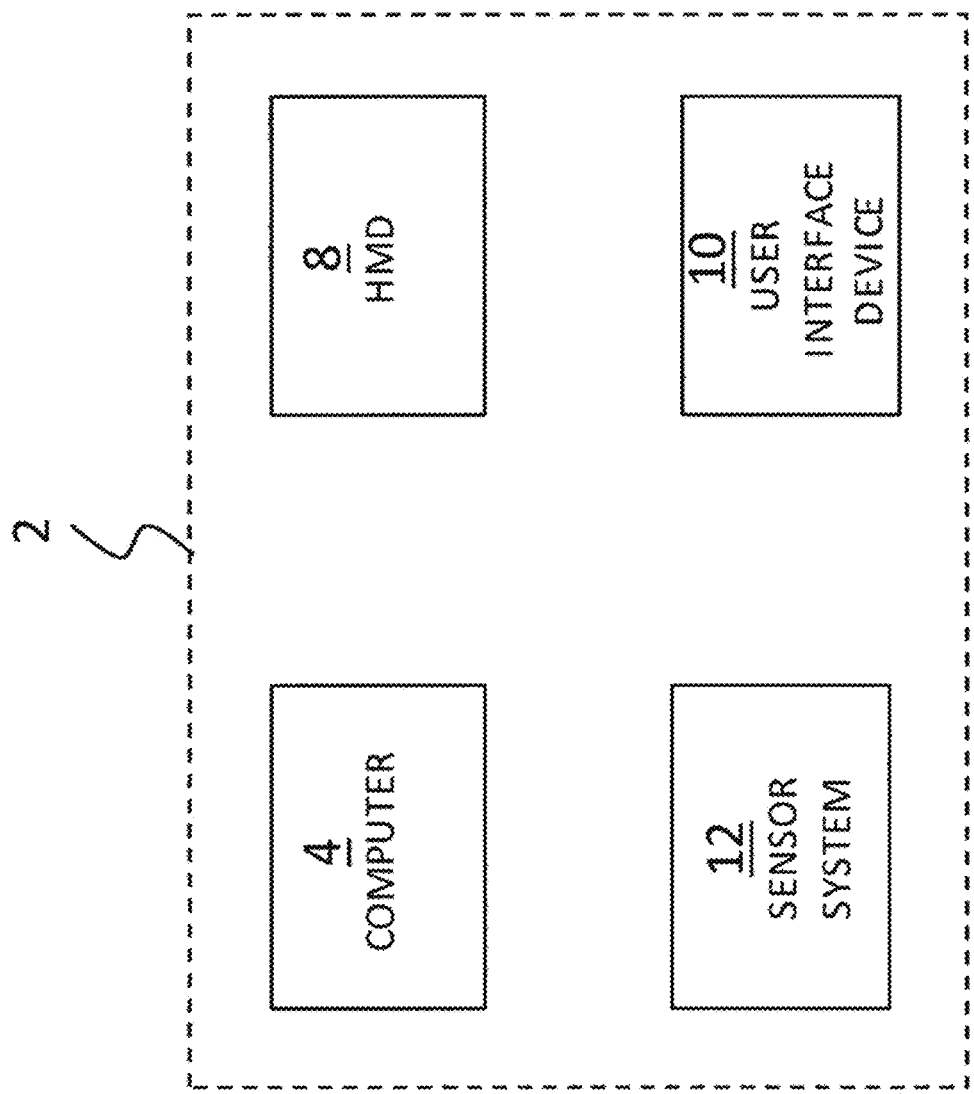
FIG. 1A is a block system diagram showing an embodiment of a virtual reality environment system according to the present invention.

The following detailed description refers to the accompanying drawings. The same reference numbers may be used in different drawings to identify the same or similar elements. In the following description, for purposes of explanation and not limitation, specific details are set forth such as particular devices, structures, architectures, interfaces, techniques, etc. in order to provide a thorough understanding of the various aspects of the present disclosure. However, it will be apparent to those skilled in the art having the benefit of the present disclosure that the various aspects of the claims may be practiced in other examples that depart from these specific details. In certain instances, descriptions of well-known devices, circuits, and methods are omitted so as not to obscure the description of the present disclosure with unnecessary detail.

Definitions

The present disclosure may be better understood in view of the following explanations:

As used herein, the terms "computer simulation" and "virtual reality environment" may refer to a virtual reality, augmented reality, mixed reality, or other form of visual, immersive computer-simulated environment provided to a user. As used herein, the terms "virtual reality" or "VR" may include a computer-simulated environment that replicates an imaginary setting. A physical presence of a user in this environment may be simulated by enabling the user to interact with the setting and any objects depicted therein. Examples of VR environments may include: a video game; a medical procedure simulation program including a surgical or physiotherapy procedure; an interactive digital mock-up of a designed feature, including a computer aided design; an educational simulation program, including an E-leaning simulation; or other like simulation. The simulated environment may be two or three-dimensional. As used herein, the terms "augmented reality" or "AR" may include the use of rendered images presented in conjunction with a real-world view. Examples of AR environments may include: architectural applications for visualization of buildings in the real-world; medical applications for augmenting additional information to a user during surgery or therapy; gaming environments to provide a user with an augmented simulation of the real-world prior to entering a VR environment. As used herein, the terms "mixed reality" or "MR" may include use of virtual objects that are rendered as images in conjunction with a real-world view of an environment wherein the virtual objects can interact with the real world environment. Embodiments described below can be implemented in AR, VR, or MR.

As used herein, the term "real-world environment" or "real-world" may refer to the physical world (also referred to herein as "physical environment." Hence, term "real-world arrangement" with respect to an object (e.g. a body part or user interface device) may refer to an arrangement of the object in the real-world and may be relative to a reference point. The term "arrangement" with respect to an object may refer to a position (location and orientation). Position can be defined in terms of a global or local coordinate system.

As used herein, the term "rendered images" or "graphical images" may include images that may be generated by a computer and displayed to a user as part of a virtual reality environment. The images may be displayed in two or three dimensions. Displays disclosed herein can present images of a real-world environment by, for example, enabling the user to directly view the real-world environment and/or present one or more images of a real-world environment (that can be captured by a camera, for example).

As used herein, the term "head mounted display" or "HMD" may refer to a display to render images to a user. The HMD may include a graphical display that is supported in front of part or all of a field of view of a user. The display can include transparent, semi-transparent or non-transparent displays. The HMD may be part of a headset. The graphical display of the HMD may be controlled by a display driver, which may include circuitry as defined herein.

As used herein, the term "electrical circuitry" or "circuitry" may refer to, be part of, or include one or more of the following or other suitable hardware or software components: a processor (shared, dedicated, or group); a memory (shared, dedicated, or group), a combinational logic circuit, a passive electrical component, or an interface. In certain embodiment, the circuitry may include one or more virtual machines that can provide the described functionality. In certain embodiments, the circuitry may include passive components, e.g. combinations of transistors, transformers, resistors, capacitors that may provide the described functionality. In certain embodiments, the circuitry may be implemented using, or functions associated with the circuitry may be implemented using, one or more software or firmware modules. In some embodiments, circuitry may include logic, at least partially operable in hardware. The electrical circuitry may be centralized or distributed, including being distributed on various devices that form part of or are in communication with the system and may include: a networked-based computer, including a remote server; a cloud-based computer, including a server system; or a peripheral device.

As used herein, the term "processor" or "host/local processor" or "processing resource" may refer to one or more units for processing including an application specific integrated circuit (ASIC), central processing unit (CPU), graphics processing unit (GPU), programmable logic device (PLD), microcontroller, field programmable gate array (FPGA), microprocessor, digital signal processor (DSP), or other suitable component. A processor can be configured using machine readable instructions stored on a memory. The processor may be centralized or distributed, including distributed on various devices that form part of or are in communication with the system and may include: a networked-based computer, including a remote server; a cloud-based computer, including a server system; or a peripheral device. The processor may be arranged in one or more of: a peripheral device, which may include a user interface device and/or an HMD; a computer (e.g. a personal computer or like device); or other device in communication with a computer system.

As used herein, the term "computer readable medium/media" may include conventional non-transient memory, for example, random access memory (RAM), an optical media, a hard drive, a flash drive, a memory card, a floppy disk, an optical drive, and/or combinations thereof. It is to be understood that while one or more memories may be located in the same physical location as the system, the one or more memories may be located remotely from the host system, and may communicate with the one or more processor via a computer network. Additionally, when more than one memory is used, a first memory may be located in the same physical location as the host system and additional memories may be located in a remote physical location from the host system. The physical location(s) of the one or more memories may be varied. Additionally, one or more memories may be implemented as a "cloud memory" (i.e., one or more memory may be partially or completely based on or accessed using the network).

As used herein, the term "communication resources" may refer to hardware and/or firmware for electronic information transfer. Wireless communication resources may include hardware to transmit and receive signals by radio, and may include various protocol implementations, e.g., 802.11 standards described in the Institute of Electronics Engineers (IEEE), Bluetooth™, ZigBee, Z-Wave, Infra-Red (IR), RF, or the like. Wired communication resources may include; a modulated signal passed through a signal line, said modulation may accord to a serial protocol such as, for example, a Universal Serial Bus (USB) protocol, serial peripheral interface (SPI), inter-integrated circuit (I2C), RS-232, RS-485, or other protocol implementations.

As used herein, the term "network" or "computer network" may include one or more networks of any type, including a Public Land Mobile Network (PLMN), a telephone network (e.g., a Public Switched Telephone Network (PSTN) and/or a wireless network), a local area network (LAN), a metropolitan area network (MAN), a wide area network (WAN), an Internet Protocol Multimedia Subsystem (IMS) network, a private network, the Internet, an intranet, and/or another type of suitable network.

As used herein, the term "sensor system" may refer to a system operable to provide position information concerning input devices, peripherals, and other objects in a physical world that may include a body part or other object. The term "tracking system" may refer to detecting movement of such objects. The body part may include an arm, leg, torso, or subset thereof including a hand or digit (finger or thumb). The body part may include the head of a user. The sensor system may provide position information from which a direction of gaze and/or field of view of a user can be determined. The object may include a peripheral device interacting with the system. The sensor system may provide a real-time stream of position information. In an embodiment, an image stream can be provided, which may represent an avatar of a user. The sensor system and/or tracking system may include one or more of a: camera system; a magnetic field based system; capacitive sensors; radar; acoustic; other suitable sensor configuration, optical, radio, magnetic, and inertial technologies, such as lighthouses, ultrasonic, IR/LEDs, SLAM tracking, light detection and ranging (LIDAR) tracking, ultra-wideband tracking, and other suitable technologies as understood to one skilled in the art. The sensor system may be arranged on one or more of: a peripheral device, which may include a user interface device, the HMD; a computer (e.g., a P.C., system controller or like device); other device in communication with the system.

As used herein, the term "camera system" may refer to a system comprising a single instance or a plurality of cameras. The camera may comprise one or more of: a 2D camera; a 3D camera; an infrared (IR) camera; a time of flight (ToF) camera. The camera may include a complementary metal-oxide-semiconductor (CMOS), a charge-coupled device (CCD) image sensor, or any other form of optical sensor in use to form images. The camera may include an IR filter, which can be used for object tracking. The camera may include a red-green-blue (RGB) camera, which may be used for generation of real world images for augmented or mixed reality simulations. In an embodiment different frames of a single camera may be processed in an alternating manner, e.g., with an IR filter and for RGB, instead of separate cameras. Images of more than one camera may be stitched together to give a field of view equivalent to that of the user. A camera system may be arranged on any component of the system. In an embodiment the camera system is arranged on a headset or HMD, wherein a capture area of the camera system may record a field of view of a user. Additional cameras may be arranged elsewhere to track other parts of a body of a user. Use of additional camera(s) to cover areas outside the immediate field of view of the user may provide the benefit of allowing pre-rendering (or earlier initiation of other calculations) involved with the augmented or virtual reality rendition of those areas, or body parts contained therein, which may increase perceived performance (e.g., a more immediate response) to a user when in the virtual reality simulation. This can be an important aspect to ensure safe and pleasant use of VR. The camera system may provide information, which may include an image stream, to an application program, which may derive the position and orientation therefrom. The application program may implement known techniques for object tracking, such as feature extraction and identification. Examples include the speed-up robust features (SURF) algorithm. An example of a camera presently available is the Pro C920 or C930 Full HD by Logitech.

As used herein, the term "user interface device" may include various devices to interface a user with a computer, examples of which include: pointing devices including those based on motion of a physical device, such as a mouse, trackball, joystick, keyboard, gamepad, steering wheel, paddle, yoke (control column for an aircraft) a directional pad, throttle quadrant, pedals, light gun, or button; pointing devices based on touching or being in proximity to a surface, such as a stylus, touchpad or touch screen; or a 3D motion controller. The user interface device may include one or more input elements. In certain embodiments, the user interface device may include devices intended to be worn by the user. Worn may refer to the user interface device supported by the user by means other than grasping of the hands.

As used herein, the term "input element" or "user interface" may refer to an object that the user interacts with to provide user input to a computer system. The input element or user interface may include a user manipulatable object, examples of which include: steering wheel; stick; pedal; mouse; keys; buttons; control pad; scroll wheel; flight yoke; light pen or other stylus device; glove, watch or other wearable device; rotational elements such as a dial or knob, motion detector; touch sensitive device. The user input element may be adapted to provide an input in other manners, including by the determination of a movement of a body part, including a touch pad.

As used herein, the term "totem" may, for example, include one or more physical or virtual objects which are manipulatable by the user to allow input or interaction with the AR, MR, or VR system. The totem may be used as a user interface device or a controller or as an object in virtual space. Some totems may take the form of inanimate objects, for example a piece of metal or plastic, a wall, a surface of table. Alternatively, some totems may take the form of animate objects, for example a hand of the user. The totems may not actually have any physical input structures (e.g., keys, triggers, joystick, trackball, rocker switch). Instead, the totem may simply provide a physical surface, and the AR, MR or VR system may render a user interface so as to appear to a user to be on one or more surfaces of the totem. For example, the AR, MR or VR system may render an image of a computer keyboard or trackpad to appear to reside on one or more surfaces of a totem. For instance, the AR system may render a virtual computer keyboard and virtual trackpad to appear on a surface of a thin rectangular plate of aluminum which serves as a totem. The rectangular plate may not itself have any physical keys or trackpad.

As used herein, the term "IMU" refers to an Inertial Measurement Unit which may measure movement in six Degrees of Freedom (6 DOF), along x, y, z Cartesian coordinates and rotation along 3 axes—pitch, roll and yaw. In some cases, certain implementations may utilize an IMU with movements detected in fewer than 6 DOF (e.g., 3 DOF as further discussed below).

As used herein, the term "keyboard" may refer to an alphanumeric keyboard, emoji keyboard, graphics menu, or any other collection of characters, symbols or graphic elements. A keyboard can be a real world mechanical keyboard, or a touchpad keyboard such as a smart phone or tablet On Screen Keyboard (OSK). Alternately, the keyboard can be a virtual keyboard displayed in an AR/MR/VR environment.

As used herein, the term "fusion" may refer to combining different position-determination techniques and/or position-determination techniques using different coordinate systems to, for example, provide a more accurate position determination of an object. For example, data from an IMU and a camera tracking system, both tracking movement of the same object, can be fused. A fusion module as describe herein performs the fusion function using a fusion algorithm. The fusion module may also perform other functions, such as combining location or motion vectors from two different coordinate systems or measurement points to give an overall vector.

As used herein, the numbering of elements is consistent from figure to figure, so that the same element is shown in different figures.

Overview

Referring to FIG. 1A, a virtual reality system 2 includes a computer 4, which can be capable of providing a virtual reality environment a user. The system 2 includes a display, which can be embodied as an HMD 8, virtual reality display (not illustrated), or other display capable of providing computer-rendered images to a user. The computer 4 can facilitate display of the virtual reality environment via the HMD 8 (by including a display driver, for example). The system 2 includes a physical user interface device 10 to enable a user to interface with the virtual reality environment facilitated by the computer 4. The user interface device 10 can receive input from the user for user control of the virtual reality environment. The system 2 can include a sensor and tracking system 12 to provide position and orientation information to the computer 4, e.g. of a body part of a user, which can include a user head orientation and/or hand orientation or of another object which may include a peripheral device or other object as will be discussed.

Figure 1B:
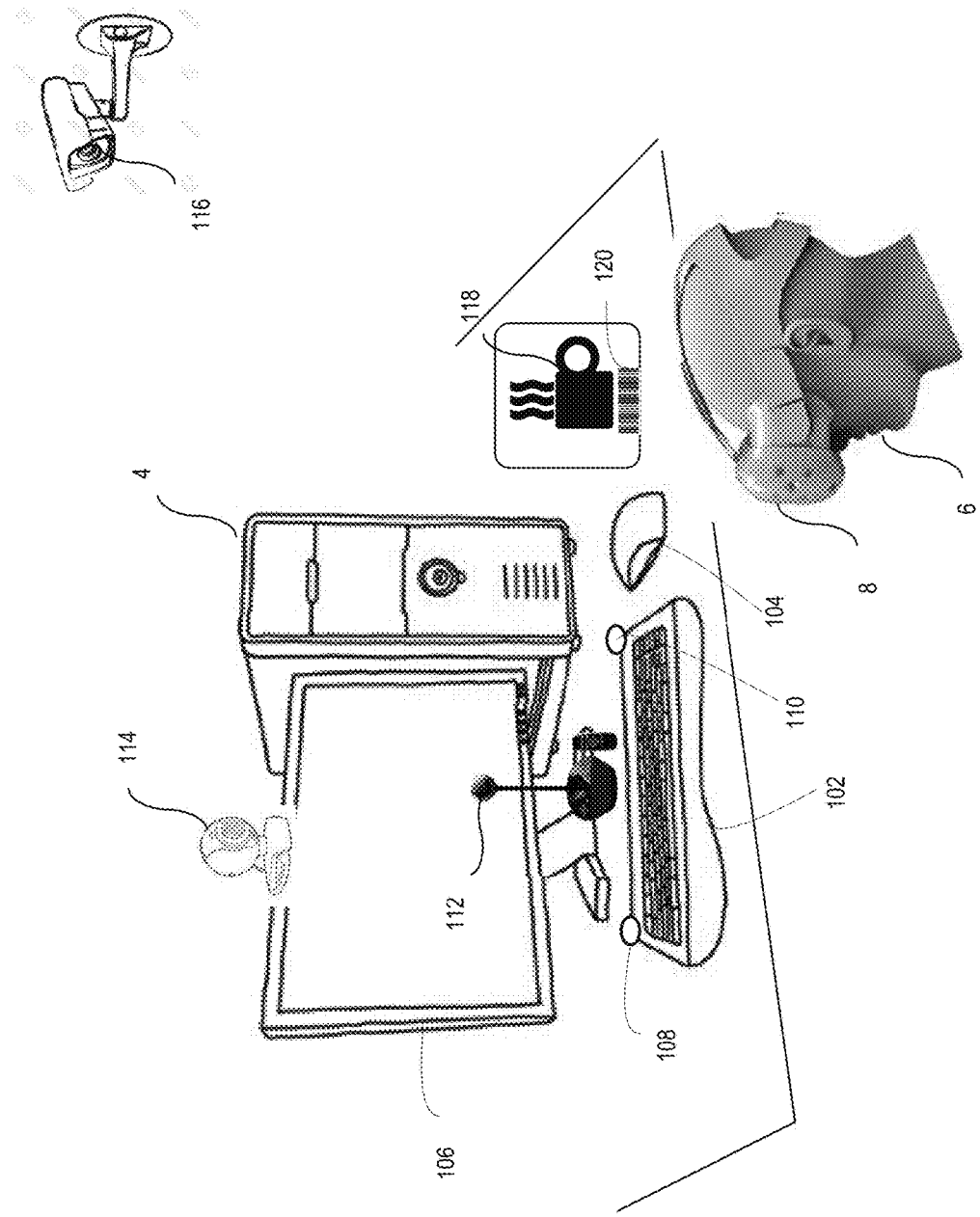
FIG. 1B illustrates a particular embodiment of a virtual reality system with a sensor and tracking system.

FIG. 1B illustrates a particular embodiment of a virtual reality system with a sensor and tracking system, which can be similar to sensor and tracking system 12. A user 6 is illustrated as wearing HMD 8. Two peripherals or input devices are shown—a keyboard 102 and a mouse 104. The location and movement of the keyboard 102 and/or mouse 104 (and/or hands of user 6) can be monitored with one or more cameras or other sensors. Shown in FIG. 1B are sensors 108 and 110 on keyboard 102, a video conference camera 112, a webcam 114 and a security camera 116. Cameras can also be mounted on HMD 8, elsewhere on the user 6, on a drone, or anywhere else with a view of the physical environment. Each camera can be a stereo camera, with two side-by-side image sensors to provide a 3D image with depth, or can otherwise be used to determine location of an object within 3D space (e.g., by using other depth sensing technologies or by determining position information by combining images from multiple images obtained from different viewpoints). As should be understood, various other sensor technologies can be used to determine a location of a peripheral device (e.g., keyboard 102 or mouse 104) within a physical environment. For example, ultrasound, electromagnetic, inertial sensors mounted to peripheral devices, optical sensors, can be used in any combination to obtain position information. In certain embodiments, sensor fusion techniques can be used to combine positioning information obtained from different types of sensors or from different viewpoints to determine a position.

One or more of the cameras or other sensors can detect objects in the physical environment and can identify those objects through a variety of methods as described in more detail below. For example, a coffee cup 118 may be detected from a barcode 120, an RFID tag, or other identifier. For an RFID tag, instead of, or in addition to, using a camera, an RFID reader could be used. Alternately, a computer 4 can instruct the keyboard 102 or mouse 104 to flash an indicator light so it can be identified. The cameras or other sensors can detect which peripheral or object the user's hands are near or touching, and the movement of the user's hands with respect to that object. In certain embodiments, imaging sensor(s) (e.g., visual, ultrasound sensors) can be used to classify certain objects (e.g., utilizing object detection techniques. An input device may include communication capabilities (e.g., a wireless transceiver) and be able to provide identification information to computer 4.

A space near or on any of the objects can be designated as a gesture space. For example, a determine three-dimensional volume of airspace above the keyboard can be used for hand gestures which can be interpreted as commands for computer 4 for a user to interact with a virtual reality environment. Multiple gesture spaces can be defined. For example, a gesture near the mouse 104 may have a different meaning, or use different gestures, than gestures over the keyboard 102 or on the display 106. More description is provided below.

As described in more detail below, an image of the object or peripheral device (e.g., a captured image or an image provided by a peripheral device) can be imported into the virtual reality environment for presentation to a user interacting within the virtual reality environment. For example, an image of keyboard 102 can be imported into the virtual reality environment for a user to interact with. Alternately, the image can be augmented or otherwise changed or moved. For example, the types of keys shown on a keyboard representation could be changed from alphanumeric to emojis. An input that isn't present can be projected onto the object in the virtual reality environment, such as a keypad on top of mouse 104 or even on coffee cup 118.

Figure 1C:
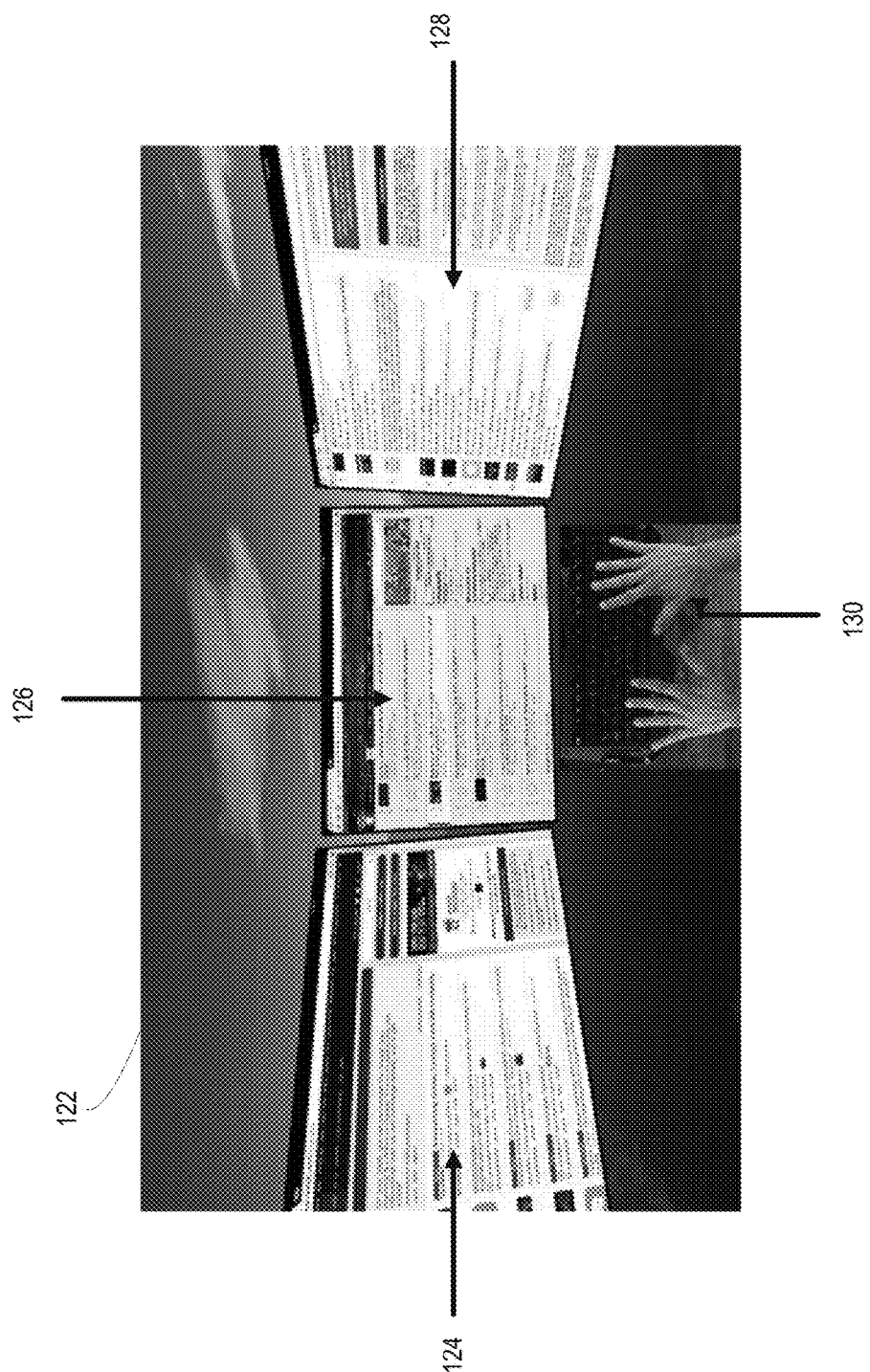
FIG. 1C illustrates a particular embodiment of the view of a virtual reality environment through an HMD.

FIG. 1C illustrates a particular embodiment of the view 122 of a virtual reality environment through HMD 8. In this embodiment, the virtual reality environment is used to display multiple windows of a computer monitor without requiring multiple physical monitors. As shown, virtual displays 124, 126 and 128 are shown. Also shown is a virtual representation 130 of the physical keyboard and user's hands, injected into the virtual reality environment.

Figure 1D:
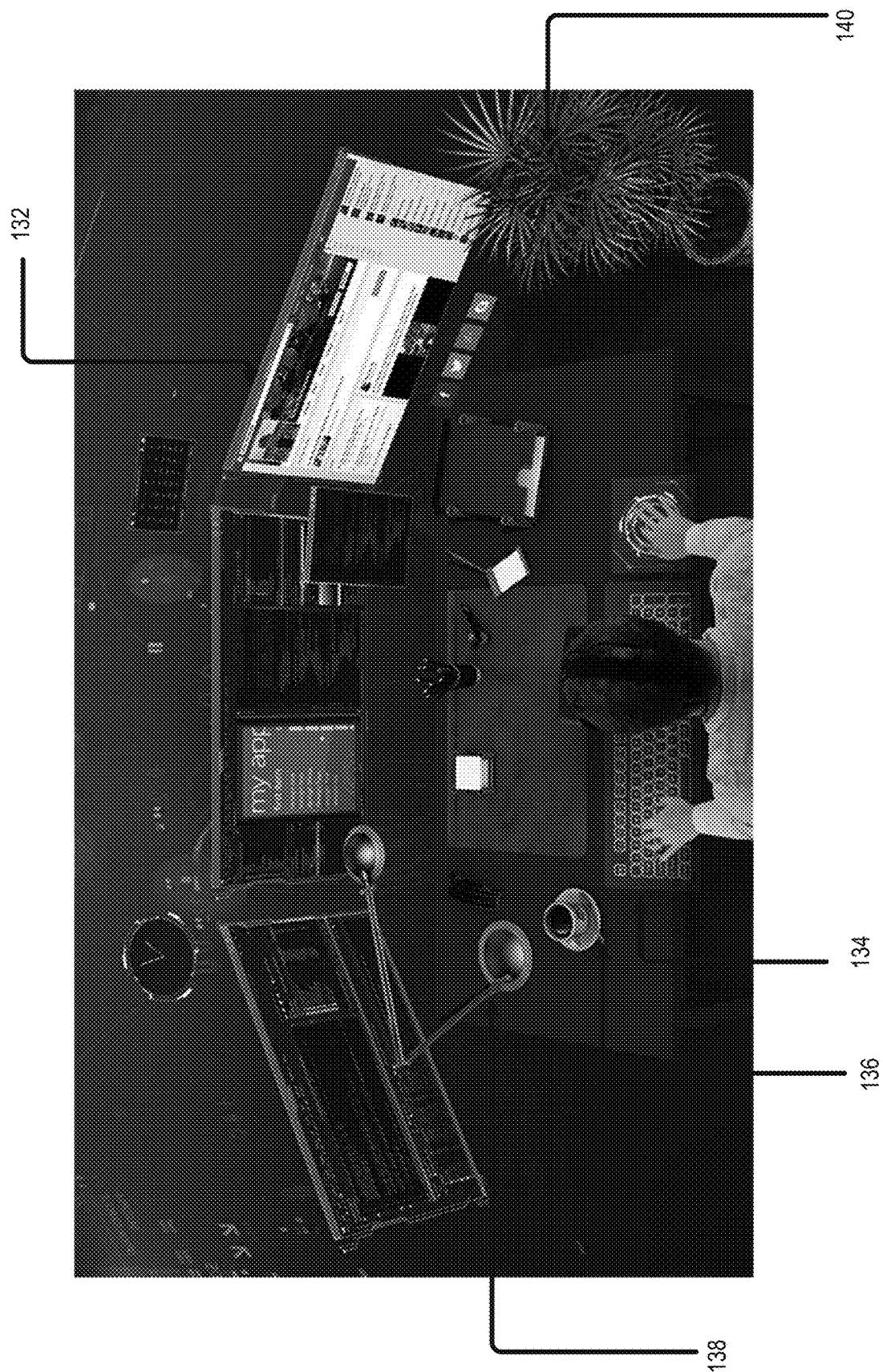
FIG. 1D illustrates a particular embodiment of a virtual reality environment with multiple virtual displays.

FIG. 1D illustrates a particular embodiment of a virtual reality environment with multiple virtual displays, such as display 132. In addition, a virtual display 134 of a physical keyboard and/or the user can be provided. Finally, virtual representations of other physical objects can be provided, such as a virtual coffee cup 136 and a virtual lamp 138. This enables the user, for example, to grab the real coffee cup and take a drink while wearing the HMD 8. A notepad and pen are other objects that can be identified and injected into the virtual reality environment, so a user can physically write notes while wearing HMD 8. Other items, such as a user's watch, can be injected so the user can check the time on their real watch. An office door behind the user can be monitored, and can be displayed on a rear-view mirror in the virtual reality environment.

Figure 1E:
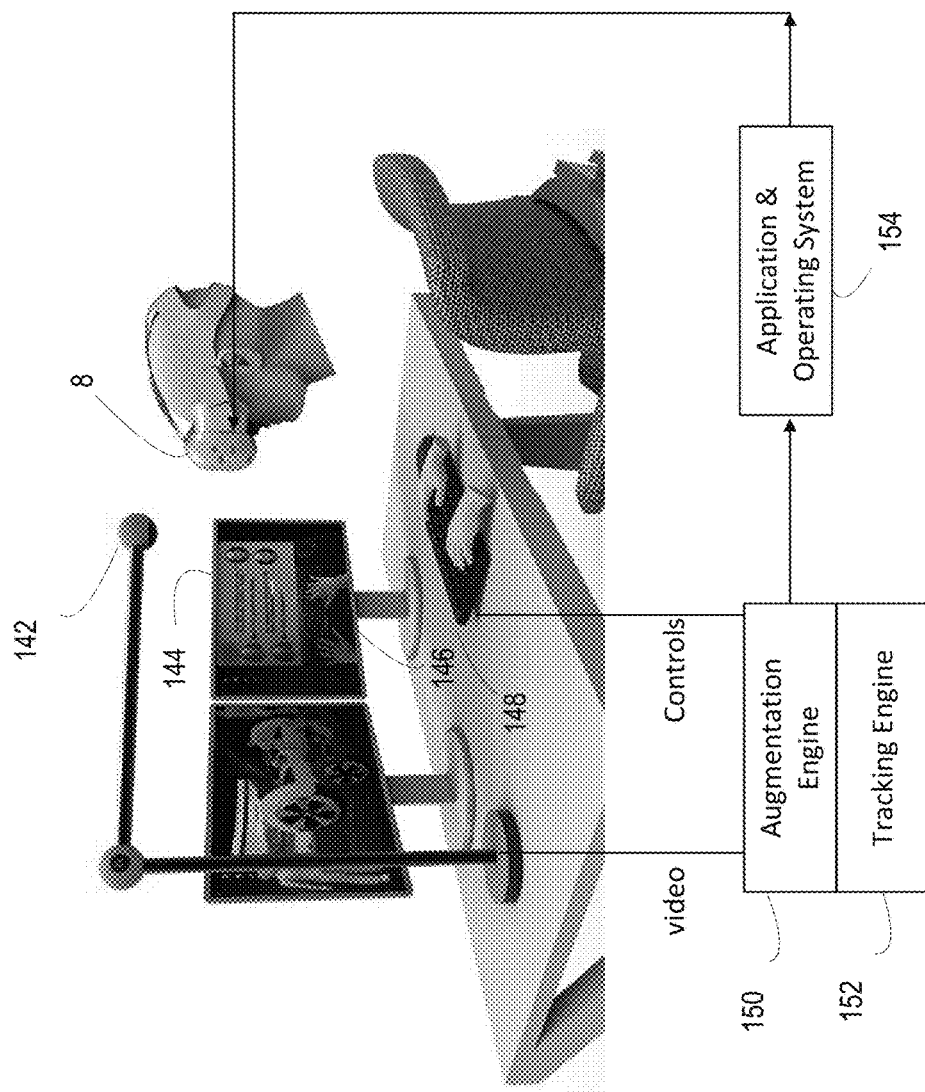
FIG. 1E is a high level diagram of an embodiment of an augmentation and tracking system operation.

FIG. 1E is a high level diagram of an augmentation and tracking system operation. A camera 142 can provide video to an augmentation engine 150 and a tracking engine 152. Video from other cameras, and/or other sensing data from other sensors can be provided. The video and other sensing data can be used for two purposes. First, the video and/or sensor data is used to provide a realistic (e.g., "real world" representation) display of one or more peripherals and the user's hands in the virtual reality environment. Second, the video and/or sensor data is used to track the user movements with respect to the peripherals.

Separately, control inputs from keyboard 148 can be provided to augmentation engine 148 and tracking engine 152. Determination of which key is depressed, or about to be depressed, can be detected by an actual key press which can generate a corresponding signal, a proximity sensor on the key, and/or from the camera 142 or other sensors. The control signals can be provided to "press" the appropriate key in the virtual reality environment, as well as determine which key should be augmented. The video and control signals, as augmented and modified, can be provided to application and operating system software 154 for the HMD 8.

In one embodiment, a representation 146 of the keyboard and user's hands is displayed on a physical monitor 144, and then the display of the physical monitor is imported into the HMD 8. Alternately, representation 146 is only generated in the HMD, providing more flexibility on positioning, such as under a desired one of multiple virtual monitors in the virtual reality environment.

Network and Computer Elements

Figure 2:
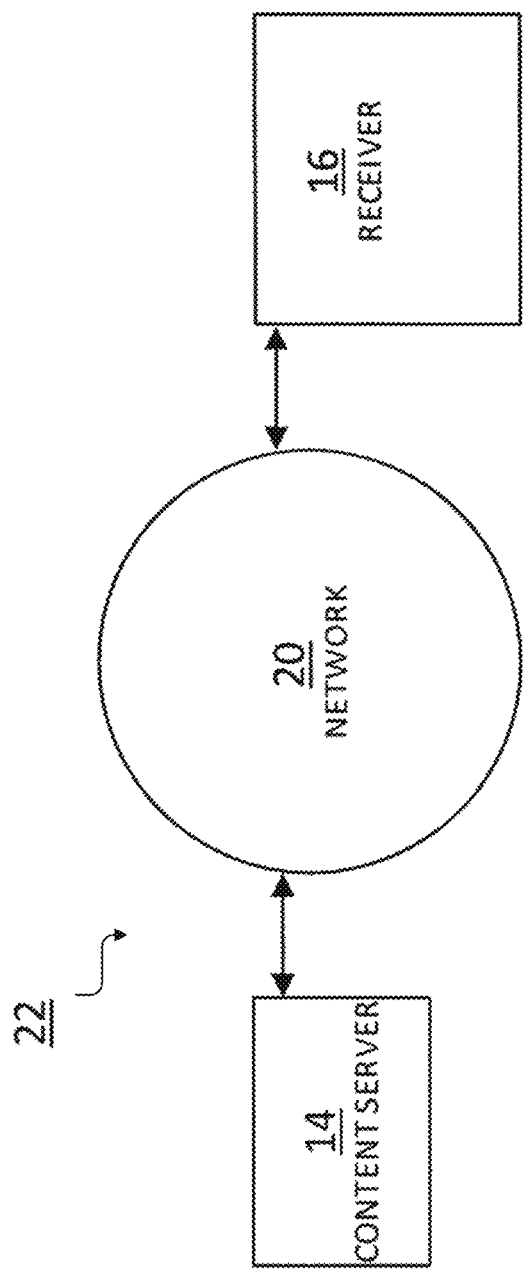
FIG. 2 is a block diagram showing an embodiment of a networked system for providing content to the virtual reality environment system of FIG. 1A.

FIG. 2 is a block diagram showing an embodiment of a networked system 22 for providing content to the virtual reality system of FIG. 1A. A content server 14 may provide some or all of the video content or other data or controls to the computer 4 of FIG. 1A, through a network 20 and a receiver 16 in communication with computer 4. Network 20 can be the Internet, a Wide Area Network (WAN), a Local Area Network (LAN) or any other network or networks or communication path. Alternately, the computer may generate and/or control the virtual reality environment from locally stored instructions. In one embodiment the computer 4 includes a memory with instructions executable for generation of the virtual reality environment. The number of content servers 14, receivers 16, and networks 20 can be modified as appropriate for a particular implementation, such as where content is provided from multiple content servers, or computers of other users in a shared video game. The receiver 16 may connect to the network 20 via wired and/or wireless connections, and thereby communicate or become coupled with content server 14, either directly or indirectly. Alternatively, receiver 16 may be associated with content server 14 through any suitable tangible computer-readable media or data storage device, data stream, file, or communication channel.

Figure 3:
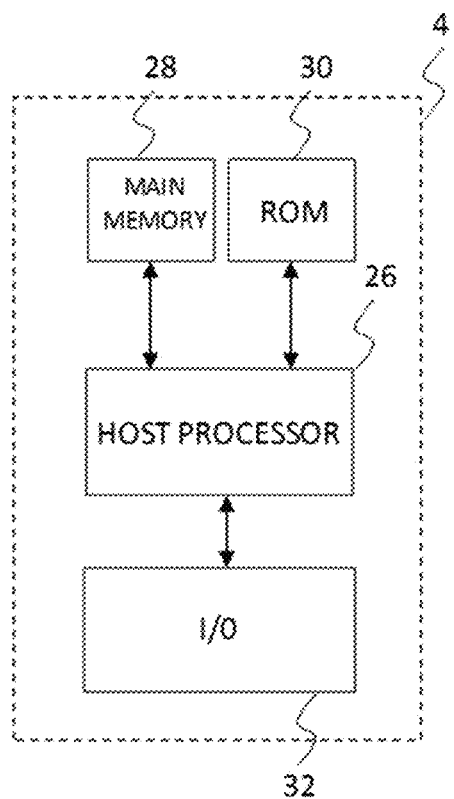
FIG. 3 is a block system diagram showing an embodiment implementation of a computer of the virtual reality environment system of FIG. 1A.

FIG. 3 is a block diagram of computer 4. Computer 4 may be implemented with a processor 26 (sometimes referred to herein as a "host processor"). The computer 4 can include memory such as main memory 28 and secondary memory 30. Main memory 28 may include a random-access memory (RAM) or another type of dynamic storage device that stores information and instructions for execution by processor 26. Secondary memory 30 may include hard drives or other memory devices that may store instructions or data that may not be directly accessible by processor 26. The computer 4 can include an input/output (I/O) system 32 to interface the computer 4 with peripheral and input devices, including the HMD 8 and user interface device 10 of FIG. 1A. One or more device drivers (not shown) may facilitate communication with the peripheral devices. The I/O system 32 may include a display (not shown) in addition to the HMD 8, which may display images of the virtual reality environment application, operating system application or other images associated with the virtual reality environment. The display may allow configuration of system 2 by the user without needing to wear the HMD 8, or configuration of system 2 by any other person, or to allow a secondary non-VR display of the virtual reality environment, e.g. for observational, run-time configurational, safety or any other purpose. The display may be a holographic display capable of rendering three-dimensional images for a user without the need of or by supplemented HMD 8. The I/O system 32 may include an audio output device (not shown) such as a speaker, which is preferably coupled to host processor 26 via associated audio circuitry such as, but not limited to amplifiers, filters, and other circuitry known to the skilled person to provide sound output to the user when an audio event occurs during the implementation of an application program. In embodiments the audio output device and associated circuitry may be located on the HMD 8.

The computer 4 may perform operations based on instructions that may be read into the main memory 28 from a computer-readable medium or from another device via communication resources. The instructions contained in the main memory 28 can cause processor 26 to perform processes that will be described later. Alternatively, hardwired circuitry may be used in place of or in combination with instructions to implement said processes. Thus, various implementations are not limited to any specific combination of hardware circuitry and software.

The computer 4 may implement instructions for determining from an image stream provided by the camera system the arrangement of objects in the capture area. For object tracking the instructions may implement known techniques, such as feature extraction and identification. Examples include the speed-up robust features (SURF) algorithm.

Example implementations of the computer 4 include: a personal computer (PC); workstation; laptop; a home video game console system, which is typically connected to a television set or other display; a set-top box, which can be used, for example, to provide interactive television functions to users; or a network or internet-computer; a media player (such as an MP3 player); a subnotebook/netbook; a tablet computer; a smartphone; a cellular telephone; a personal digital assistant (PDA); other similar electronic device; other suitable device. In certain embodiments, the computer 4 may be incorporated as part of the HMD 8 and/or user interface device 10. The computer 4 may be operable under various operating systems.

Figure 4:
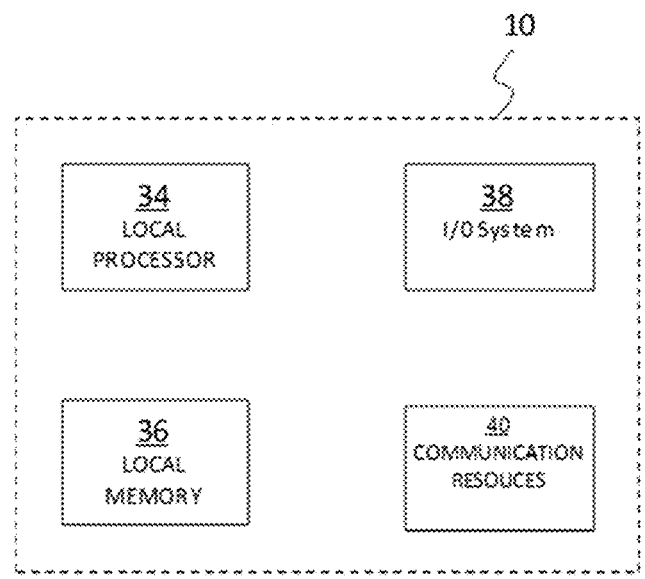
FIG. 4 is a block system diagram showing an embodiment implementation of a user interface device of the virtual reality environment system of FIG. 1A.

FIG. 4 is a block diagram of user interface device 10. The user interface device 10 can include a local processor 34. By local it is meant that the local processor 34 is separate from the host processor 26 of the computer 4. The local processor 34 may be provided with instructions to wait for commands or requests from the computer 4 decode the command or request, handle/control input and output signals according to the command or request, control sensors of user interface device 10 for imaging a real world environment in proximity to interface device 10, communicate with other user interface devices, and/or supplement host processor 26 for generation of and interaction within a virtual reality environment. In addition, the local processor 34 and host processor 26 may operate independently of the computer 4 by reading sensor signals and calculating appropriate forces from those sensor signals, time signals, and stored or relayed instructions selected in accordance with a host command. Local memory 36, such as RAM and/or ROM, is coupled to local processor 34. Processor 26 is similarly coupled to its own local memory 28, 30.

The user interface device 10 includes an I/O system 38 to provide information to/from the local processor 34. The I/O system 38 may vary depending on the configuration of the user interface device 10. In embodiments the I/O system 38 may be incorporated, connected to, or in communication with the sensor system described below. Said input elements may include an associated sensor system coupled to the I/O system 38, which may include one or more of the following: optical sensor systems; optical encoders; potentiometers; velocity sensors; acceleration sensors; strain gauge; resistive sensors; capacitive (e.g. touch) sensors, or any other type of sensors. A sensor driver (not shown) may be implemented to convert sensor signals to signals that can be interpreted by the local processor 34 or host processor 26.

The user interface device 10 is coupled to the computer 4 by communication resources 40, an example of which includes a bi-directional bus such as an RS232 serial interface, RS-422, RS-485, 12C, Universal Serial Bus (USB), MIDI, Firewire or other protocols known to the skilled person or a parallel bus or wireless link, such as BTIe or proprietary wireless protocols, for example. In certain embodiments, the communication resources 40 can supply power from the computer 4 to the user interface device 10 (sometimes simply referred to as an "interface device"). In certain embodiments, a dedicated power supply can be implemented to power user interface device.

The user interface device 10 may not be limited to providing an input to the computer 4, in certain embodiments, the user interfaced device provides output to the user, for example in the form of visual or and/or haptic feedback.

Augmented and Mixed Reality

Figure 6:
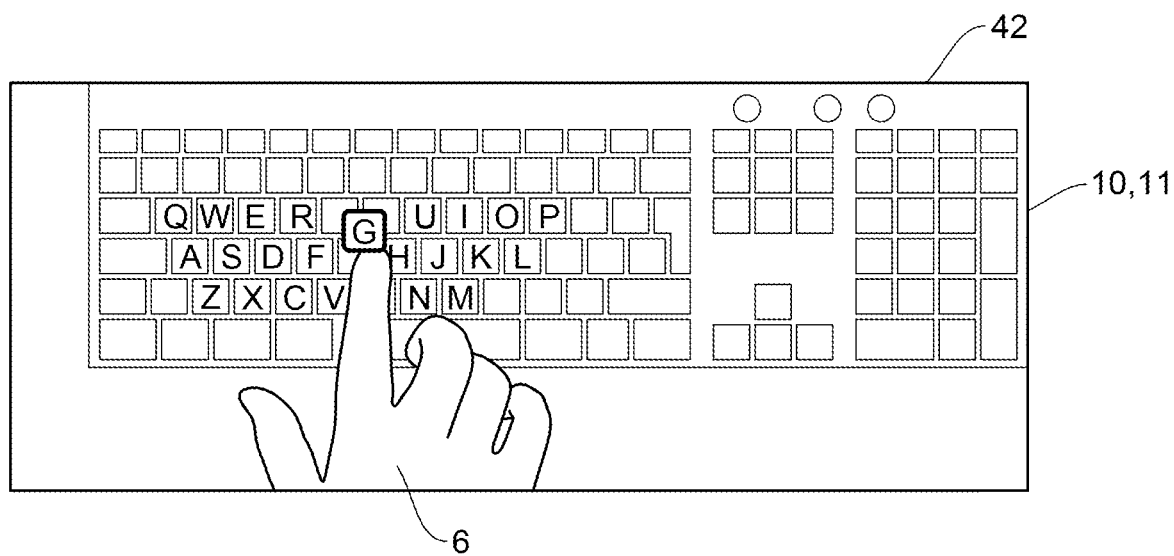
FIG. 6 is a schematic diagram showing an embodiment graphical environment to represent the user interface device of FIG. 5.
Figure 15:
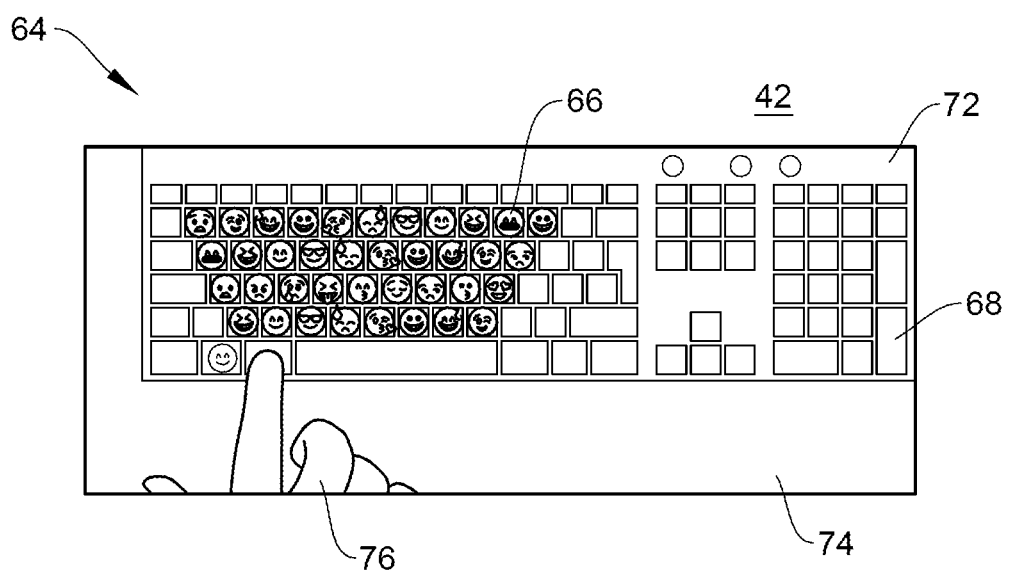
FIG. 15 is a schematic diagram showing an embodiment graphical environment to represent the user interface device of FIG. 12.

Various input devices, objects, user body parts and even air spaces may be imported into the virtual reality environment as realistically as possible, or may be augmented/changed. One example is highlighting a keyboard key as it is pressed or approached by the finger of a user 6 as shown in FIG. 6. Another example is changing a portion of the alphanumeric keys into emojis, as shown in FIG. 15. The changes can be contextual, dependent on user actions, the type of application being interacted with in the virtual reality environment, etc.

In certain embodiments, a physical appearance of aspects of user input devices or other objects can be augmented or changed. A particular keyboard key, knob, mouse button, roller, etc. can be highlighted by lighting, changing color, changing size, making it move or wiggle, changing its shape, etc. For example, a user's hands can have the color changed to improve the contrast with a keyboard or other device. The user's hands can be made partially transparent to allow seeing the keys otherwise obscured by the user's hands. The user's hands can be shown with gloves or jewelry added, for example. The changes can be contextual, such as adding leather gloves when a user is interacting with a steering wheel in a car racing video game, or with a joystick in a flight simulator. The user's hands could be made to appear wrinkled with warts upon being hit with a spell in a witchcraft game. Alternately, the user can dictate and configure the changes, with the user changes optionally being dependent on context. For example, the user can specify a Star Trek uniform shirt sleeve on the depiction of the user's wrists, but only during a space exploration game or genre of games. Typing on Halloween can give the user an option to select different types of alternative images like "monster hands."

In various embodiment, the augmentation can perform a variety of functions, such as: enlarge the key text for optimum viewing; change the transparency of your hands so you can see all the keyboard; change the key layout and text to the appropriate language; change the key layout for more symbols and rich text; change the layout to be a full contextual Emoji layout; change the layout to only show your relevant gaming keys; change the colour/style of your keyboard and desk; write virtual notes and paper and move them into the virtual space; gesture with your hands and interact with the virtual environment; create hot keys on different locations on the keyboard (and desk).

Augmentation can be done for productivity, music creation, video editing etc. The user input device can control the AR/VR desktop (keyboard/mouse and interactive table area) or the user input device can integrate with third party elements such as Twitch.

Inert objects can become input devices in certain embodiments. For example, the virtual keyboard 11 of FIG. 6 could, in reality, be a portion of a desktop. The user can simply be moving his/her fingers and tapping on the desktop, while having the location and movement of the user's fingers superimposed over a virtual keyboard in the virtual reality environment. The location on the desk to be used as a keyboard can be selected by computer 4 or by the user. A user command can select the area using a typed command, response to a prompt, a gesture, a verbal command, etc. The command can be in combination with the user pointing to the area or making a gesture over the area. The designated area can move in response to designated user gestures or hand positions.

In another example, a coffee mug can become a joystick or puck. Buttons can be superimposed on the virtual representation. The buttons can be placed in fixed locations, or can be place below where the user's fingers happen to be while grasping the coffee cup.

In addition to augmenting or changing buttons, keys, rollers and other input or sensing elements, other aspects of a user interface device or other object can be changed. A color of the frame of a keyboard can be changed, can be made to glow, flash, etc. The shape and appearance can be changed. Typed letters/words can be presented at the top of the keyboard, as if the keyboard had a small display at the top. A mouse can be changed to appear like a live mouse with whiskers in the user's hands, with the whiskers and a tail moving in response to certain inputs or contextually based on what is occurring in the virtual reality environment. Haptic feedback to the mouse can be provided so the user feels the mouse wriggling. The mouse might change into other objects, such as a sword, a bomb, a gun or other object depending on the context of a game, such as a combat game. The change can be triggered by user or other actions in the virtual reality environment, such as the user accumulating a certain number of points.

An injected user interface device video can be customized. In one embodiment, the injection of the user interface device and user hands is accomplished by a peripheral system providing a video to be displayed in a designated portion of the display are of the HMD. The peripheral system can add any desirable content in that video area, such as help prompts on functional capabilities of the user interface device, or even advertisements.

In certain embodiments, camera images can be used to locate a user input device or peripheral, but stored images can be used instead or to enhance the image or replace portions not visible due to being obscured by a user's hands or another object on a desktop. The particular stored image can be obtained by detecting or inputting the model number of the input device.

Sensor and Tracking System

Objects to be sensed and tracked can be identified in a number of ways. User input devices can be detected upon connection to computer 4, by either a wired or wireless connection. Image recognition can be used with one or more cameras to locate the user input devices. The user input devices could also be identified by having computer 4 cause an indicator light on the device to flash, to be detected by the camera. Or the user could be prompted to touch or manipulate the device. Image recognition can also be used to detect input devices. For example, a limited number of input device models may be available for use in virtual reality, and a database can store images of those models from different angles for image recognition.

In addition to connected devices, other object can be identified and injected into the virtual reality environment. A user can put barcode labels or RFID tags or other identifiers on the objects to be incorporated. A barcode or RFID reader can be incorporated into a user input device, a peripheral device, a camera, the HMD, or any other object. Alternately, the user can use gestures, such as pointing, to indicate an object to be sensed. Alternately, a particular peripheral, such as a stylus, can be used to touch or point to desired objects. The stylus could light up, or send out IR, radio, NFC or other signals to indicate its position. The gesture could be in combination with an audible or typed command or other input. In this manner, the user can decide what is important to incorporate into the virtual reality space. For example, the furniture may be incorporated so the user can walk around and see the furniture without bumping into it. Drinks or food could be identified so the user can eat or drink while wearing the HMD. A brush or comb could be identified, or nail clippers, so the user can do personal grooming while in the virtual reality environment, perhaps as part of a grooming instruction program.

Identified devices and objects can be injected into the virtual reality environment based on various triggers (described in more detail below). For example, a desk or keyboard may appear only when the user approaches. A desk or other object could appear to avoid the user bumping into it, while other devices or objects could appear upon a trigger indicating a user need for the device or object. The trigger could be a user gesture, command, placing a device upon a surface, or even detecting a user gazing at a device or icon.

Identified user input devices and other peripherals and objects that have been identified can have their images captured by one or more sensors so that the images are available for injection into the virtual reality environment. The same or different sensors can also track the movement of the user input devices and other peripherals and objects, as well as a user's hands and potentially other body parts. Different technologies can be used, such as visible spectrum and IR cameras or sensors for providing images, and lasers for detecting movement. Various sensors and user interface devices can be networked, to work in cooperation for identification, locating, and tracking movement. For example, a keyboard can identify a particular key that was pressed, and a laser and camera can both detect a finger moving downward above that key. The various actions can be correlated, used to confirm, or used where one of the sensors is blocked or otherwise does not have a high confidence detection.

A gesture space can be defined in certain embodiments. For example, a space above a keyboard and/or mouse can be defined as a gesture space. Alternately, any other space or surface can be designated for gestures. For example, a portion of the desktop, or a mousepad on the desktop, can be turned into a touch sensor. Multiple gesture spaces or surfaces can be used in combination, or separate gesture spaces or surfaces could be used for different purposes, based on location and context of what is happening in the virtual reality environment.

A gesture space or surface can remain inactive until activated, so a user doesn't inadvertently cause something to happen with a gesture. Activation can be by a gesture, such as pointing to the space or surface, by a button press, verbal or typed command, or any other input. Gesture spaces can be activated automatically based upon context, such as activating a touchpad when a particular virtual display is presented in the virtual reality environment. The activation can be combined with the display of a virtual touchpad in the appropriate space in the HMD. A phantom, faded, or other representation of the gesture space or surface can be shown when inactive, so the user knows where it is. For example, a square or round fog cloud could be shown in the appropriate space.

A sensor based on radar technology can be used to pick up gestures around a peripheral. These gestures can enable the user to perform recurrent actions that normally require pressing a non-intuitive key on the keyboard. Some examples are set forth below.

Swipes to the left or right in within a gesture space could be used to (1) switch a window rendered within a virtual desktop, (2) enable/disable the display of a virtual keyboard, (3) based on the context, move forward/backward in a video, next/previous song, next/previous photo in the slideshow, etc.

If unable to quickly identify a key or special character, give the ability to the user to draw it intuitively near the keyboard to input the desired character. This could use character prediction to reinforce the confidence level of the gesture detected.

A sensor based on IR lasers to identify fingers on an edge or the peripheral, or all around the peripheral could be used. These lasers would be close to the table top surface and detect up to 10 fingers and their respective locations. The same types of use-cases can arise from this type of sensor as for the radar sensor. This sensor could, however, be able to pick up other types of gestures and create new use-cases, such as: detect a two or three fingers gesture that describes an action that aims at increasing/reducing the size of an object. This can allow a user to perform an action that complements the usage of (1) a pointing device, (2) voice interactions, (3) gaze interactions, by providing a multimodal way to perform the given action. E.g. using a stylus, using the gesture to modify a size of the brush used while drawing, etc.

In certain embodiments, a sensor and tracking system can be incorporated in one or more user input devices or peripherals. Alternately, they can have portions implemented in different devices, such as object detection sensors in a puck on the desktop, motion tracking in cameras such as a webcam, and tracking software for analysing the sensor data in the keyboard or in computer 4, or a combination. A "smart puck" or "hub" peripheral can be provided on the desk that is able to sense and locate other peripherals (i.e., the keyboard) and track them. Depending on where the puck is set, a context can be assigned to it, hence enabling it to become your desk, your TV setup or another environment. The puck can be a portable or wired device that is equipped with sensors that allow it to perceive peripherals nearby. Such sensors can be based on IR photodiodes (Vive-like), ultrasonic, magnetic, optical, etc. technologies.

In one embodiment, the distorted representation of the user's peripheral and hands from one camera or sensor can be rectified by applying a perspective distortion algorithm based on the computed difference of perspective from two types of sensors.

Triggering

The appearance of a user interface device, peripheral or other object can be triggered by context. Also, the position and presentation can be varied based on the same or different triggers. For example, a keyboard can be shown in its actual position, or a fixed position relative to the actual position. The keyboard could be attached to the bottom of a display where typing is occurring in the virtual reality environment. Alternately, the user's gaze can be tracked, and the keyboard can follow where the user is gazing. The triggers can be customized by the user, and can vary depending on the software application or mode of operation.

The type of user input device can be trigged by context, as well as the position in the virtual reality environment, and when to inject and when to remove. For a message window, a keyboard can be injected below the message window when a message is received, or the user opens the messaging application. If the user selects a fighter pilot game, a joystick may be automatically injected. For selection of a racing game, a steering wheel can be automatically injected. The injected objects also won't always be put in front of the user. Thus, there is a multiple-faceted decision tree, such as: 1) trigger event detected; 2) determine real world arrangement; 3) determine, based on the context, where to inject the peripheral; 4) guide the user to the peripheral (perhaps lighting keys up or giving directional arrows or haptics or sounds or another prompt.

The appearance of particular user interface devices, peripherals or objects can be triggered by the user approaching them, an application in the virtual reality space requiring them at a particular point in time, an explicit user command, or a combination. The location for injection and the type of injection is also triggered by the context, as customized by a user.

Inserted Graphical Environment

FIG. 6 shows a graphical environment 42 for insertion into the virtual reality environment of HMD 8. Graphical environment 42 can include video images shown (of the keyboard and hand), for insertion into the virtual reality environment. Graphical environment 42 can also include control or input signals corresponding to key presses and other inputs from keyboard 11. Graphical environment 42 may be created by one or both of processor 26 in computer 4 and processor 34 in user interface device 10. The processor (s) provide instructions for generation of a video display or other image insertion into graphical environment 42, which is inserted into, or combined with, a virtual or augmented or mixed reality environment of HMD 8. Whilst reference is made to the processor 26 of the computer 4, it will be understood that any processing resource arranged as part of the system 2 (various examples of which are disclosed here in) or other processing resource in communication with the system may be utilised. The instructions may be provided to the HMD 8 for display of the virtual reality environment (including a display driver coupled thereto).

Embodiment arrangements of the user interface device 10, implemented as the keyboard 11 will now be provided. Both reference numbers 10 and 11 are used to emphasize that the shown keyboard 11 could be any other user input device 10. It will be understood that the arrangements may be applied to other implementations of the user interface device 10, various example implementations are provided herein.

Figure 5:
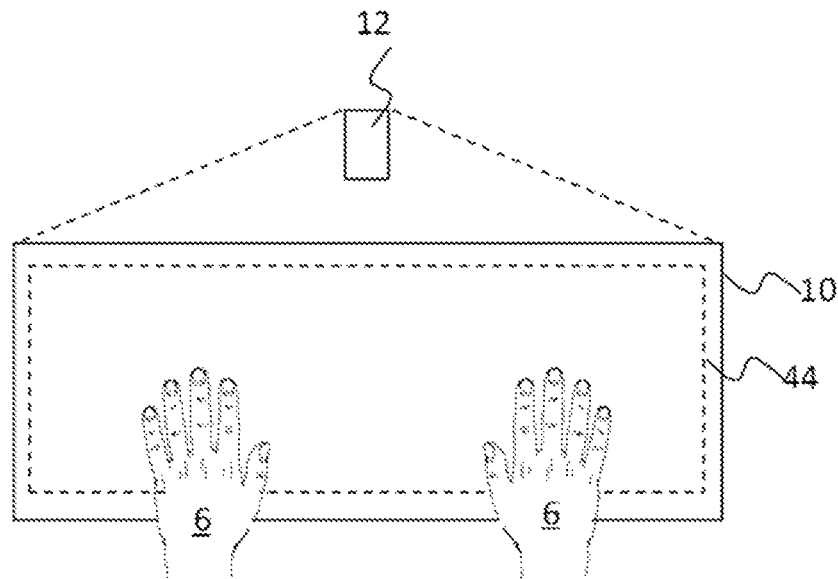
FIG. 5 is a plan view showing an embodiment of a user interface device of the virtual reality environment system of FIG. 1A.

Referring to FIG. 5, a keyboard 11 includes input elements 44 (keyboard keys, touchpad, roller, mini-joystick, etc.). The sensor system 12 is arranged to provide information to help determine a real-world arrangement of a body part of a user 6 (e.g. the hands of a user including digits). The real-world arrangement may be determined relative to the user interface device 10. The real-world arrangement body part of user 6 may be determined during interfacing of the body part of user 6 with the user interface device 10. As used herein "interfacing" may refer to a body part of user 6 interacting with the one or more input elements 44 or in operative proximity to interface with said elements. A portion or all of the sensor system 12 is operatively connected to or imbedded in the user interface device 10 in one embodiment. In embodiments operatively connected may refer to one or more of the following: the sensor system 12 physically connected to the user interface device 10 (e.g. arranged on a body thereof); the sensor system 12 physically connected to a device that the user interface device 10 can be connected to (e.g. a docking station), supported by (e.g. a support platform), or otherwise proximally aligned in relation thereto. Referring back to FIG. 5, the sensor system 12 can be arranged above the keyboard 11 to capture interaction with the keyboard during use.

Figure 8:
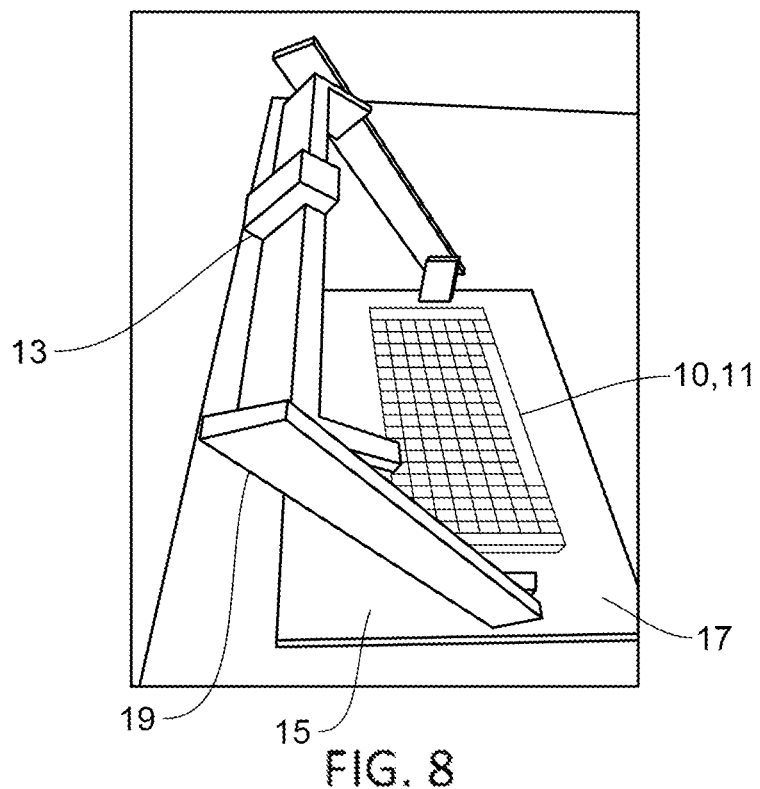
FIG. 8 is a perspective view showing an embodiment of a user interface device of the virtual reality environment system of FIG. 1A.

Referring to FIG. 8, peripheral device 17 is shown. The peripheral device 17 can include a support surface 15 for support of the keyboard 11. The peripheral device includes an arm 19 extending from the support surface 15. A camera 13 is arranged on the arm in a position along a proximal gaze direction of user 6 to capture a proximal point of gaze of the user of the interface device. With such an arrangement there may be minimal mapping of the captured image of the body part and/or keyboard 11 to a representative view as will be discussed.

Processor 26 and/or processor 34 can be used to determine a real-world arrangement of the body part of user 6 based on the information of the sensor system 12 in certain embodiments. The real-world arrangement of the body part of user 6 may be determined entirely by the portion of the sensor system 12 operatively connected to the user interface device 10, implemented as a keyboard 11 operatively or by said portion in combination with another portion of sensor system 12 arranged on a support portion 15 or elsewhere, examples of which include another peripheral device, e.g., the HMD 8, another display associated with the computer 4, a workstation surface (e.g. a desk) arranged device that includes a dedicated camera. In some cases, the sensor for detecting a user's hands can be integrated in a peripheral device, hub, an HMD and can be used in any combination, as further described below.

Referring to FIG. 6, in embodiments the processor 26 and/or 34 can include instructions for creating a representative arrangement in the graphical environment 42 of the body part of user 6 or an peripheral input device based on the determined real-world arrangement of the body part of user 6 or device. The processor 26 and/or 34 can provide a representative arrangement of the user interface device 10 relative to the body part of user 6. As used herein the term "representative arrangement in the graphical environment" means that the arrangement is in some way representative of the real-world arrangement, including one or more of the position in the user field of view; orientation; scale. The representative arrangement can include the user interface device 10 arranged as being aligned at the top of the graphical environment 42 with the same orientation as in the real-world. The user interface device can be arranged elsewhere in the graphical environment 42. The representative arrangement can include the body part of user 6 arranged with the same physical orientation as in the real-world and arranged with respect to the user interface deice 10 as in the real-world. A user may be able to observe their interactions with the user interface device 10 in the graphical environment 42. The user interface device 10 and/or body part can be omitted in certain embodiments. In certain embodiments, either the user interface 10 or the body part of user 6 can be omitted.

Figure 7:
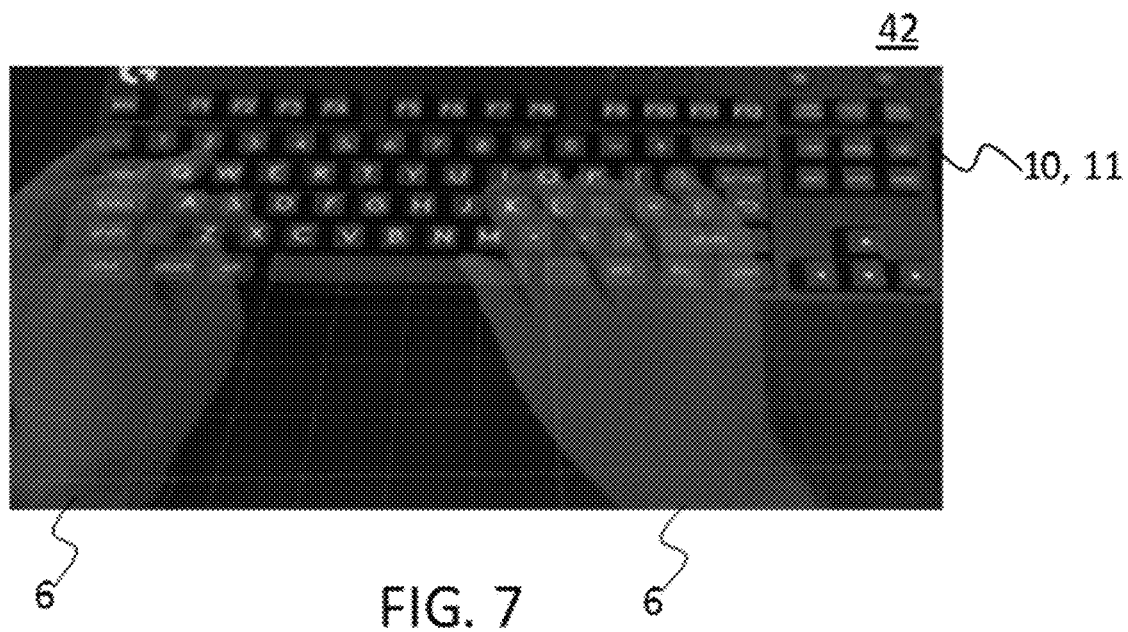
FIGS. 7 and 7A include a schematic diagram showing an embodiment graphical environment to represent the user interface device of FIG. 5.

Referring to FIG. 7, the processor 26 and/or 34 and associated memory can include instructions for displaying the body part of user 6 and user interface 10 arranged an equivalent position in the field of view in the graphical environment 42 to that in the field of view in the real-world environment. As discussed previously, to facilitate the associated processing, the sensor system 12 may provide position information from which a direction of gaze and/or field of view of a user can be determined. Said gaze direction and field of view may thus be determined by the processor 26 and/or 34 and the position in the real-world of the body part of user 6 and user interface 10 determined relative thereto. A user may have enhanced interaction with the user interface device 10 in the graphical environment 42.

In certain embodiments, one or more cameras of the sensor system 12 can provide images of the body part of user 6 and/or user interface device 10 for rendering in the graphical environment 42. Said rendering may comprise a simplified image for the graphical environment 42, e.g. a representative skin tone is implemented represent the body part, which may have the same outline as in the real-word, or an outline image. Said rendering may comprise an alternative image for the graphical environment 42, e.g. hands of a user are displayed as wearing gloves for a virtual reality environment including a vehicle simulator. In certain embodiments, the body part of user 6 is alternatively represented as including a cursor or other pointing means.

In certain embodiments, sensors of the sensor system 12 operatively connected to the user interface device 10 include capacitive sensors arranged to determine the proximity of the body part of user 6 to the user interface device 10, e.g. hovering over the keyboard. The capacitive sensors may be arranged on a body of the user interface device 10. Sensors of the sensor system 12 operatively connected to the user interface device 10 can include one or more cameras arranged on a body of the user interface device 10. Sensors of the sensor system 12 operatively connected to the user interface device 10 can be arranged in one or more of the following manners: incorporated within the user interface device 10, proximal a side, front, top, bottom of the user interface device 10 (wherein a top represents the platform of the device and an opposed bottom represents a base); on a body of the user interface device 10, e.g. to capture an image of an underside of a hand of a user; on a user manipulatable arm extending from the user interface device 10 or another device or object; or other physically connected arrangements.

The processor 26 and/or 34 may determine the real-world arrangement of the body part of user 6 based on the information of the sensor system 12. In certain embodiments, the real-world arrangement of the body part of user 6 may be determined entirely by the portion of the sensor system 12 operatively connected to the user interface device 10. In certain embodiments, the real-world arrangement of the body part of user 6 may be determined by a portion of sensor system 12 in combination with another portion of the sensor system 12 arranged elsewhere on the system 2, examples of which include another peripheral device, e.g. the HMD 8, another display associated with the computer 4, a work surface (e.g. a desk) arranged device that includes a dedicated camera, or another like configured user interface device 10.

In certain embodiments, a processor may map the determined real-world arrangement of a body part and/or user interface device 10 to a representative arrangement by means of a real-time operation, e.g. the application of one or more of a: rotation; translation; enlargement/reduction. The real-time operation may be user configured and/or based on a position of the user interface device 10 relative the sensors system 12 (e.g. with reference to the embodiment associated with FIG. 8 the positioning of the keyboard relative the support portion). As an example, referring to the embodiment associated with FIG. 5, the real-world arrangement can be mapped through applying a real-time angle mapping to provide a point of view proximal an estimated user's gaze. In certain embodiments, a user's gaze may be determined (by means discussed previously) and the real-world arrangement actively mapped to said gaze.

Referring to FIG. 6, the keyboard 11 can be aligned at the top right of the graphical environment 42. In certain embodiments, the keyboard 11 can be alternatively aligned, including various screen edge positions or with predetermined offsets therefrom. The body part 6 can be arranged with the same orientation and position with respect to the keyboard 11 as in the real-world. In spite of the arrangement of the keyboard 11, a user may be able to observe their interactions with the keyboard 11 in the graphical environment 42.

Figure 7A:
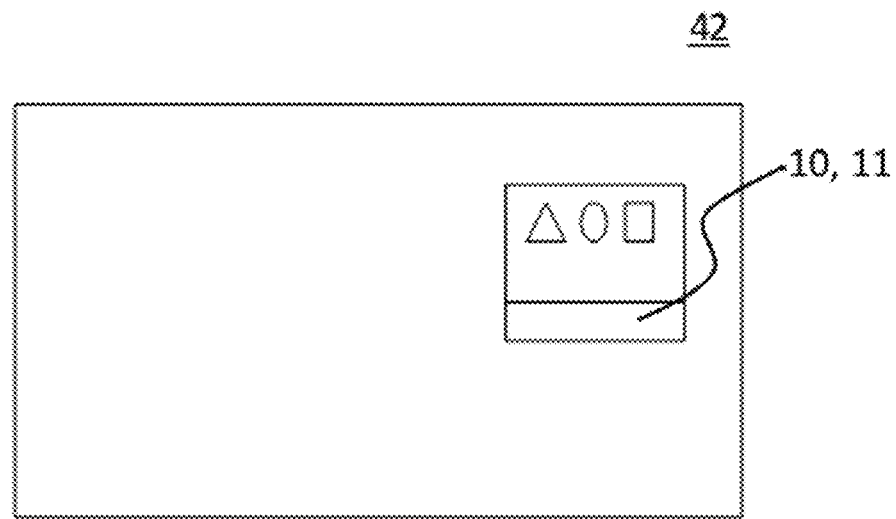

Referring to FIGS. 7 and 7A, in certain embodiments, the keyboard 11 is injected and arranged based on a contextual event, wherein a prompt window appears and the keyboard 11 is bottom edge aligned. For example, when a prompt window appears requiring text input, a peripheral, such as a keyboard, may be injected and aligned with the window. Alignment can occur in a number of ways, such as snapping corners to corners, centering and parallel matching, or user customizable by altering the angle of which the keyboard is displayed. In certain embodiments, the keyboard 11 is alternatively aligned to the promo window, including various screen edge positions or with predetermined offsets therefrom. In embodiments, the contextual event may include an event in the virtual reality environment that requires user input from the user interface device 10 or an electronic notification external the virtual reality environment (e.g. the receipt of a message).

The arrangement of the user interface device 10 can be user configured, e.g. via accessing a preferences setting of the virtual reality environment or other related application program. The user interface device 10 may be user displaceable, e.g. by drag and drop. The user interface device 10 can be locked in place so it doesn't move when the user isn't actively using the prompt window.

The user interface device 10 can include a positioning system (not shown) for determination of the arrangement of the user interface device 10 by the sensor system 12. The sensor system 12 can provide information to the processor 26 and/or 34 for said determination. This information can come from the sensor system 12, a tracking system, the HMD 8, the computer 4, or from anything that may detect or see the peripheral. The positioning system may include one or more of the following: emitters to emit a signal including one or more of optical (including infra-red), radio waves, acoustic, magnetic field, radio; ultrasound; a characteristic pattern; a characteristic object (including a logo). The positioning system may facilitate convenient and accurate recognition of the interface device 10 and its arrangement.

Figure 9:
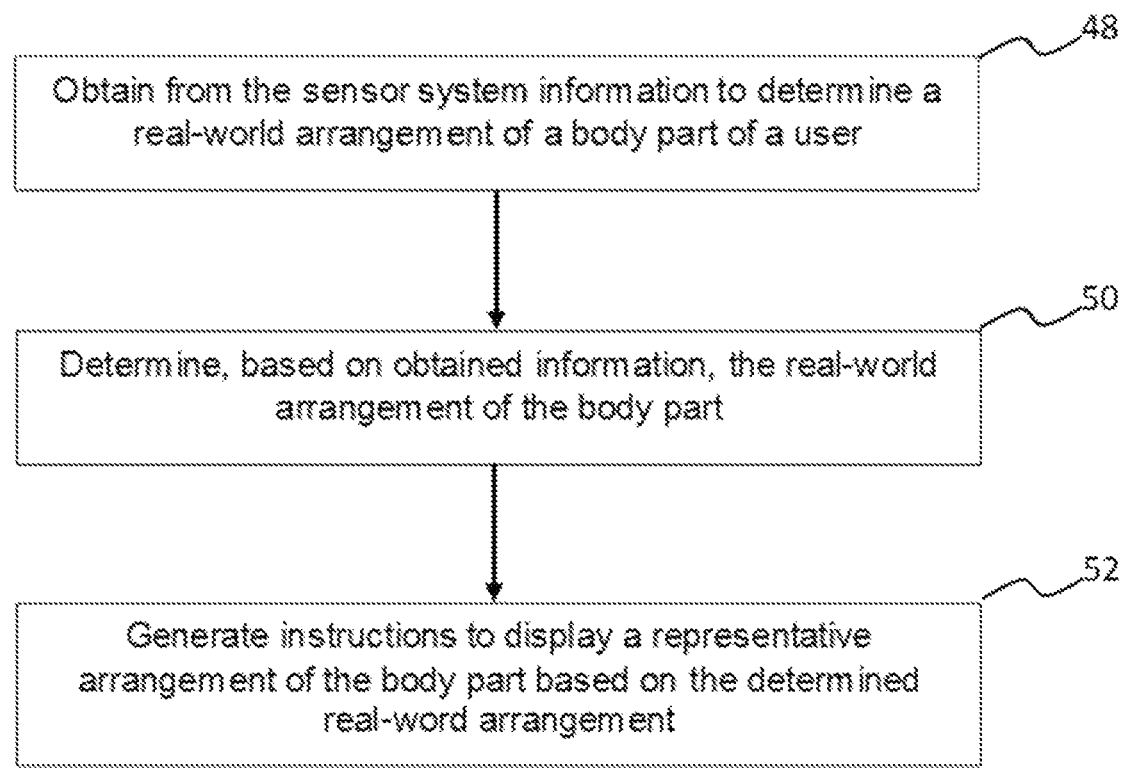
FIG. 9 is a flow chart showing an embodiment process for interfacing a user with a computer of the virtual reality environment system of FIG. 1A.

Referring to FIG. 9, a, process of interfacing a user with a computer, which may be implemented by the processor, 26 and/or 24 may include, at block 48, obtaining, from the sensor system 12 operatively connected to a user interface 10, information to determine a real-world arrangement of a body part of user 6 interfacing with said user interface device 10. The process may include, at block 50, determining, based on said information, the real-world arrangement of the body part 6 relative the user interface device. The process may include, at block 52, generating instructions to display a representative arrangement of the body part of user 6 and user interface device based on the determined real-world arrangement of the body part of user 6.

A sensor system 12 operatively connected to the user interface device 10 may provide information to determine a physical arrangement of the body part of user 6 and user interface device 10 of accuracy sufficient for determining usage of the user interface device 10, e.g. fingers interacting with the one or more input element 44.

Master Peripheral

In certain embodiments, a particular user interface device 10 (or other device) can act as a master peripheral, hub, or anchor peripheral. It may include all or part of the sensor system 12 and do all or part of the processing of sensor data to determine the location of itself or other objects and track them. The anchor peripheral (e.g., a keyboard) can determine and optionally inject into the virtual reality environment other nearby peripherals when contextually relevant. Additional interactions can be provided based upon the combination of peripherals. For example, a first type of interaction can happen when a mouse and keyboard are brought in, and a second type when a keyboard and speaker are brought in, etc.

Figure 10:
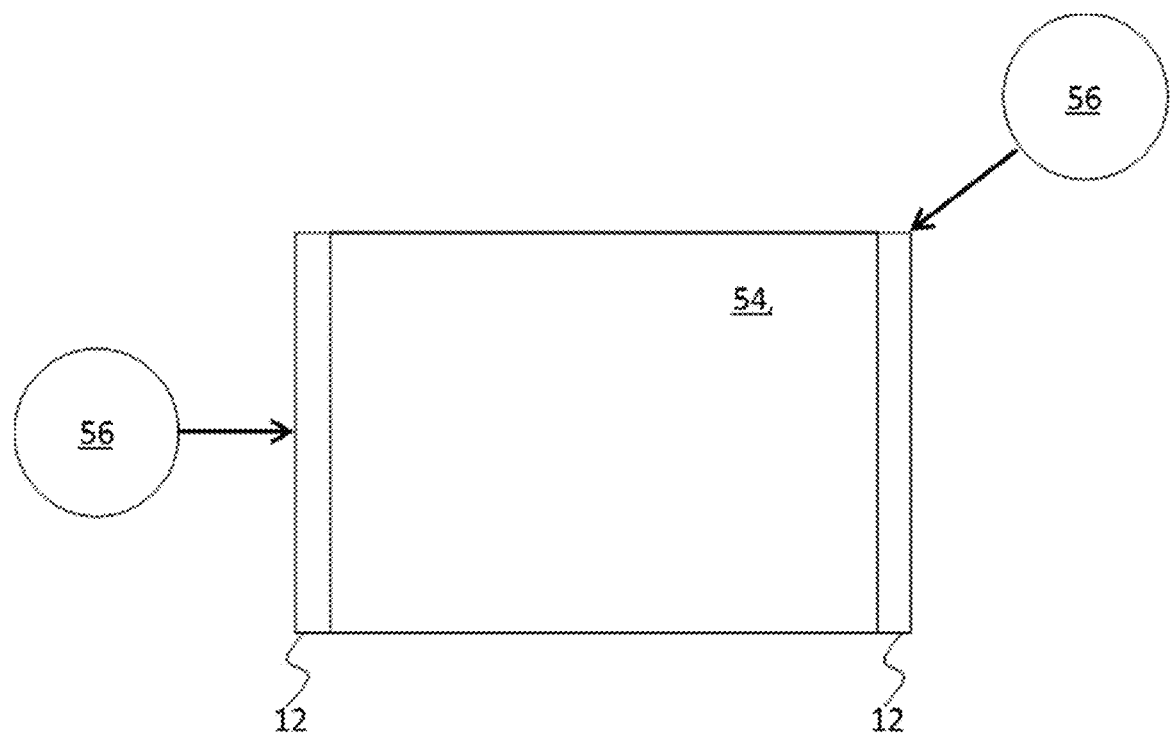
FIG. 10 is a schematic diagram showing an embodiment of a user interface device of the virtual reality environment system of FIG. 1A.

Referring to FIG. 10, a peripheral device 54 can include a sensor system 12 arranged to provide information to determine, relative the peripheral device 54, a real-world arrangement of one or more objects 56 (e.g., another user interface device, peripheral, totem, every day object, user's hand for a gesture, etc.). The sensor system 12 may be operatively connected to the peripheral device 54. Operatively connected may include: incorporated within peripheral device 54; the sensor system 12 physically connected to the peripheral device 54; the sensor system 12 physically connected to a member that the peripheral device 54 can be connected to, supported by or otherwise proximally aligned in relation thereto. The sensor system 12 may be operable to detect a position peripheral device 54 within a real world environment. For example, sensor system 12 can include an IMU, imaging, or other sensors.

The object 56 may be located in a proximal field of the peripheral device 54. The term "proximal field" as used herein may include any two or three dimensional space. Examples include: a work surface supporting said peripheral device 54; a three-dimensional space proximal user interface device as a game controller which, in use, is held by a user; a mat or pad for use with a user interface device 10 as a pointing device, including a mouse or a stylus.

The processors 26 and/or 34 to determine the real-world arrangement of the one or more object 56 based on the information of the sensor system. The real-world arrangement of the one or more object 56 may be determined entirely by the portion of the sensor system 12 operatively connected to the peripheral device 54 or by said portion in combination with another portion of sensor system 12 arranged elsewhere on the system, examples of which include another peripheral device, e.g. the HMD 8 another display associated with the computer 4, a work surface (e.g. a desk) arranged device that includes a camera.

The processor 26 and/or 34 compiles the sensor data collected from the various systems to inject into the virtual reality environment a representative arrangement of the peripheral device 54 and the objects arranged relative the peripheral device based on the determine the real-world arrangement. In one embodiment, the information provided by the sensor system 12 of the peripheral device 54 is thus used for generating the representative arrangement of the one or more object 56, which is then associated with the peripheral device 54.

In certain embodiments, processor 26 and/or 34 maps the arrangement of the one or more object 56 with the peripheral device 54 as the peripheral device is determined to move relative a reference point (e.g. another input device or sensor or other reference position) based on the determined real-world arrangement of the one or more object 56 relative to the peripheral device 54.

In certain embodiments the sensor system 12 includes a camera and/or capacitive sensors arranged on the peripheral device 54. The peripheral device 54 can be a dedicated body for the sensor system 12, e.g. a body to abut, in use, a workstation surface. The object 56 can include any object than may be arranged in the proximal field: other peripheral devices including another user interface device 10; other objects relevant to the user environment, e.g. a beverage or foodstuff container, smart phone, lamp etc. The object 56 can include the previously described positioning system (not shown) for determination of the arrangement of the user interface device 10 by the sensor system 12.

In certain embodiments, one or more cameras of the sensor system 12 of the peripheral device 54 provide images of the or each object 56 for rendering in the graphical environment 42. Said rendering may comprise a simplified image for the graphical environment, e.g. a representative tone is implemented represent the object. Said rendering may comprise an alternative image for the graphical environment.

Figure 11:
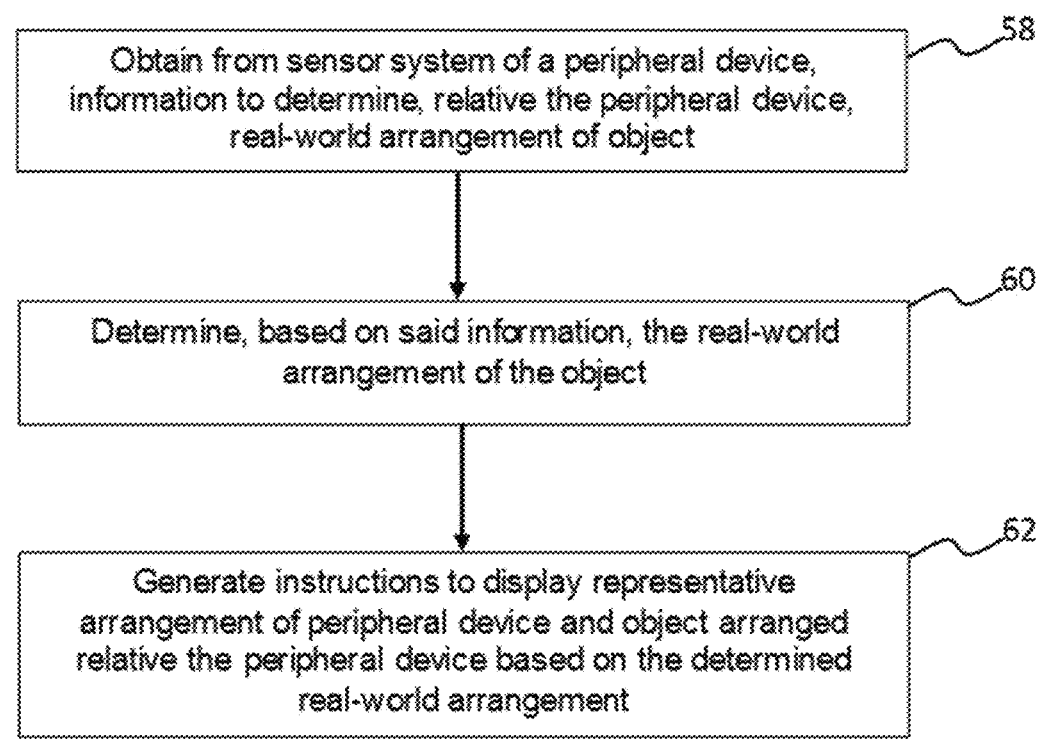
FIG. 11 is a flow chart showing an embodiment process for interfacing a user with a computer of the virtual reality environment system of FIG. 1A.

Referring to FIG. 11, a process of interfacing a user with a computer, which may be implemented by processor, may include, at block 58, obtaining sensor data from the sensor system 12 of a peripheral device 54. The process may include, at block 60, determining, based on said sensor data, the real-world arrangement of the one or more objects 56. The process may include, at block 62, generating instructions to inject into the virtual reality environment a representative arrangement of the peripheral device 54 and the one or more objects 56 arranged relative the peripheral device based on the determined real-world arrangement.

Sensors of the peripheral device 54 may provide information to determine a physical arrangement of the one or more objects 56 to a high level of accuracy. Other sensors (e.g., mounted to an HMD or other display associated with the computer 4) may, in isolation, not be capable of providing information with such accuracy. Moreover, using information from the sensor system 12 of the peripheral device 54 to determine the real-world arrangement of the one or more objects 56 may enable lower processing resources than said alternatively arranged sensor systems 12. The peripheral device 54 may relay position information (or the position information processed as said physical arrangement) of a plurality of objects 56 to the computer 4.

Layering

Referring to FIGS. 1 and 12-17, an embodiment system 2 to interface a user with a computer 4, which may implement aspects of the previously described system 2 or any other embodiment disclosed herein, includes a user interface device 10 including one or more input elements 44 to interface the user with the graphical environment 42.

A memory (not shown) can be communicatively coupled (e.g. for information transfer) to said processor 26 and/or 34 to store a plurality of different layers 64 to represent the user interface device 10 in the graphical environment 42 and/or a field proximal the user interface device 10 and/or a body part 6 interfacing with the interface device 10. The processor 26 and/or 34 may provide in said instructions one or more of the layers, e.g. the one or more different layers included in the instructions are selected from the plurality of different layers 46.

As used herein the term "layer" in reference to the graphical environment may refer to a two or three-dimensional representation of an object in the real-world and/or the virtual reality environment. The layer may be rendered from an image of a real-world object (which may be provided from the camera system) or otherwise representative, including by augmentation.

Figure 12:
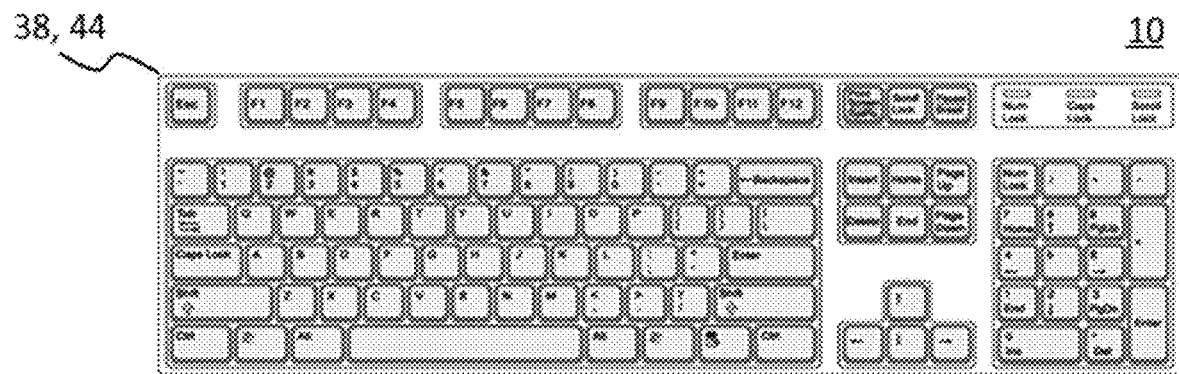
FIG. 12 is a plan view of an embodiment of a user interface device of the virtual reality environment system of FIG. 1A.

Referring to FIG. 12, a real-world representation of the user interface device 10, which implements aspects of the previously described user interface device 10 or any other embodiment disclosed herein, is arranged as a computer keyboard. The keyboard 10 includes input elements 44 of the I/O system 38 to interface the user with said graphical environment 42. The input elements 44 are arranged as mechanically actuatable keys. In variant embodiments there may be any number of input elements, e.g. one or more. Moreover, said input elements may take other forms include those disclosed herein. Input elements can be included in peripherals which provide enhanced functionality, such as a wheel that has input elements, or a joystick that has buttons and other input elements.

In certain embodiments, a user input device 10 is graphically represented as a series of "overlays" that are displayed in the virtual reality environment to the user on top of one another. The layers modularize the processing and modification of the virtual representation. A layer could be the surface area surrounding a keyboard, a layer can be the enlarged alphanumeric characters, a layer could be highlighting the alphanumeric characters the user is hovering over, a layer could be the hands of the user (semi-transparent, maybe only parts of the hands, etc.). The layers can be contextually relevant, meaning they can change based upon current virtual reality context or other stimuli. In certain embodiments, a user, in the VR environment, may separate the peripheral from the layers, expand the layers to see what has been augmented, and/or customize the layers based upon their preferences.

Layers which fit to the shape of the real physical keyboard can be added to augment the keyboard rendered in the virtual environment and make keycaps more visible and useable. Layers allow for a level of visual feedback (lighting up the augmented image of the key, in a variety of ways) when a key is pressed, as well as transforming the keyboard into a completely new augmented offering—like the emoji keyboard mentioned above, as well as solving localization issues.

The layers can be superimposed over a video image of the actual keyboard or other device from a camera. The alignment can be enhanced by searching for unique shapes on the keyboard, such as corners, a special alignment feature such as a cross-hair on a corner, or the activation of elements of the keyboard, such as lighting a key, frame, or other part of the keyboard and informing a tracking system of what has been illuminated. A keyboard or other device can be manufactured with features that enhance detection and alignment, such as lighting around the edges, high contrast between the keys and frame, etc. Also, particular key presses can be relayed back to the tracking system, so the fingertip and key being depressed can be identified from the image and used to update the alignment. Precision alignment can be prioritized in some embodiments for X, Z dimensions, and yaw, pitch rotation. There is typically less impact on alignment for the Y dimension, and roll is constrained for flat surface usage.

In certain embodiments, an opacity or transparency of each layer can be adjusted initially or dynamically to provide an optimum image. For example, key indicia may be made bright enough to show through a finger when it is pressed, but not otherwise.

Figure 13:
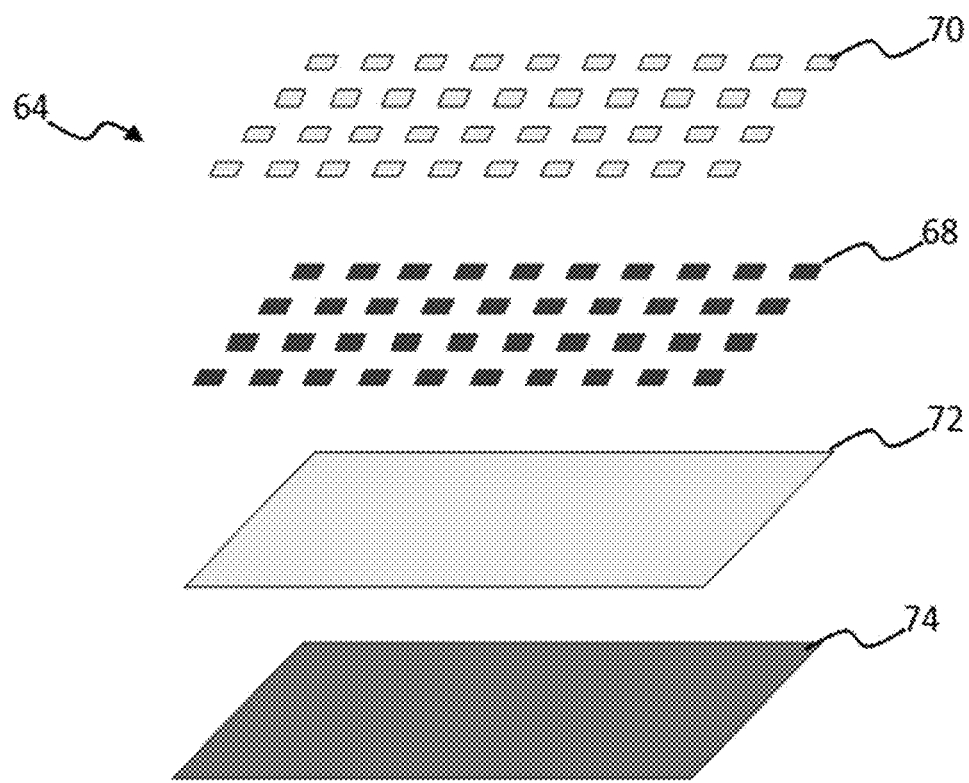
FIG. 13 is an exploded diagram showing an embodiment representation of the user interface device of FIG. 12 for a graphical environment generated by the system of FIG. 1A.
Figure 14:
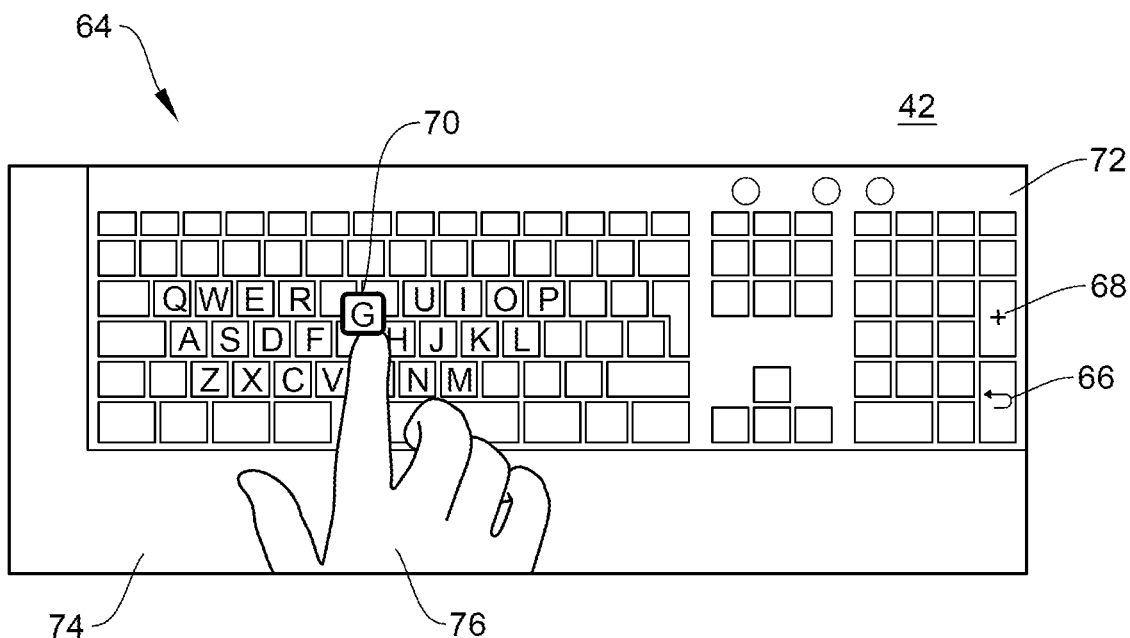
FIG. 14 is a schematic diagram showing an embodiment graphical environment to represent the user interface device of FIG. 12.

Referring to FIGS. 13-15, the layers 64 to represent the keyboard 11 can include one or more of the following: an indicia and input element layer 68 to represent one or more of the input elements and the indicia on the input elements as shown in FIG. 13 (alternately a separate indicia layer 66 may be used to show the indicia separately from the input element, such as a key indicia, as shown in FIG. 14); a feedback layer 70 to provide user feedback of a state of the one or more input element; a device body layer 72 to represent a body of the keyboard 10. A proximal layer 74 represents a field proximal to the user interface device 10 (e.g. the work surface, desktop, a mat or pad). It will be understood that the embodiment layer representation can be implemented with other user interface devices than a keyboard, including those disclosed herein.

The indicia layer 66 includes indicia to represent an input function associated with the or each input element 44 (the input function may be stored by the memory coupled to the processor). Referring to FIGS. 14 the indicia layer 66 comprise indicia as alphanumeric and other symbols. Referring to FIG. 15 the indicia layer 66 comprise indicia as emoji. In embodiments, other indicia of other indicia layers 66 include gaming macros (G-keys), 'hot' keys.

Referring to FIG. 14, some of the indicia of the indicia layer 66 can comprise the equivalent indicia to the indicia of the real-world user interface device 10 of FIG. 12 (e.g. the alphanumeric symbols) and some of the indicia of the indicia layer 66 are augmented or changed based on context, such as automatic triggers or user commands. The augmented or changed indicia thus comprise different indicia to the indicia of the real-world user interface device 10 of FIG. 12 (e.g. the windows key and the enter key). Referring to FIG. 15 the emoji are different indicia than the indicia of the real-world user interface device 10 of FIG. 12. Accordingly, in embodiments, the equivalent and/or different indicia can be mapped onto the indicia layer as on the real-world user interface device 10.

In embodiments where an input element does not provide any function in the virtual reality environment no indicia may be provided in the indicial layer 66, e.g. referring to FIG. 15 the input elements peripheral to those associated to the emoji do not have indicia. For example, the edges of the case of a keyboard may not have keys. In one embodiment, non-functional areas may be changed in appearance or have functionality added. Also, keys not currently usable in a given mode may be modified. For example, if the windows key isn't relevant, the windows key can be changed to something the user might deem useful, which in turn inherently means the functionality of the keyboard needs to be modified as layers are incorporated.

The real-world user interface device 10 may not include any indicia associated with the or each input element, wherein, as part of the virtual reality environment, the indicia are specified by the indicial layer 66. Examples of such a user interface device 10 include a keyboard that has keys without any symbols or a touch pad that has the indicial layer 66 specified to represent keys.

Other user input devices or peripherals may be represented by the same or different layers. For example, a mouse may be represented by an input element layer to represent the mouse buttons and scrolling wheel. A feedback layer modifies the appearance of the input element layer, such as by highlighting the button pressed, enlarging the button or scrolling wheel, a device body layer represents a body of the mouse, which can have its color, shape, etc. changed in the virtual reality environment. These layers can be curved, to correspond to the shape of the mouse. The layers can be continuous or discontinuous, and each layer can be broken into different, separately controlled and displayed portions, or multiple layers could be combined. A proximal layer represents a mousepad or work surface. Similar layers can be provided for a joystick, gamepad, steering wheel, or any other user input device, peripheral or object.

It will be understood that the function of the input element can be linked to the associated indicia of the indicial layer, e.g. as different indicial layers 66 are transitioned the function is correspondingly transitioned. For example, if alphanumeric keys are changed to emojis, the pressing of those keys by the user causes an emoji to be typed, not the alphanumeric character. Other augmentations or changes, such as highlighting or enlarging a key, do not change the function of the key.

In one embodiment, the layers are deconstructed from a camera image, suitably manipulated and augmented, then combined again for display in the virtual reality environment. This may be done as an initialization step, or periodically, such as after detecting the location of the user input device has changed. Alternately, stored images of one or more layers may be combined with the camera image of the input device, based on the obtained model number of the user input device. In one embodiment, the camera image is only used to determine location and movement, and the layers are entirely generated from a pre-stored image.

It will be understood that the input element layer 68 may be configured in a similar manner to the indicia layer 66, e.g. with some or all of the input elements 44 of the real-world user interface device 10 represented in the input element layer 68. In embodiments, the input elements may be represented in a different manner to their arrangement in the real-world, e.g., some input elements may not be represented in the input element layer 68 or some input elements with the same function may be combined as a larger input element in the input element layer 68.

The feedback layer 70 may provide user feedback of a state associated with of the one or more input element 44 that may be represented in the input element layer 68 and/or the indicia layer 66. The state may include that the associated input element 44 has been interfaced with (e.g. selected) or is contemplated for interfacing with by the body part of user 6. Interfacing and/or contemplated Interfacing of the input element 44 may be determined by the associated sensor of the I/O system 38 and/or the sensor system 12 (including a sensor system operatively connected to the user interface device 10, which may include a camera system and/or capacitive sensing system).

As user herein the term "contemplated interfacing" or "contemplated for interfacing" or "contemplated for selection" may refer to a user body part arranged in operative proximity to select or otherwise interface with an input element, e.g. a finger of a user hovers over a key prior to selection.

Referring FIG. 14, the feedback layer 70 can include a highlighted and enlarged representation of an associated input element and indicia (represented by the input element layer 68 and the indicia layer 66) of an input element that is contemplated for section by a body part (represented by a body part of a body part layer 76). In embodiments, the feedback layer 70 may implement various visual indicators of interfacing or contemplated interfacing, examples of which include one or more of the following: highlighting; lowlighting; enlargement; reduction; a color change, of all or part of a graphical representation of an associated input element and/or indicia.

The device body layer 72 may represent any portion of a body of the user interface device 10, including a peripheral surface (e.g. which forms a planform visible in use of the device to the user) and/or a cross-sectional portion of the device. A planform is the contour of an object as viewed from above.

Figure 16:
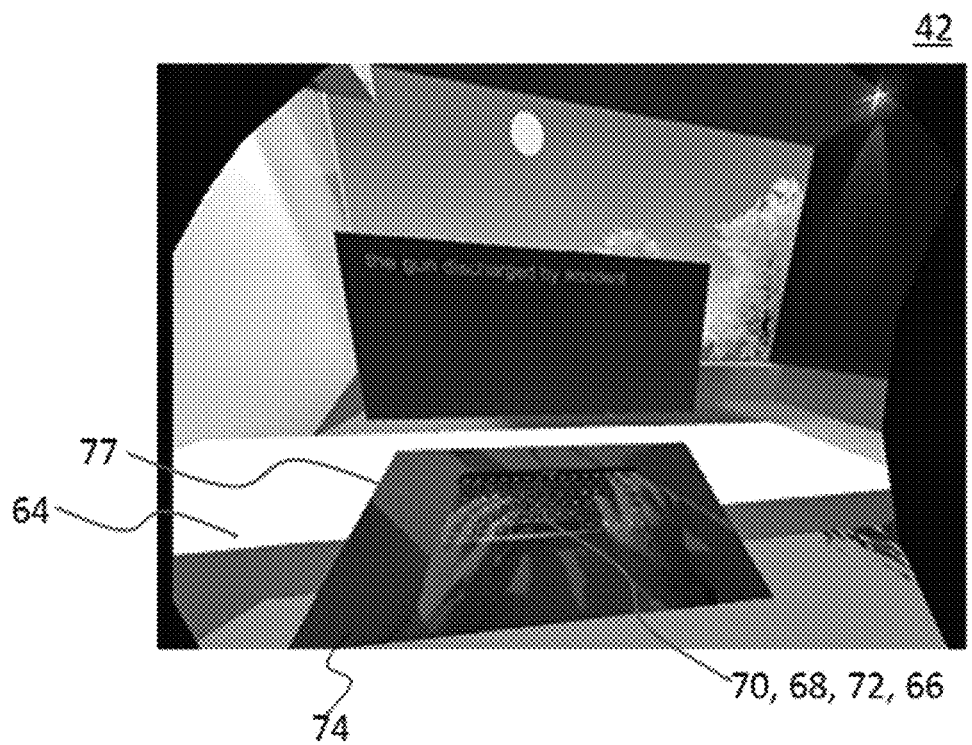
FIG. 16 is a schematic diagram showing an embodiment graphical environment to represent the user interface device of FIG. 12.

Referring FIGS. 14-16, the device body layer 72 can represent a planform surface, which is visible in use of the body of the keyboard 10, and is arranged around the input elements 44 thereof.

In embodiments, when representing other user interface devices 10, the body may include a wheel of an electronic steering wheel or a stick and/or base of a joy stick, a mouse, speaker, or any other user input device, peripheral or object. In certain embodiments, the device body layer 72 can represent only an operative portion of the user interface device 10, e.g. only the numerical entry portion of the keyboard 10 is represented. In certain embodiments, the body layer 72 can represent an alternative device other than the real-world user interface device 10, e.g. the keyboard 11 can be represented as an alternative peripheral device such as a game controller.

Referring to FIGS. 13-16, the layers 64 can include a proximal layer 74 to represent a field proximal the user interface device 10 as defined herein (e.g. the work surface, a mat or pad, etc.). The proximal layer 74 may thus include a representation of any of the previously described objects that may be arranged in said proximal field. In embodiments, the proximal layer 74 may include environmental media 77. Referring to FIG. 16, the environmental medial 77 includes light and/or shadows present in the real-world environment, including from daylight, room lighting or other ambient light. The objects and environmental media 77 and may be determined by the sensor system 12.

Referring to FIGS. 14-16 the layers 64 include a body part layer 76 to represent a body part 6. The body part may be represented in the body part layer 76 as discussed previously. A layer can be provided that is responsive to motion, such as an interactive space which allows users to manipulate objects (e.g., totems or VR images), using the sensor system.

Referring to FIGS. 14-16, various layers 64 can be superposed on each other. Referring to FIG. 16 the body part layer 76 can be represented as partially transparent, through which other layers are visible. Accordingly, in embodiments, one or more of the layers 64 may by represented as partially transparent, wherein: a partially transparent layer may be superposed on another layer (which may be another partially transparent layer or a solid layer); and/or a layer (which may be a solid layer) is superposed on a partially transparent layer.

In certain embodiments, one or more of the layers can represent different positions of a depth direction associated with the user interface device 10, e.g. a solid base layer is superposed by other layers of increasing transparency based on depth. Alternately, as described above, the layers correspond to different functions, such as input elements or keys, which may extend down inside another layer, such as a device body layer.

In certain embodiments, various combinations of one or more of the layers 66-76 or other layers can be provided in non-transitory computer-readable media accessed by instruction running on a processor. In certain embodiments, one or more of the layers 64 are stored on a memory of the user interface device 10, and may be transferred to the computer 4 for processing. In certain embodiments, one or more of the layers 64 can be stored on a memory associated with the computer 4 and can be obtained following identification of the user interface device 10, e.g. by means of a database, which may have a key-value or other suitable implementation. The user interface device 10 may be identified by techniques including one or more of the following: transmitting a unique identifier to the computer 4 (which may be used as the key); by image processing of an image, which may be obtained by the camera system; a positioning system as previously discussed.

In certain embodiments, the processors 26, 34 may partially or fully generate one or more of the layers based on images of the user interface device 10, which may be obtained from the camera system. In certain embodiments, the user interface device 10 may be adapted to facilitate said generation of the one or more layers. Said adaption may include the formation of a non-reflective surfaces and/or surfaces which are convenient to identify.

In certain embodiments, the one or more layers 64 can be arranged representative of the real-word arrangement of the associate object. The body part layer may include representative arrangement of the body part 6 based on the determined real-word arrangement of the body part 6. The body part of the body part layer and the layers representing the user interface 10 may be arranged an equivalent position to that in the real-world, including in the field of view in the graphical environment 42 equivalent to that in the field of view in the real-world environment. The sensor system 12 for determining the real-world arrangement of the body part 6 and/or user interface device 10 may be operatively connected to the user interface device 10 as previously discussed.

In certain embodiments, one or more of the layers 64 can be user customisable, an example includes the indicia of the indicial layer 68 may be selected by the user and/or the configuration of the feedback layer 70 may be selected by the user.

In certain embodiments, one or more of the layers 64 are fitted to the real-world arrangement of a portion of the user interface device 10. An example includes the Input element layer 68 being fitted to keys of a keyboard and the body layer 72 fitted to the periphery of a keyboard.

In embodiments, the instructions may include or transition one or more of the layers 64 based on a trigger. "Transition" may refer to changing the representation of one or more layer from a first representation to a second representation (e.g. in the instance of the indicia layer 66 a first representation may include the indicia as alphanumeric and other symbols as shown in FIG. 14 and the second state may include the indicia as emoji as shown in FIG. 15). In certain embodiments, the trigger can include one or more of the following (which may be determined by the processor 26, 34).

A configuration of the user interface device 10, which may include determination of a type of user interface device 10. The type of the user interface device 10 may be determined by identification of the user interface device 10 as discussed previously. The type of the user interface device 10 may relate to the form factor of said device.

An arrangement of the user interface device 10, which may include a location of the user interface device 10, examples of locations include the arrangement of the user interface device 10 on a work surface (e.g. a keyboard) or held by the user (e.g. a game controller). Arrangement may include the real-world arrangement of the user interface device 10, including an orientation of the device. The orientation may be relative a reference point (e.g. the HDM 8 or other element of the user), examples include an orientation of the device which may be defined by an alignment of a longitudinal axis of the user interface device 10 (e.g. aligned vertically or pointing away from the user)

A proximity of an object associated with the system 2. Proximity may be with reference to the user interfaced device 10, e.g. the proximity of the object to the said device 10 (which may be determined using the sensor system 12 arranged on the user interface device 10). The object may be as previously defined. Proximity may include the previously defined proximal field. An example includes the user interface device 10 arranged in operative proximity an object arranged as an interoperable user interface device, wherein input element functionally its transferred/shared between the devices.

A contextual event, which may be related to the virtual reality environment (e.g. a particular stage in a VR game) or other computer implemented notification including the receipt of a message or email). A contextual event may also include the environmental media 77.

A user interaction with the system, which may include a gesture that may be made by fingers/hand. The gesture may include a characteristic movement of the hand, including a hand swipe or finger moment (e.g. to press an input element). The gesture may include a characteristic shape made by the hand, such as natural hand movements for grasping, pointing, pulling apart, etc. An example of a gesture includes a moving their finger to make a selection of an input element 44 of the user interface device 10. In other embodiments, the user interaction includes input determined from the I/O system 38 of the user interface device 10 via the user interfacing with of one or more of the input elements 44.

User configured, which may include the user configuring the configuration of one or more of the layers 64 and/or their transition, Inclusion and transition of the one or more of the layers 64 in the instructions based on a trigger will now be exemplified for the various triggers defined above.

In certain embodiments, modification or generation of one or more of the layers 64 may be triggered based on the user interface device 10 being identified, e.g. as a game controller or keyboard or other user interface device. One or more of the indicia layer 66, input element layer 68, feedback layer 70, device body layer 72 may be configured to overlay the real-world device.

In certain embodiments, instructions for one or more of the layers 64 may be triggered based on the user interface device 10 determined as arranged on a work surface, e.g. the proximal layer 74 is arranged to represent the work surface, as previously discussed.

In certain embodiments, for a keyboard 10 (or other user interface device) determined as transitioned from abutment with a work surface to being held by a user, the instructors for the one or more of the indicia layer 66, may be accordingly transitioned (e.g. to represent input elements 44 with reduced functionality) since a user may be unable to use both hands to type.

In certain embodiments, instructions for one or more of the layers 64 may be triggered based on the other user objects 56 determined as in the proximal field the user interface device 10 (e.g. by the previously described sensor system 12 arranged on the user interface device 10). In certain embodiments, wherein the objects 56 are interoperable user interface devices, one or more of the indicia layer 66, input element layer 68, feedback layer 70 of the user device 10 may be transitioned as input function is transferred to/from the interoperable user interface devices, e.g. a joystick wheel is arranged proximal the keyboard, wherein the keyboard transfers/shares functionality of the cursor keys to the stick).

In certain embodiments, the proximal layer 74 is transitioned to represent objects 56 therein. In an embodiment one or more of the objects 56 are represented by layers 64 as defined herein in a similar manner as for the user interface device 10.

In certain embodiments, the virtual reality environment or notification that requires alphanumeric entry and one or more of the indicia layer 66, input element layer 68, feedback layer 70 (or other layer) is transitioned to represent input elements for said alphanumeric entry.

In certain embodiments, a gesture (e.g. a swipe) is used to transition the indicia layer 66 as alphanumeric and other symbols as shown in FIG. 14 to the indicia as emoji as shown in FIG. 15. It will be understood that various gestures may be used to transition of one or more of the layers 64 to various representations.

Figure 17:
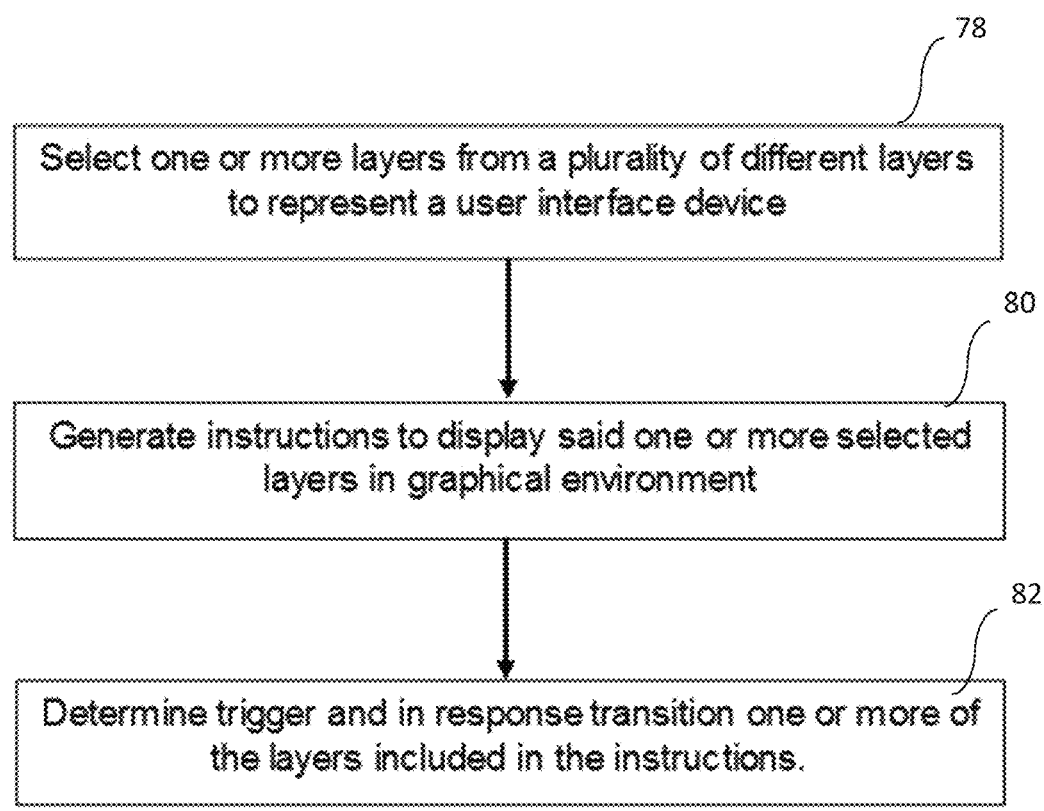
FIG. 17 is a flow chart showing an embodiment process for interfacing a user with a computer of the virtual reality environment system of FIG. 1A.

Referring to FIG. 17, process of interfacing a user with a computer, which may be implemented by the processor may include, at block 78, selecting one or more layers from a plurality of different layers 64 to represent a physical user interface device 10 in graphical environment 42 of a virtual or augmented reality virtual reality environment. The process may include, at block 80, generating instructions to display said one or more selected layers in the graphical environment 42. At block 82, the method may include determining a trigger and in response transitioning one or more of the layers included in the instructions.

Peripheral-Centric Augmented Workstation Environment

In some embodiments, a peripheral-centric augmented reality workstation environment can be realized using an AR/VR system. Some systems, including some of those described above, may be configured to render an augmented reality workstation environment that is aligned relative to a user. For instance, some embodiments can render video content in an augmented reality or virtual reality environment based on a location of a user or an HMD (see, e.g., FIG. 1D). That is, virtual displays, virtual objects, and/or other AR/VR rendered virtual content can be rendered to appear to be located at certain positions when displayed to a user.

A peripheral-centric augmented reality workstation environment may be alternatively configured to distribute various content relative to a peripheral device (e.g., keyboard, mouse, stylus, hub, etc.), rather than relative to an HMD. By way of example, some embodiments of an augmented reality workstation environment may be configured to determine a location of a physical peripheral input device (e.g., keyboard) within a physical environment and determine, based on the location of the peripheral input device within the physical environment, a location and/or orientation of a virtual display (e.g., via an HMD) to render to a user of the peripheral input device. A virtual display can be separated and distinct from the corresponding peripheral input device. For example, a virtual "television" or other display can be rendered as appearing to be located on a wall or at a distance for a user of an peripheral input device. In some aspects, the orientation and/or location of the display can remain at a fixed, perceived spatial relationship with respect to the peripheral device as the peripheral device moves within the physical environment. For instance, if a user picks up the peripheral device from one location and moves it to a second location, the display may maintain its perceived fixed position relative to the peripheral device. Some displays may be "sticky," such that a small movement of a peripheral device (e.g., resituating a keyboard by 20 cm on a surface) may not cause a display to move, but larger movements (e.g., 3 m) may prompt the display to move in a fixed manner, as further discussed below.

Some embodiments may employ additional interactive displays that may also be rendered in locations relative to the peripheral device. These different types of displays can be rendered in different designated areas, or "zones" depending on their intended content and use. For instance, content that is intended to be interacted with by a user may be configured in a location that is easily accessible by the user (e.g., on or near the peripheral device), while content that is typically only intended for viewing may be configured farther from the peripheral device at a preferable viewing distance. The following embodiments depict these aspects in further detail, and one of ordinary skill in the art would appreciate that any of the embodiments depicted and/or described throughout this document, or portions thereof, can be combined in any suitable manner, and accordingly any one embodiment should not be interpreted as a limiting combination of features.

Figure 18:
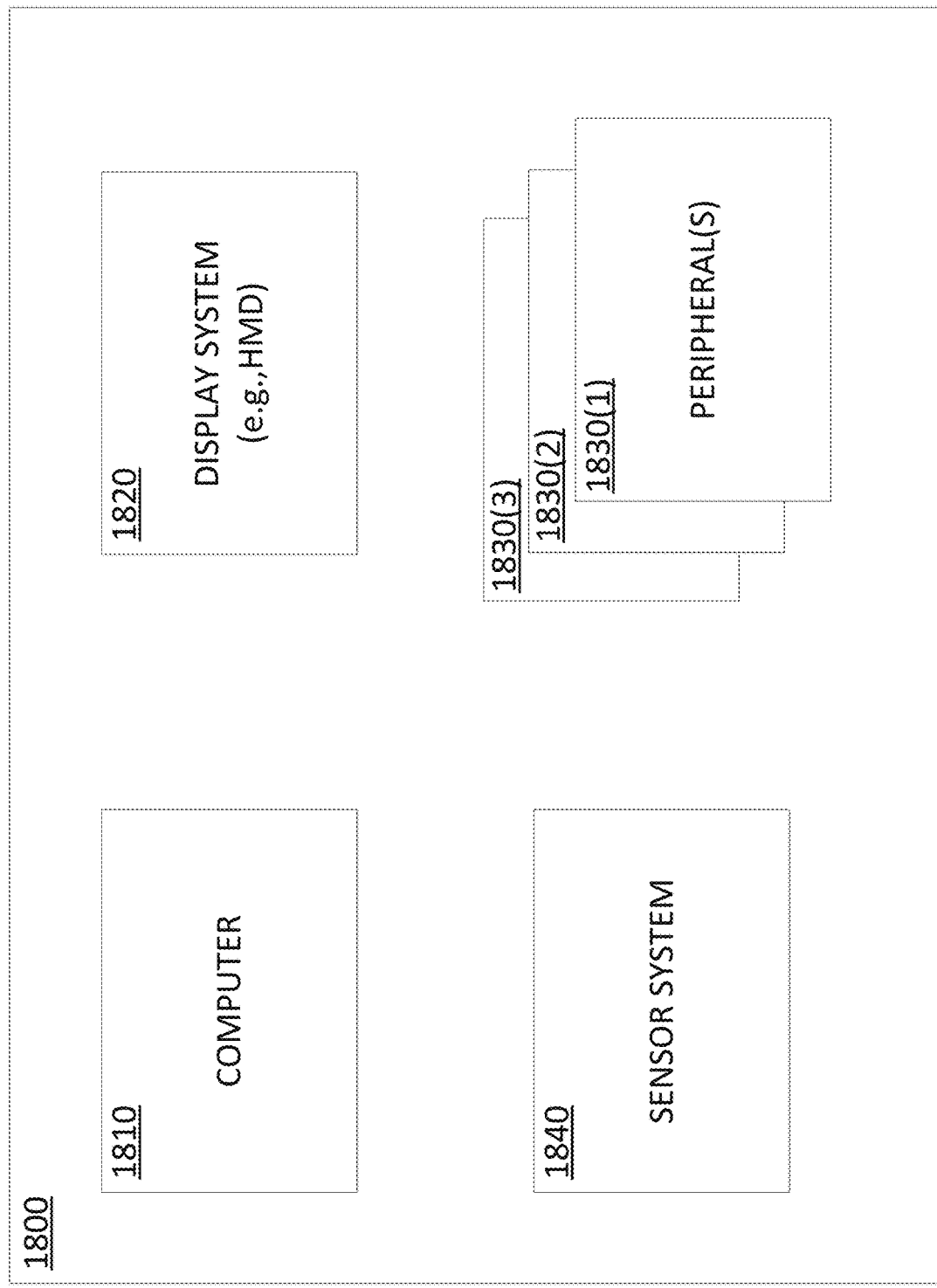
FIG. 18 shows a simplified diagram of a peripheral-centric augmented workstation environment (AWE), according to certain embodiments.

FIG. 18 shows a simplified diagram of a peripheral-centric augmented reality workstation environment (AWE) 1800, according to certain embodiments. AWE 1800 can include computing system 1810, display system 1820, sensor system 1840, and peripheral device(s) 1830(1-n). Computing system 1810 can be capable of providing an augmented/mixed/virtual reality environment to a user via display system 1820. Display system 1820 can be embodied as an HMD, virtual reality display, holographic imaging device, or other display capable of providing computer-rendered images to a user. The one or more peripheral devices 1830 (1-n) can be a physical user interface device configured to enable a user to interface with the augmented workstation environment facilitated by computer 1810. As indicated above, typically one of the peripheral devices 1830 can be used as a reference point to arrange one or more virtual displays to a user. Sensor system 1840 may sense and provide position and orientation information to computer 1810, including a location of the one or more peripheral devices, the user, body parts of the user (e.g., location of head, hands, arms, etc.), physical characteristics of the physical environment around the one or more peripheral devices (e.g., location of surfaces, walls, objects, obstructions, etc.), and the like, as further described below.

Computer 1810 can include a host processor, which may include a microprocessor, multiple processors and/or co-processor chips, and/or digital signal processor (DSP) capability, or the like. A system clock (not shown) may be coupled to or part of host processor 30 to provide timing data. Computer 1810 may include an audio system including audio output devices to provide audio to a user, as would be appreciated by one of ordinary skill in the art with the benefit of this disclosure. Display system 1820 may display images of a simulation, game environment, operating system application or other images associated with the simulation. As shown in the forthcoming figures and corresponding description, display system 1820 can render images of an augmented workstation environment. Display system 1820 may be part of an HMD, forming/displaying the augmented workstation environment, or display system 1820 may be a separate secondary display device (e.g., holographic display device) to allow configuration of the system by the user without needing to wear the HMD, or configuration of the system by any other person, or to allow a secondary non-VR display of the virtual reality environment, e.g., for observational, run-time configurational, safety or any other purpose(s). Computer 1810 may include other known components, such as random access memory (RAM), read-only memory (ROM), and input/output (I/O) systems, and the like, as would be appreciated by one of ordinary skill in the art.

Computer 1810 may implement an application program, which may be a simulation program for generation of the augmented workstation environment. The user may interact with the program via peripherals 1830 (e.g., keyboard, mouse, stylus, etc.). The application program may include multiple rendered displays arranged relative to a peripheral device to display an office productivity environment, a gaming environment, an interactive digital location (e.g., home, virtual store, sporting arena, etc.), medical procedure simulation, computer-aided design applications, or other type of virtual arrangement of interfaces. The application program may comprise or access an external database, such as over a network. The application program may be implemented as one or more modules or other functional units. Herein, for simplicity, operating systems such as Windows™, Android; IOS; MS-DOS, MacOS, Linux, etc., are also referred to as application programs as may be device drivers for hardware associated with the computer. Typically, the application program can be capable of providing instructions for the generation of a graphical environment on display system 1820. It may provide images to be displayed on display 6 of HMD 18 and may output other feedback, such as auditory or vibration (haptic) signals. The application program may be operable to check for input signals from peripherals 20 and provide the corresponding output. The application program may interface with the HMD 18 and/or other peripherals 20 via a device driver, whereby the device driver communicates with the device through electronic circuitry of I/O system 38.

Computer 1810 may be embodied in a personal computer, workstation, laptop or server, such as a PC compatible computer, Apple® personal computer, smart device (e.g., smart phone, smart watch, etc.), a standalone HMD system, a tablet computer, or other suitable computing system. Computer 1810 may be operable under the Windows™, MacOS™, Unix™, or MS-DOS™ operating system or the like.

In some embodiments, sensor system 1840 may include an object tracking system having a camera system, such as one of more of a: 2D camera; a 3D camera; an IR camera; a time of flight (ToF) camera, or the like, which may utilize CMOS, CCD, IR, or other suitable type of image sensors. Sensor system may further incorporate touch sensing capabilities, which may include capacitive-based and/or resistor-based touch sensors (FSR), or the like. Touch sensors generally comprise sensing elements suitable to detect a signal such as direct contact, electromagnetic or electrostatic fields, or a beam of electromagnetic radiation. Touch sensors can typically detect changes in a received signal, the presence of a signal, or the absence of a signal. A touch sensor may include a source for emitting the detected signal, or the signal may be generated by a secondary source. Touch sensors may be configured to detect the presence of an object at a distance from a reference zone or point (e.g., <5 mm), contact with a reference zone or point, or a combination thereof. Further aspects of sensor system 1840 are further described below. Some examples of the types of touch/proximity sensors may include, but are not limited to, resistive sensors (e.g., standard air-gap 4-wire based, based on carbon loaded plastics which have different electrical characteristics depending on the pressure (FSR), interpolated FSR, etc.), capacitive sensors (e.g., surface capacitance, self-capacitance, mutual capacitance, etc.), optical sensors (e.g., infrared light barriers matrix, laser based diode coupled with photo-detectors that could measure the time of flight of the light path, etc.), acoustic sensors (e.g., piezo-buzzer coupled with microphones to detect the modification of a wave propagation pattern related to touch points, etc.), or the like.

Peripheral(s) 1830(1-n) can include a keyboard, computer mouse, audio devices (e.g., speakers), stylus/touch devices, presenter devices, touch pads, camera-based devices (e.g., a webcam), printers, or the like. The embodiments that follow describe the use of certain physical peripheral devices, however it should be understood that these examples are not intended to be limiting, and that one of ordinary skill in the art would appreciate how any suitable type or number of peripherals could be integrated into an augmented workstation environment, as shown and described.

Although certain systems may not expressly discussed, they should be considered as part of AWS 1800, as would be understood by one of ordinary skill in the art. For example, AWS 1800 may include a bus system to transfer power and/or data to and from the different systems therein. In some embodiments, AWS 1800 may include a storage subsystem (not shown). A storage subsystem can store one or more software programs to be executed by processors. It should be understood that "software" can refer to sequences of instructions that, when executed by processing unit(s) (e.g., processors, processing devices, etc.), cause AWS 1800 to perform certain operations of software programs. The instructions can be stored as firmware residing in read only memory (ROM) and/or applications stored in media storage that can be read into memory for processing by processing devices. Software can be implemented as a single program or a collection of separate programs and can be stored in non-volatile storage and copied in whole or in-part to volatile working memory during program execution. From a storage subsystem, processing devices can retrieve program instructions to execute in order to execute various operations (e.g., software-controlled spring auto-adjustment, etc.) as described herein.

Display "Zones" Configured Relative to a Peripheral Device in an AWE

In some embodiments, one or more displays may be rendered in an augmented reality workstation environment using a physical peripheral device as a point of reference. For example, one or more rendered displays may be configured within different areas (referred to herein as "zones") positioned at locations relative to a particular peripheral device. As used herein, the zones may be physical areas that content rendered to a user of an augmented reality workstation may appear to be within. Some displays may be intended for visual data consumption and may be configured farther from the user, while other displays may be intended to provide interactive capabilities and are configured closer to the user (e.g., on or adjacent to the physical peripheral device). The interactive zones may be positioned to enable a user to touch the interactive displays with a peripheral, appendage, etc. Some examples of the use of "zones" in an AWE are further described below.

Figure 19:
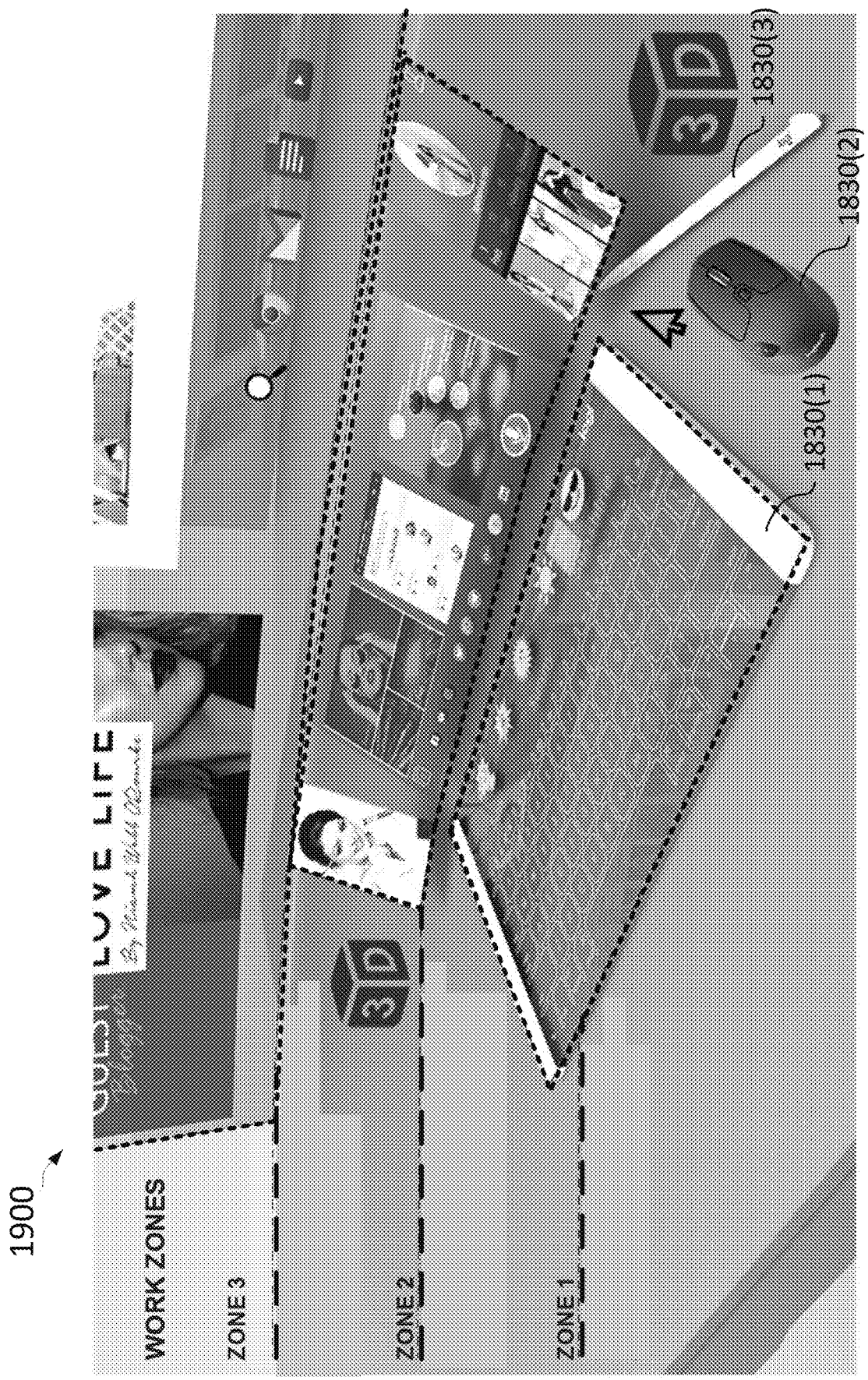
FIG. 19 shows an example of an augmented workstation environment, according to certain embodiments.

FIG. 19 shows an example of an augmented workstation environment 1900, according to certain embodiments. The AWE can include a number of displays of varying size and location depending on their intended use. Referring to FIG. 19, certain types of displays are rendered in areas defined as "zones" (e.g., "zone 1," "zone 2," "zone 3", . . . ), which are configured at locations relative to a physical peripheral device (e.g., keyboard 1830(1)). The physical peripheral device that is used as a reference point will be referred to as the "reference peripheral." Each zone may be arranged in any suitable location and may be configured to span across any suitable area or volume within 3D space relative to the reference peripheral. In some cases, as the reference peripheral moves in real 3D space, the zones and corresponding visual content may move accordingly, relative to the reference peripheral. That is, each zone may be fixed to a set spatial relationship relative to the reference peripheral, such that the reference peripheral and the one or more displays rendered in zones 1-3 appear to move as a singular interconnected system. AWE 1900 may include some or all elements of AWE 1800, and certain examples provided herein may refer to both systems interchangeably.

In some embodiments, placing the reference peripheral on a surface may cause AWE 1900 to switch to a "wake" state and render the plurality of displays in zones 1-3 in HMD 1820. Placement detection can be achieved in any suitable manner including via a physical switch or sensor (e.g., pressure sensor, IMU) on the reference peripheral. Alternatively or additionally, one or more sensors (e.g., visual sensors, ultrasonic sensors, IR sensors, etc.) from sensor array 1840 may be used to determine when the reference peripheral is placed on a surface. Conversely, lifting the reference peripheral off of a surface may cause the AWE 1900 to switch to a "sleep" or shutdown state. In some cases, lifting and moving a short distance (e.g., 30 cm) may not initiate a shutdown state, as further described below. In certain embodiments, in addition to the previously described "sleep" and shutdown states, a travel or other state change can occur. For example, entering a travel state may collapse or otherwise rearrange virtual displays presented to a user of AWE 1900. When the user enters an area wherein they can resume interacting with a virtual display using the peripheral input device, the virtual displays may return to a previous position. If, however, the user has entered a new environment, virtual display(s) may take a different position/orientations. For example, if a user moves from an office environment to a train, virtual displays may be minimized and/or superfluous virtual displays may be removed. Different states may be triggered depending on various criteria. For example, a peripheral device may be reconfigured (for example, a collapsible keyboard may be collapsed or a hand held peripheral may be lifted from a work surface). While in different state(s) different input sensors and/or input schemas may be used. For example, gestures may be relied upon more heavily while in a travel mode as opposed when working within an office.

Alternatively or additionally, different states may be triggered based on a proximity detection of a user (e.g., near the reference peripheral), detecting a user's hand's on the reference peripheral (or other peripheral device in AWE 1900), or the like. The sensing can be performed by one or more sensors (e.g., vision-based, touch-based, ultra-sound, IR, audio-based, etc.) on the reference peripheral, secondary peripheral devices, computer 1810, display system 1820, or any combination thereof, as would be appreciated by one of ordinary skill in the art with the benefit of this disclosure. In some embodiments, the reference peripheral can include tracking features (e.g., sensors, LEDs, fiducial mark(s)) for locating within a physical environment. For example, reference peripheral can be tracked from the HMD, from its own on-board sensors (e.g., via IMU), or a combination thereof. Thus, state change conditions may be triggered automatically in response to reference peripheral 1830(1) detecting a user's presence, receiving user inputs, detecting placement on a suitable work surface (e.g., based on dimensions and nearby walls, obstructions, open space, etc.), or the like.

In some embodiments, "zone 1" may be associated with a region on (e.g., overlaid) or near/adjacent to the reference peripheral (e.g., keyboard 1830(1)), as shown in FIG. 19. Zone 1 can be associated with physical peripheral device(s) that a user may physically interact with. Physical peripheral device(s) within zone 1 may be augmented with virtual content. For example, keyboard 1830(1) may include a number of depressible keys but no printed insignia on each key. In some embodiments, a display system (e.g., HMD) may overlay virtual alphanumeric characters over each key in any suitable language. In some cases, the overlay may be contextual such that the virtual alphanumeric layout may be a first set of rendered characters and numbers when accessing a first application (e.g., office productivity software), or a second set of rendered characters and numbers when accessing a second application (e.g., CAD software). Alternatively or additionally, different key layouts may be shown on the reference peripheral in response to a physical command (e.g., pressing a function key), or other trigger (e.g., voice command, a command generated on another peripheral device (e.g., mouse 1830(2), stylus 1830(3), etc.). In some aspects, other interactive symbols or non-interactive displays can be superimposed (overlaid) on reference peripheral 1830(1), including emojis, application shortcuts, or the like.

Certain embodiments may employ a physical touch sensitive surface (e.g., touch pad) to receive a user input. Some embodiments may include additional sensors in reference peripheral 1830(1) to detect the presence and/or location of other peripherals 1830(2-n) relative to reference peripheral 1830(1), or define a region within or adjacent to zone 1 that can be designated for receiving a user input (e.g., movement of a finger or stylus along a surface adjacent to reference peripheral 1830(1). For instance, vision-based sensors can be used to detect when a user's hand moves within a particular location on a surface adjacent to keyboard 1830(1) (e.g., a mini-zone adjacent to zone 1). Thus, a section of an otherwise inert surface (e.g., a table top) may operate as a high precision touch sensitive and/or proximity sensing surface. Further, the designated touch area may maintain its spatial relationship (e.g., remain fixed) with respect to reference peripheral 1830(1).

As mentioned above, one or more sensors coupled to reference peripheral 1830(1) can be used to track a location of one or more additional peripheral devices 1830(2-n), with reference peripheral 1830(1) operating as a point of reference. Thus, reference peripheral 1830(1) may operate as a central hub with its own dedicated tracking system. This may present certain advantages over systems that track multiple peripherals from a conventional HMD or lighthouse-based system. For example, the additional sensors may provide higher fidelity tracking than may be possible from HMD-tracking resources. In some cases, offloading the tracking of additional peripheral devices to the hub, and relaying that tracking information to the computer system 1810 and/or display system 1820 (e.g., to fuse both tracking coordinate systems) may relieve the computer system and/or display system 1820 or processing bandwidth. The reference peripheral input device may include features for determining the location of the physical peripheral input device within the physical environment by a tracking system and the tracking system can be used to determine an orientation of a physical display used to render the first virtual display. In some embodiments, the features can be selected from a list including a sensor, an emitter, and a marking. The sensor can be configured to detect or the emitter can be configured to emit: visible light, infrared light, ultrasound, magnetic fields, or radio waves. In some cases, the physical peripheral input device can include a plurality of the features to enable the physical peripheral input device to be tracked within the physical environment by any one of a plurality of tracking techniques. The physical peripheral input device may include an inertial measurement unit (IMU) and the location of the physical peripheral input device within the physical environment can be determined using the IMU. In certain embodiments, the orientation of the first virtual display can be determined based on a determined identity of the user of the physical peripheral input device and wherein the orientation of the first virtual display would be rendered differently for a differently identified user.

In some embodiments, "zone 2" may correspond to one or more areas adjacent to or near zone 1 that may be designated to render interactive display information within reach of the user. As shown in FIG. 19, zone 2 may include interactive tools and content such as tool alterations, mode changes, emoji, chat boxes, application launch buttons, etc. In some cases, the reference peripheral may include physical areas (e.g., protruding surfaces) that may be dedicated for the projection of interactive displays. The physical areas with virtual interactive overlays may include dedicated physical switches, touch sensitive surfaces and areas with interactive haptics (e.g., over-air haptics, piezo-based haptics, etc.), sensors to track in-air movement above the reference peripheral, or the like, to further augment the user experience. Zone 2 may be configured on physical areas or in 3D space (as shown in FIG. 19) that is preferably within reach of a user that is accessing reference peripheral 1830(1). Zone 2 may be configured on the same plane as reference peripheral 1830(1) or a different plane (as shown). Zone 2 may be a volumetric space, as opposed to a planar region, and can be configured in any suitable manner. In some cases, the boundaries defining the one or more zones can be customized by a user, auto-arranged by AWE 1900 (e.g., based on the visual content), set at a default size and location, or a combination thereof. Typically, zone 2 (and zone 1 in some instances) include a collection of interactable elements that can be interfaced via a user's hands, gaze, voice, a cursor, or the like, and may include drag-and-drop functionality (e.g., locally and with other zones), haptics, touch detection capabilities (e.g,. via a dedicated physical dock or designated sensed area), or the like.

In some embodiments, "zone 3" may correspond to one or more regions designated for visual consumption that may not require user interaction, similar to a physical monitor in some workstation environments. Referring to FIG. 19, zone 3 includes a number of displays distributed along its defined region. Zone 3 may extend laterally in an arc for a wraparound visual environment, which can be ergonomically beneficial for the user. In some cases, zone 3 may be a volumetric space to allow content to be moved closer or further back from the user. For example, AWS 1900 may detect when a user moves their head closer to the virtual displays and cause displayed content in zone 3 to move closer to the user, which can effectively reduce the distance that the user has to move forward. Alternative or additionally, detecting that the user (e.g., HMD) is moving closer to zone 3 may cause content in zone 3 to auto zoom at a proportional amount relative to the HMD movement. In some cases, the user may be simply moving their seat closer or farther form the reference peripheral (thus, moving the HMD a similar distance), which may cause AWE 1900 to move content in zone 3 (or from other zones) closer or farther to maintain a viewing distance. Note that in such cases, the zones are still projected relative to the reference peripheral and not the HMD, however the HMD may be a factor is determining where to position the one or more zones for an improved viewing experience. Zone 3 can typically include multiple displays distributed thereon, interactive 2D and 3D displays/objects, interaction via gaze, cursor, voice, and the like.

In some embodiments, a "zone 4" may be defined as an area (e.g., plane or volumetric area) to share virtual content to make for a collaborative environment between users. For example, each user may have their own reference peripheral (e.g., keyboard) and corresponding zones 1-3, however a zone 4 may be shared by all. Users may select and move content to and from zone 4 using a mouse, stylus, or other interactive peripheral device.

The location of zones may be determined by computer 1810, by reference peripheral 1830(1), by display system 1820, or a combination thereof using sensor resources from any resource of AWE 1800. For example, reference peripheral 1830(1) may utilize on-board sensor or leverage sensor resources from computer 1810 and/or display system 1820 to poll its environment and determine where boundaries, open areas, surfaces, and obstructions are located, for instance. In some cases, content presented to the user via the rendered interactive virtual display can be selectable by the user to modify an operation corresponding to use of the physical peripheral input device by the user, and where the interactive virtual display can be rendered to appear to the user to be in proximity to the physical peripheral device. The operation corresponding to use of the physical peripheral input device by the user may include changing a command corresponding to actuation of an input element of the physical peripheral input device, changing an appearance of the physical peripheral input device, an appearance of an input element of the physical peripheral input device, and/or changing a relationship between one or more rendered virtual displays and the physical peripheral input device. In some cases, the orientation of the interactive virtual display can be rendered to appear to the user to be at a location that is integrated on or within a periphery of the physical peripheral input device, or the interactive virtual display can be rendered to appear to the user to be located on an area of the physical peripheral input device including features that supplement functionality provided by the interactive virtual display. In some embodiments, the features may include haptic feedback generated by a haptic feedback generator integrated within the physical peripheral input device to provide haptic feedback in response to user interaction with the interactive virtual display. The features can include a physical input element and where the content of the interactive virtual display is rendered to appear to the user to be selectable by the user by actuation of the physical input element. The interactive virtual display can be rendered to appear to the user to be located in an area in proximity to the physical peripheral input device. The content can be determined to be selected by the user, without physically contacting the physical peripheral input device, by a sensor of the physical peripheral input device. In some cases, content presented to the user via a rendered display can be selectable by the user of the second physical peripheral input device to modify an operation to use of the second physical peripheral input device by the user of the second physical peripheral input device, and the second interactive virtual display can be rendered to appear to the user of the second physical peripheral input device to be in proximity to the second physical peripheral input device. In certain embodiments, the interactive virtual display can be rendered to appear to the user to be at a spatial location determined, at least in part, based on a biomechanical model of the user to enable the user to reach the interactive display with an appendage Environment Detection and User Profiles In some embodiments, AWE 1900 may auto-adapt to various usage scenarios and/or media content. For example, upon detection that the reference peripheral is placed on a desk, a 3 zone, 3 monitor mode of operation may be rendered, as shown for example in FIG. 19. In another example, a user may place the reference peripheral on a small surface in close quarters, such as on a seat tray on an airplane or in a coffee shop. In these cases, zones may be configured such that the user is not looking directly at other people in the same line-of-site, visually distributed within a smaller radius relative to the reference peripheral, change the number of zones, limit the size of content, or the like. For instance, in the coffee shop example, zones 1 and 2 may remain relatively unchanged, however zone 3 may be directed downward, limited to a smaller area, and orientated at a different viewing angle relative to the reference peripheral. The sensing of the surrounding physical environment can be performed by one or more sensors (e.g., vision-based, touch-based, ultra-sound, IR, etc.) on the reference peripheral (e.g., operating as a hub, as further described below), secondary peripheral devices (non-reference peripherals), computer 1810, display system 1820, or any combination thereof, as would be appreciated by one of ordinary skill in the art with the benefit of this disclosure.

In some embodiments, a user profile may be configured for each user, which may include content display locations, control schemas, and the like. For example, a first user may be relatively short and each zone can be configured in a location that is ergonomically beneficial to that user's relative size. Zone 2 may be positioned closer to the reference peripheral to accommodate the user's corresponding biomechanical range. Likewise, a second user that is relatively tall may have a user profile that accommodates that user's relative size. In some cases, a user profile may arrange one or more zones for a particular environment, as described above. A first user may have a first profile for office use (e.g., large surface area with far walls) and a second profile for working on a bus (e.g., close quarters and downward facing viewing area). Thus, user preferences and/or the work environment (e.g., wall location, lighting, proximity of other people, etc.) may be used to establish different working profiles to better optimize the augmented workstation environment. In some embodiments, aspects of AWE 1900 can detect a position/location of the user relative to reference peripheral 1830(1) and may identify zones for human ergonomic envelopes (e.g., head movement) that may have a different response to certain content. For instance, content may snap into ideal zones, or a wireframe outlines may be superimposed on an area/volume to highlight an ergonomically preferred configuration different from a current arrangement of zones. In some cases, zone placement may be user defined. For instance, a series of questions and/or displayed arrangements may be presented to a user to make decisions on how zones will be displayed, what content will be included in each zone, how zones can affect one another (e.g., whether or not content may be moved freely from one zone to the next), how to arrange zones in certain work environments, etc., enabling/disabling interactive controls based on applications (e.g., word processing may disable object manipulation controls, as one might use in a CAD tool). A user may determine how zones are shared between users and what privacy policies to apply. One of ordinary skill in the art with the benefit of this disclosure would appreciate the many variations, modifications, and alternative embodiments.

Reference peripheral 1830(1) and/or peripheral devices 1830(2-*n*) can include one or more controls for interacting with interactive content, including but not limited to depth wheels, touch sensors, buttons/switches, in-air use, etc., which may adaptively change their functions depending on the zone that the user is interacting with. For example, in response to a user moving their gaze from zone 1 to zone 3 (e.g., detected by HMD), a cursor may snap from zone 1 to zone 3 and change one or more control functions (e.g., functions assigned to a button, scroll wheel, etc.) based on the type of content configured thereon (e.g., interactive media, viewing-only media, etc).

In certain embodiments, content may change when moved between zones. For example, content displayed in zone 2 that may be configurable and interactive may become only viewable when moved to zone 3.

"Sticky" Zones and Expanding/Collapsing Zones and in an AWE

FIG. 20 shows how content zones may track with respect to a reference peripheral, according to certain embodiments. As described above, each zone in an AWE may be arranged in any suitable location and may be configured to span across any suitable area or volume within 3D space relative to the reference peripheral. In some cases, as the reference peripheral moves in real 3D space, the zones and corresponding visual content may move accordingly, relative to the reference peripheral. That is, each zone may be fixed to a set spatial relationship relative to the reference peripheral, such that the reference peripheral and the one or more displays rendered in zones 1-3 appear to move as a singular interconnected system. However, some embodiments may employ a "sticky" spatial relationship the generally tracks the movement of the reference peripheral, but not necessarily for every type of movement. That is, instead of tracking directly with the peripheral device, there can be a threshold area/distance that the peripheral device can be moved without certain content moving in proportion. For example, consumption displays configured in zone 3 may remain unmoved when a corresponding reference peripheral is moved below a threshold distance (e.g., 30 cm radius), rather than moved in a fixed arrangement as described above. In another example, a user may want to move a reference peripheral out of the way to create an open space on a surface immediately in front of the user to use as an interactive surface to touch or write on (e.g., via a stylus).

Referring to FIG. 20, window A shows an AWE with an interactive dock in zone 2 and three virtual displays rendered in zone 3. As the reference peripheral is moved within a threshold distance (e.g., within a volumetric area), the displays in zone 3 remain unmoved. This may be useful when a user may resituate their peripheral devices to a better location on a desk, on their lap, where the reference peripheral is moved to accommodate more peripheral devices in a limited space, or the like. Any of zones 1-3 (and shared zones, e.g., zone 4) can be configured to have a "sticky" spatial relationship with the reference peripheral, as would be appreciated by one of ordinary skill in the art with the benefit of this disclosure.

In some embodiments, the state of one or more displays configured on any of zones 1-3 can be stored and collapsed into a more compact arrangement. This may be useful when a user moves the reference peripheral from one location to the next, but does not necessarily want to power down the AWE, or the user may be confined to smaller quarters and cannot expand and number of displays beyond a limited area. For example, referring to FIG. 21, window A shows an AWE with an interactive dock in zone 2 and three virtual displays rendered in zone 3. In response to the reference peripheral being lifted, the displays may collapse into an interactive stack, as shown in window B. Conversely, when the reference peripheral moves back to a suitably sized surface (or other approved location), the displays may expand back to their original saved configuration. Any suitable trigger may be used to cause the expansion and/or collapse of the AWE including lifting the reference peripheral, selecting a "collapse/expand" function within the AWE, or other method. Further, any arrangement of collapsed screens from any zone can be configured and customized to preference. Some embodiments may cause one or more rendered displays to collapse to a larger or smaller area than shown in FIG. 21. The extent to which a number of displays may be collapsed may further depend on the detected physical environment (e.g., location of walls, obstructions, other people/devices, etc.) In some cases, the collapsed displays may still be accessible. For example, when collapsed, displays originally configured in zone 3 may be moved closer to the user for easier access, so the user can flip between displays (e.g., via suitable gesture, such as swiping), interact with content, or the like. One of ordinary skill in the art with the benefit of this disclosure would appreciate the many variations, modifications, and alternative embodiments thereof.

Figure 22:
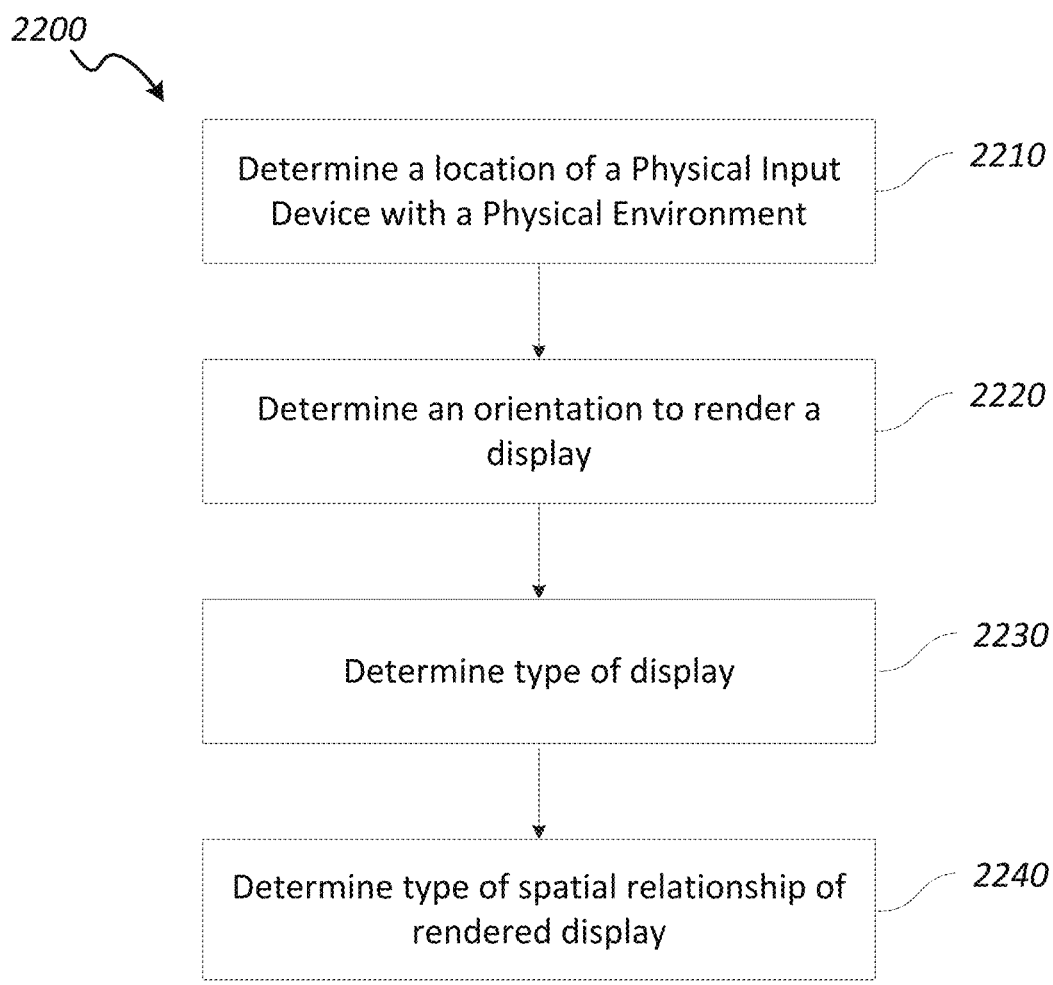
FIG. 22 is a simplified flow chart showing aspects of a method for operating an augmented workstation environment, according to certain embodiments.

FIG. 22 is a simplified flow chart showing aspects of a method 2200 for operating an augmented workstation environment, according to certain embodiments. Method 2200 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 2200 can be performed by aspects of computer 1810, reference peripheral 1830(1), display system 1820, or a combination thereof.

At step 2210, method 2200 can include determining a location of a physical peripheral input device (e.g., reference peripheral) within a physical environment, according to certain embodiments. The location of the reference peripheral can be determined using any resource of sensor system 1840, which may include one or more sensors of reference peripheral 1830(1), display system 1820, computer 1810, or any combination thereof At step 2220, method 2200 can include determining, based on the location of the reference peripheral within the physical environment, an orientation of a display to render to a user of the reference peripheral, wherein content presented to the user via the rendered display can be modifiable by the user via the reference peripheral. The orientation of the display may refer to the direction the rendered display faces relative to the reference peripheral, the distance the display is configured relative to the reference peripheral, or a combination thereof.

At step 2230, method 2200 can include determining a type of the rendered display, according to certain embodiments. For example, the display may be configured for viewing content (e.g., zone 3), interactive content (e.g., zones 1-2), or the like. In some cases, the type of the display may affect the orientation/location of the display.

At step 2240, method 2200 can include determining a type of spatial relationship of the rendered display, according to certain embodiments. For example, the spatial relationship may be fixed (e.g., the distance of the display relative to the reference peripheral does not change when the reference peripheral is moved), or may employ "sticky" displays that move relative to the reference peripheral for movement greater than a threshold value (e.g, 30 cm). Any suitable threshold value can be used (e.g., 1 cm-5 m), as would be appreciated by one of ordinary skill in the art. In some embodiments, the reference peripheral can be a keyboard, hub (as further described below), or other suitable physical peripheral input device.

It should be appreciated that the specific steps illustrated in FIG. 22 provide a particular method 2200 for operating an augmented workstation environment, according to certain embodiments. Other sequences of steps may also be performed according to alternative embodiments. Furthermore, additional steps may be added or removed depending on the particular applications. For example, some embodiments may only include method steps 2210-2220. Any combination of changes can be used and one of ordinary skill in the art with the benefit of this disclosure would understand the many variations, modifications, and alternative embodiments thereof.

Figure 23:
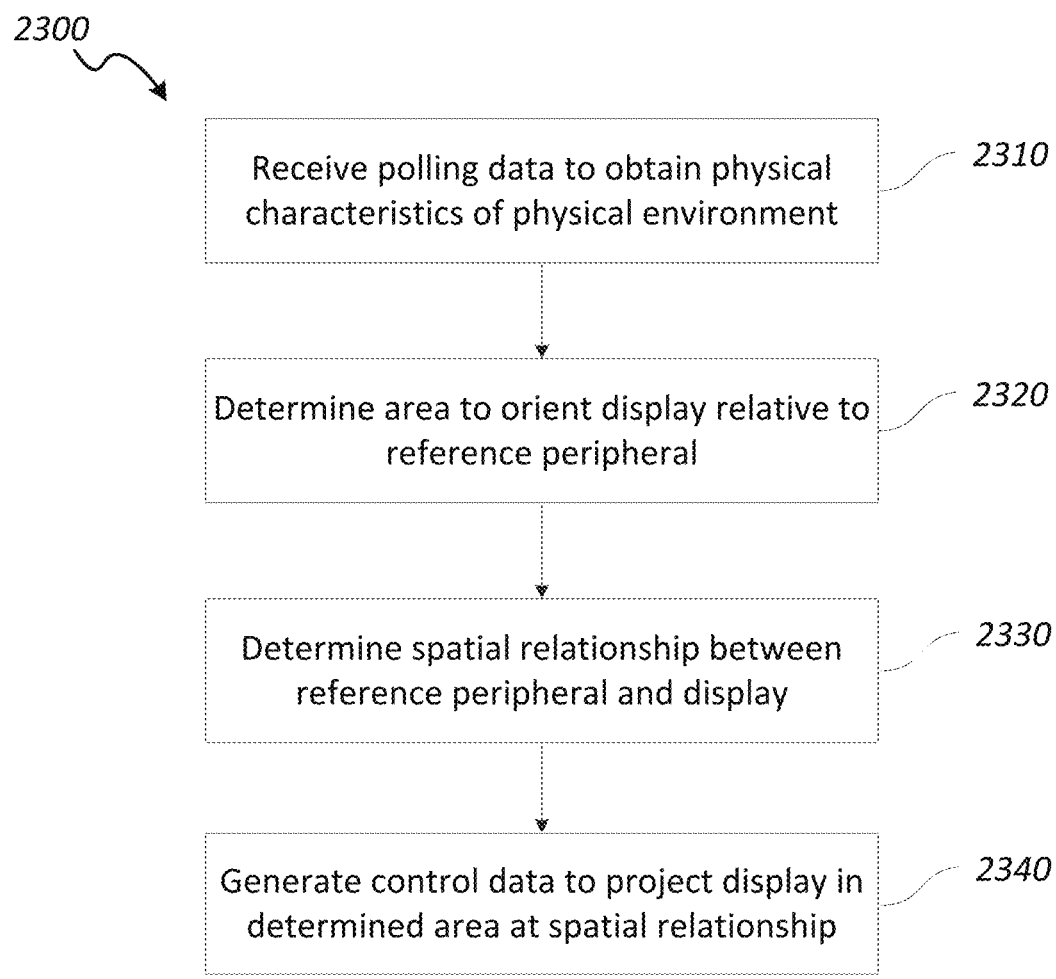
FIG. 23 is a simplified flow chart showing aspects of a method for operating a peripheral device (e.g., reference peripheral) in an augmented workstation environment, according to certain embodiments.

FIG. 23 is a simplified flow chart showing aspects of a method 2300 for operating a peripheral device (e.g., reference peripheral) in an augmented workstation environment, according to certain embodiments. Method 2300 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 2300 can be performed by aspects of computer 1810, reference peripheral 1830(1), display system 1820, or a combination thereof.

At step 2310, method 2300 can include receiving polling data from one or more sensors (e.g., any of sensors from sensor system 1840), according to certain embodiments. The polling data can correspond to physical characteristics of a physical environment around the reference peripheral. For example, the polling data may indicate where walls, obstructions, other peripheral devices, other user and/or objects are located relative to the reference peripheral.

At step 2320, method 2300 can include determining an area to orient a virtual display relative to the reference peripheral within the physical environment based on the physical characteristics. For example, in areas with close walls or limited space, the virtual display may be displayed closer to the user and over a relatively small area, as compared to an expansive area with a large amount of space. In some embodiments, the virtual display can be configured within zone 3.

At step 2330, method 2300 can include determining a spatial relationship between the reference peripheral and the projected virtual display, according to certain embodiments. For example, the spatial relationship may correspond to a fix positional relationship between the reference peripheral and the virtual display.

At step 2340, method 2300 can include generating control data configured to cause an AR/VR-based head-mounted display (HMD) to project the virtual display in the determined area at a maintained spatial relationship between the peripheral device and the projected virtual display as the peripheral device is moved within the physical environment, as further described above with respect to FIGS. 18-22.

In some embodiments, method 2300 can include detecting that the peripheral device is placed on a surface or interfaced by a user, where receiving the polling data from the one or more sensors may occur in response to detecting that the peripheral device is placed on the surface or interfaced by the user. In some cases, method 2300 may include determining that the peripheral device is lifted off of the surface, and generating second control data to cause the HMD to change the spatial relationship between the peripheral device and the projected virtual display such that a volumetric area occupied by the peripheral device and the projected virtual display is reduced. For instance, this may correspond to zone 1 and/or zone 2, as further described above with respect to FIGS. 19-21. Method 2300 can further include determining a second area to orient a virtual interactive display relative to the reference peripheral, where the interactive display is configured to facilitate an augmentation of functional capabilities of the reference peripheral. In some cases, method 2300 further includes determining a spatial relationship between the peripheral device and the projected interactive display, where the control data is further configured to cause the HMD to project the interactive display in the determined second area and at a maintained spatial relationship between the peripheral device and the projected interactive display as the peripheral device is moved in the physical environment.

In some embodiments, the control data may cause the spatial relationship between the peripheral device and the virtual display to be maintained such that a movement of the peripheral device that is within a threshold distance from an initial location of the peripheral device does not cause the virtual display to move. The control data may further cause the spatial relationship between the peripheral device and the virtual display to be maintained such that a movement of the peripheral device that is greater than the threshold distance from the initial location of the peripheral device causes the spatial relationship between the peripheral device and the projected interactive display to be fixed, where the spatial relationship between the peripheral device and the projected interactive display is fixed as the peripheral device is moved in the physical environment.

In further embodiments, method 2300 can include determining a third area on the reference peripheral to orient a virtual overlay (e.g., on zone 1), where the virtual overlay may be configured to further facilitate the augmentation of the functional capabilities of the peripheral device. Method 2300 can further include determining a spatial relationship between the peripheral device and the projected virtual overlay, where the control data is further configured to cause the HMD to project the virtual overlay in the determined third area and at a maintained spatial relationship between the peripheral device and the projected interactive display as the peripheral device is moved in the physical environment.

It should be appreciated that the specific steps illustrated in FIG. 23 provide a particular method 2300 for operating an augmented workstation environment, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

Peripheral-Centric Augmented Workstation Environment Using a Reference Hub

Figure 24:
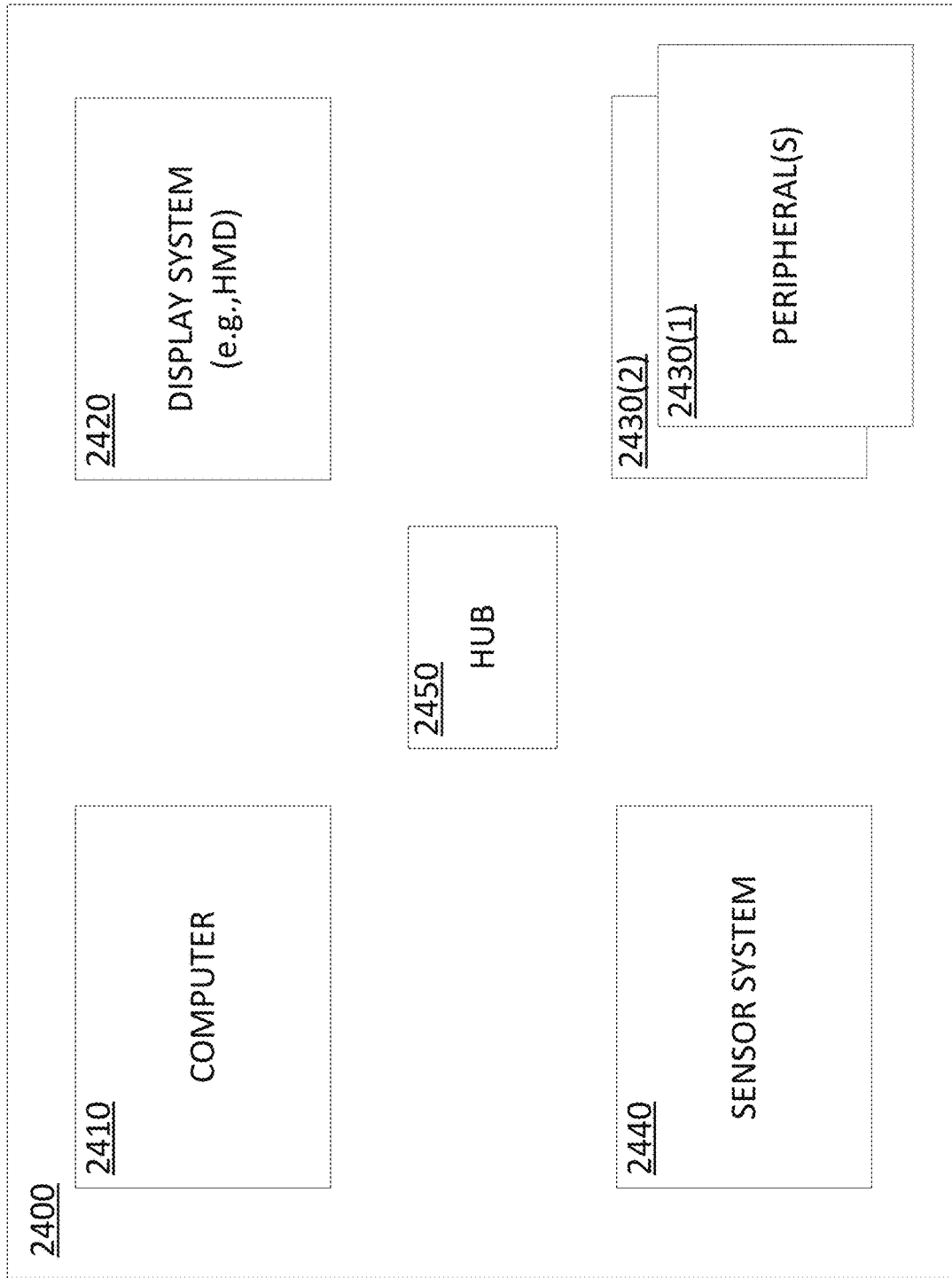
FIG. 24 shows a simplified diagram of a hub-centric augmented workstation environment (AWE), according to certain embodiments

In some embodiments, a reference hub ("hub") 2450 may be configured within an AWE 2400 to interact with peripheral input device(s), 2430(1-n), display system 2420, computer 2410, and sensor system 2440, as shown in system 2400 of FIG. 24. Each of computer 2410, display system 2420, sensor system 2440 and peripherals 2430(1-n) may operate similarly to their matching counterparts as shown and described with respect to FIG. 18. As indicated above, sensor system 2440 may be a combination of sensor systems that utilize sensing capabilities of display system 2420, peripherals 2430(1-n), and hub 2450. Hub 2450 may perform some or all of the following functions including tracking a location of some or all of peripherals 2430(1-n) in a physical environment using an independent tracking system, provide enhanced sensing capabilities for high fidelity sensing/tracking of interactions using peripherals 2430(1-n), operating as a single communication conduit for receiving data communications from some or all of peripherals 2430(1-n) and relaying said data to computer 1420, display system 2420, or both. Conversely, hub 2450 may operate as a single data conduit to relay communications/control signals from computer 2410 and/or display system 2420 to the one or more peripherals 2430(1-n). Further, hub 2450 may be configured to detect an area around one or more peripherals using an array of on-board sensors to establish zones for content placement in an augmented workstation environment, similar to the reference peripheral as described above with respect to FIGS. 18-13. Each of these functions are further described below. It should be understood that but for the inclusion of hub 2450 and its corresponding functionality described herein, computer 2410, display system 2420, sensor system 2440, and peripherals 2430(1-n) may operate similarly as described above with respect to FIG. 18 and alternatively, one of ordinary skill in the art with the benefit of this disclosure would understand the many variations, modifications, and alternative embodiments thereof.

In some embodiments, display system 2420 (e.g., an HMD, holographic imaging system, augmented reality display, etc.) may track its location using a first tracking system, as would be appreciated by one of ordinary skill in the art. Hub 2450 may incorporate a second independent tracking system (e.g., visual tracking, IR, ultrasonic, EM, etc.) to track a location of some or all of peripherals 2430(1-n) in a physical environment relative to hub 2450. In some cases, hub 2450 may operate as a reference point of origin (e.g., a 000 location in a Cartesian-coordinate based system) for tracking peripherals 2430 using the second tracking system. The tracked locations of peripherals 2430(1-n) using the second tracking system of hub 2450 can be combined with (e.g., fused with) the first tracking system of display system 2420/computer 2410. Alternatively or additionally, hub 2450 may track its own location using on-board sensing resources, which can be relayed and combined with the first tracking system. In some cases, hub 2450 may include features (e.g., sensors, LEDs, fiducial mark(s)) for detecting the location of the hub by the first tracking system. There are certain advantages to using two tracking systems. For example, the first tracking system may be limited in terms of accuracy or processing bandwidth such that tracking multiple peripherals may produce poor tracking results and/or may slow down system operations, and the first tracking system may not be accessible or manipulable (e.g., a third party HMD unit) to track peripheral devices in the manner proscribed herein. Other advantages of using a second tracking system are further addressed in the implementations described below.

In some embodiments, hub 2450 may provide enhanced sensing capabilities for high-fidelity sensing and/or tracking of interactions using peripherals 2430(1-n). Some examples of high-fidelity sensing may include fine precision movements of a user's hand or finger along a touch pad or other sensed region, a movement of a stylus on or near a peripheral, or the like. For example, a small volumetric region adjacent to a peripheral device (e.g., see "zone 2" description above) may include a sensed region that can detect a movement and articulation of a hand or stylus in high fidelity. This capability may not be present in standard display system sensing suites (first tracking system), and typically not with high fidelity particular to a designated region in a physical environment. Thus, high precision tracking/sensing can be performed by one or more peripherals 2430 and/or hub 2450 using a second tracking/sensor system (e.g., with hub 2450 as the center reference) that may be relayed to and integrated with the first tracking system of display system 2420.

In certain embodiments, hub 2450 can operate as a single communication conduit for receiving data communications from some or all of peripherals 2430(1-n) and relaying said data to computer 1420, display system 2420, or both, and vice versa as described above. Hub 2450 can interact (e.g., communicate with, transfer data to/from, share sensor/tracking data, etc.) with each of peripheral devices(1-n) using separate communication links (e.g., Bluetooth®, Wi-Fi, IR, ZigBee, Z-Wave, RF, etc.) and coalesce information from peripheral devices 2430 to display system 2420 using a single communication link. Thus, significant processing bandwidth may be saved as display system 2420 can communicate with one entity (hub 2450) instead of independently communicating with multiple peripheral devices 2430. In some implementations, hub 2450 can provide capabilities of each peripheral device to display system 2420 including the type of peripheral (e.g., a keyboard, mouse, stylus), visual representation information (e.g., how the peripheral or augmented capabilities of the peripheral may be rendered), and the like. That is, hub 2450 may provide rendering information for each peripheral device with pre-render data corresponding to an image of the peripheral, which can then be provided to and imported by display system 2420 without further processing.

In some embodiments, hub 2450 may be a standalone unit, or a part of another device including a peripheral (e.g., keyboard, mouse, stylus), a smart device (e.g., phone, watch), a dedicated mini "tower" or the like. Hub 2450 may work across different platforms (e.g., HMD's, Phones, PC's), being agnostic, adapting to various platforms, or mediating and exchanging data between platforms. Hub 2450 may be configured to communicate with a variety of operating systems including, but not limited to, Windows™, Android; IOS; MS-DOS, MacOS, Unix, Linux, etc. In some cases, multiple hubs may be used together to improve tracking precision.

In certain implementation, hub 2450 can operate as a point of reference to detect physical characteristics of a physical environment and determine locations to define operating "zones," similar to a reference peripheral as further discussed above with respect to FIGS. 19-24. In such cases, zones may be highlighted using lighting on hub 2450, or other peripherals, to indicated when a peripheral is placed in a tracking zone or not (e.g., for high precision sensing regions, as described above). In some cases, hub 2450 can output indicia of whether a peripheral is in a designated zone or outline zones for the user (e.g., project a box around zone 1, etc.). Further, Hub 2450 may be configured to detect and locate peripheral input device(s) and, based on the detected peripheral device(s), relay corresponding data between the detected peripheral device(s) 2430(1-n) and display system 2420 and/or computer 2420. Hub 2450 may be operable to determine its location (detected from display system 2420 or on-board sensing resources) and other peripherals or interactions with said peripherals with greater accuracy than provided by display system 2420. In some cases, hub 2450 can include a transceiver configured to communicate with a display system for presenting a virtual reality or augmented reality virtual reality environment to a user, a tracking subsystem configured to sense a location of a physical peripheral input device within a physical environment, and one or more processors coupled to the transceiver and the tracking subsystem, the one or more processors configured to determine, via the tracking subsystem, the location of the physical peripheral input device within the physical environment, and transmit, via the transceiver, to the display system, the location of the physical peripheral input device within the physical environment. In some cases, the tracking subsystem can sense the location of the physical peripheral input device using a technique different from a technique used by the display system to track a location of the user or a head mounted display (HMD) worn by the user. The technique used by the tracking subsystem to track the physical peripheral input device and the technique used by the display system to track the location of the user or the HMD may be each selected from a list comprising: an ultrasonic emitter; an ultrasonic receiver; a visible light optical sensor; a visible light optical emitter; a non-visible light optical sensor; a non-visible light optical emitter; a magnetic field generator; a magnetic field sensor; a radio wave emitter; and a radio wave receiver. In some cases, the hub device can further comprising features for determining the location of the device within the physical environment by a system used to track a location of the user or a head mounted display (MHD) worn by the user. The features may be selected from a list including: a sensor; an emitter; and a marking, for example. The sensor can be configured to detect or the emitter is configured to emit: visible light, infrared light, ultrasound, magnetic fields, or radio waves.

Figure 25:
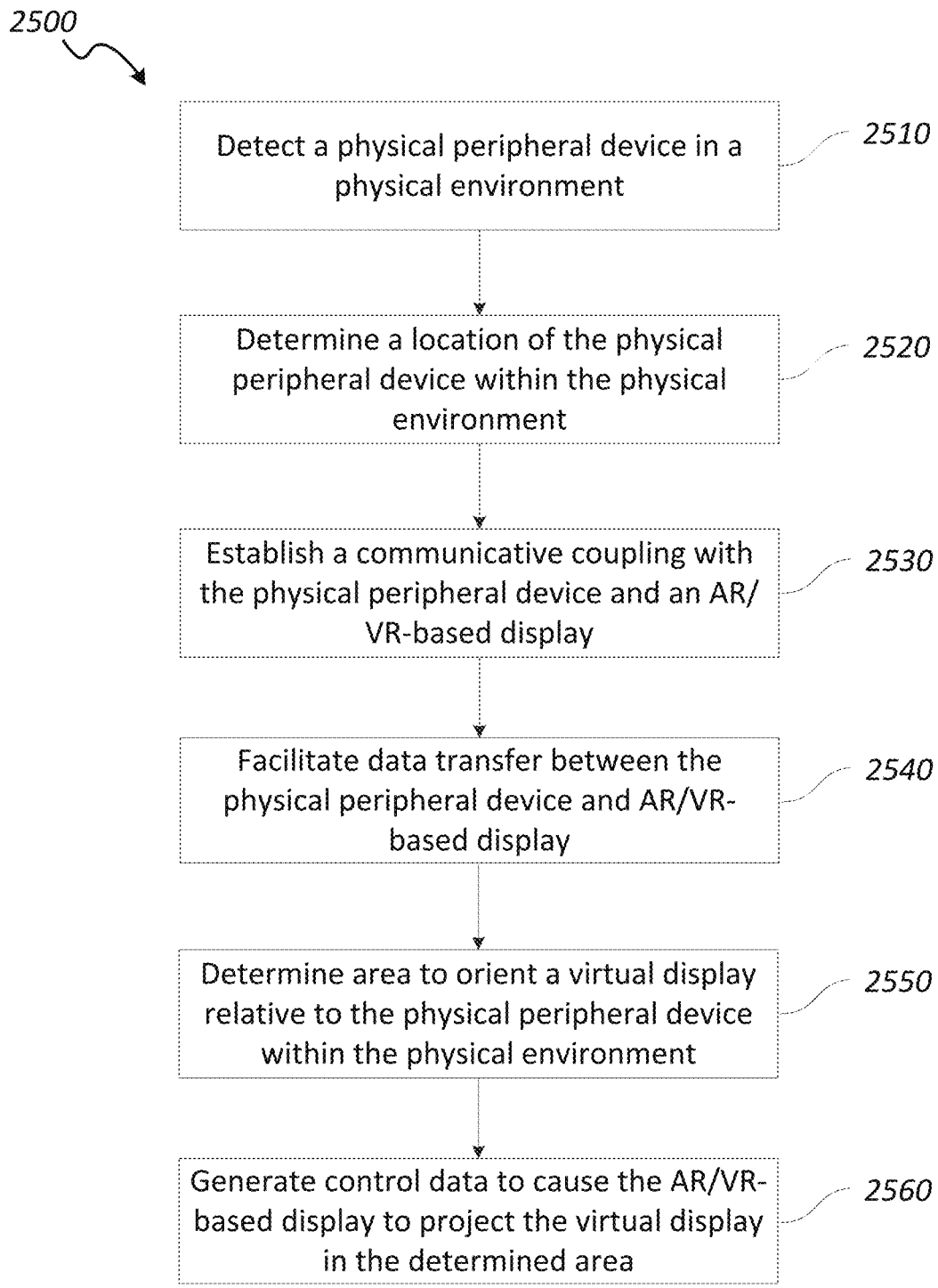
FIG. 25 is a simplified flow chart showing aspects of a method for operating a hub to interact with one or more peripheral devices within an AR/VR workstation environment, according to certain embodiments.

FIG. 25 is a simplified flow chart showing aspects of a method 2500 for operating a hub to interact with one or more peripheral devices within an AR/VR workstation environment, according to certain embodiments. Method 2500 can be performed by processing logic that may comprise hardware (circuitry, dedicated logic, etc.), software operating on appropriate hardware (such as a general purpose computing system or a dedicated machine), firmware (embedded software), or any combination thereof. In certain embodiments, method 2500 can be performed by aspects of hub 2450, computer 2410, display system 1820, or a combination thereof.

At step 2510, method 2500 can include detecting a physical peripheral device within a physical environment. For example, hub 2450 may be configured to detect peripheral devices 2430(1-n). The detecting may include determining a presence of a peripheral device via sensor (e.g., vision-based detection), communication (e.g., Bluetooth®, IR), or other suitable method of determining a presence of a peripheral device, as would be appreciated by one of ordinary skill in the art with the benefit of this disclosure.

At step 2520, method 2500 can include determining a location of the physical peripheral device within the physical environment. This can be performed, e.g., by hub 2450 using the sensor capabilities described above with respect to FIG. 24 and identified as an independent second tracking system to track peripherals and provide location data, peripheral function data, peripheral visual representation data, and the like.

At step 2530, method 2500 can include establishing a communicative coupling with, and receiving data from, the physical peripheral device and an AR/VR-based display. That is, hub 2450 can interact (e.g., communicate with, transfer data to/from, share sensor/tracking data, etc.) with each of peripheral devices(1-n) using separate communication links (e.g., Bluetooth®, Wi-Fi, IR, ZigBee, Z-Wave, RF, etc.) and coalesce information from peripheral devices 2430 to display system 2420 (e.g., HMD, holographic imaging system, AR/VR display system, etc.) using a single communication pathway via hub 2450 to facilitate a transfer of received data between the physical peripheral device and the AR/VR-based display (step 2540).

At step 2550, method 2500 can include determining an area to orient a virtual display relative to the physical peripheral device within the physical environment based on the determined location of the physical peripheral device. In some cases, the determine areas may correspond to the "zones" described above with respect to FIGS. 18-23.

At step 2560, method 2500 can include hub 2450 generating control data configured to cause the AR/VR-based display to project the virtual display in the determined area (e.g., zone 1, 2, 3, 4, etc.). In some cases, the control data may be further configured to cause the AR/VR-based display to maintain a spatial relationship between the physical peripheral device and the projected virtual display as the physical peripheral device is moved within the physical environment.

Method 2500 can further include receiving polling data from one or more sensors, where the polling data corresponds to physical characteristics of a physical environment around the physical peripheral device, and where determining the area to orient the virtual display can be further based on the physical characteristics of the physical environment. In some cases, a movement and location of a head-mounted display (HMD) of the AR/VR-based display and the hub can be tracked using a first tracking system, and the determining a location of the physical peripheral device within the physical environment can be tracked via the hub using a second tracking system, such that method 2500 may further include providing data corresponding to the determined location of the physical peripheral device within the physical environment to the HMD, where the provided data may be configured to cause the integration of tracking via the second tracking system with tracking via the first tracking system.

In some embodiments, method 2500 may further include detecting a second physical peripheral device within the physical environment, determining a location of the second physical peripheral device within the physical environment, establishing a communicative coupling with, and receiving data from the second physical peripheral device, and coalescing the received data from the first and second physical peripheral devices into aggregate peripheral data, where the aggregate peripheral data may be transferred to the AR/VR-based display via the hub instead of the individual received data from each of the first and second physical peripheral devices. In some embodiments, the hub may be a standalone unit or can be integrated with one of a keyboard, smart device, wearable device, or mini-tower device, or the like.

It should be appreciated that the specific steps illustrated in FIG. 25 provide a particular method 2500 for operating a hub to interact with one or more peripheral devices within an AR/VR workstation environment, according to certain embodiments. Other sequences of steps may also be performed according to alternative embodiments. Furthermore, additional steps may be added or removed depending on the particular applications. Any combination of changes can be used and one of ordinary skill in the art with the benefit of this disclosure would understand the many variations, modifications, and alternative embodiments thereof.

It will be appreciated that any of the disclosed methods (or corresponding apparatuses, programs, data carriers, etc.) may be carried out by either a host or client, depending on the specific implementation (i.e. the disclosed methods/apparatuses are a form of communication(s), and as such, may be carried out from either 'point of view', i.e., in corresponding to each other fashion).

As used in this specification, any formulation used of the style "at least one of A, B or C", and the formulation "at least one of A, B and C" use a disjunctive "or" and a disjunctive "and" such that those formulations comprise any and all joint and several permutations of A, B, C, that is, A alone, B alone, C alone, A and B in any order, A and C in any order, B and C in any order and A, B, C in any order. There may be more or less than three features used in such formulations.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

Unless otherwise explicitly stated as incompatible, or the physics or otherwise of the embodiments, example or claims prevent such a combination, the features of the foregoing embodiments and examples, and of the following claims may be integrated together in any suitable arrangement, especially ones where there is a beneficial effect in doing so. This is not limited to only any specified benefit, and instead may arise from an "ex post facto" benefit. This is to say that the combination of features is not limited by the described forms, particularly the form (e.g. numbering) of the example(s), embodiment(s), or dependency of the claim(s). Moreover, this also applies to the phrase "in one embodiment", "according to an embodiment" and the like, which are merely a stylistic form of wording and are not to be construed as limiting the following features to a separate embodiment to all other instances of the same or similar wording. This is to say, a reference to 'an', 'one' or 'some' embodiment(s) may be a reference to any one or more, and/or all embodiments, or combination(s) thereof, disclosed. Also, similarly, the reference to "the" embodiment may not be limited to the immediately preceding embodiment.

Certain figures in this specification are flow charts illustrating methods and systems. It will be understood that each block of these flow charts, and combinations of blocks in these flow charts, may be implemented by computer program instructions. These computer program instructions may be loaded onto a computer or other programmable apparatus to produce a machine, such that the instructions which execute on the computer or other programmable apparatus create structures for implementing the functions specified in the flow chart block or blocks. These computer program instructions may also be stored in a computer-readable memory that can direct a computer or other programmable apparatus to function in a particular manner, such that the instructions stored in the computer-readable memory produce an article of manufacture including instruction structures which implement the function specified in the flow chart block or blocks. The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the flow chart block or blocks. Accordingly, blocks of the flow charts support combinations of structures for performing the specified functions and combinations of steps for performing the specified functions. It will also be understood that each block of the flow charts, and combinations of blocks in the flow charts, can be implemented by special purpose hardware-based computer systems which perform the specified functions or steps, or combinations of special purpose hardware and computer instructions.

For example, any number of computer programming languages, such as C, C++, C# (CSharp), Perl, Ada, Python, Pascal, SmallTalk, FORTRAN, assembly language, and the like, may be used to implement machine instructions. Further, various programming approaches such as procedural, object-oriented or artificial intelligence techniques may be employed, depending on the requirements of each particular implementation. Compiler programs and/or virtual machine programs executed by computer systems generally translate higher level programming languages to generate sets of machine instructions that may be executed by one or more processors to perform a programmed function or set of function The foregoing description of one or more implementations provides illustration and description, but is not intended to be exhaustive or to limit the scope of the invention to the precise form disclosed. Modifications and variations are possible in light of the above teachings or may be acquired from practice of various implementations of the present disclosure.

What is claimed is:

1. A method of operating a hub to interact with one or more peripheral devices within an AR/VR workstation environment, the method comprising:
   detecting a first physical peripheral device within a physical environment;
   determining a location of the first physical peripheral device within the physical environment;

establishing a communicative coupling with, and receiving data from, the first physical peripheral device and an AR/VR-based display;

facilitating a transfer of received data between the first physical peripheral device and the AR/VR-based display;

determining an area to orient a virtual display relative to the first physical peripheral device within the physical environment based on the determined location of the first physical peripheral device;

generating control data configured to cause the AR/VR-based display to project the virtual display in the determined area,
  wherein a movement and location of the AR/VR-based display and the hub is tracked using a first tracking system, and
  wherein the determining a location of the first physical peripheral device within the physical environment is tracked via the hub using a second tracking system; and providing data corresponding to the determined location of the first physical peripheral device within the physical environment to the AR/VR-based display, the provided data configured to cause an integration of tracking via the second tracking system with tracking via the first tracking system.

2. The method of claim 1 wherein the control data is further configured to cause the AR/VR-based display to maintain a spatial relationship between the first physical peripheral device and the projected virtual display as the first physical peripheral device is moved within the physical environment.

3. The method of claim 1 further comprising:
receiving polling data from one or more sensors, the polling data corresponding to physical characteristics of a physical environment around the first physical peripheral device,
  wherein determining the area to orient the virtual display is further based on the physical characteristics of the physical environment.

4. The method of claim 1 further comprising:
detecting a second physical peripheral device within the physical environment;
determining a location of the second physical peripheral device within the physical environment;
establishing a communicative coupling with, and receiving data from the second physical peripheral device; and
coalescing the received data from the first and second physical peripheral devices into aggregate peripheral data,
  wherein the aggregate peripheral data is transferred to the AR/VR-based display via the hub instead of the received data from each of the first and second physical peripheral devices.

5. The method of claim 1, wherein the AR/VR-based display is a head-mounted display (HMD).

6. A system comprising:
one or more processors;
one or more non-transitory computer-readable storage mediums containing instructions configured to cause the one or more processors to perform operations including:
detecting a first physical peripheral device within a physical environment;
determining a location of the first physical peripheral device within the physical environment;
establishing a communicative coupling with, and receiving data from, the first physical peripheral device and an AR/VR-based display;

facilitating a transfer of received data between the first physical peripheral device and the AR/VR-based display;

determining an area to orient a virtual display relative to the first physical peripheral device within the physical environment based on the determined location of the first physical peripheral device;

generating control data configured to cause the AR/VR-based display to project the virtual display in the determined area,
  wherein a movement and location of the AR/VR-based display and the system is tracked using a first tracking system,
  wherein the determining a location of the first physical peripheral device within the physical environment is tracked via the system using a second tracking system; and providing data corresponding to the determined location of the first physical peripheral device within the physical environment to the AR/VR-based display, the provided data configured to cause an integration of tracking via the second tracking system with tracking via the first tracking system.

7. The system of claim 6 wherein the control data is further configured to cause the AR/VR-based display to maintain a spatial relationship between the first physical peripheral device and the projected virtual display as the first physical peripheral device is moved within the physical environment.

8. The system of claim 6 wherein the one or more non-transitory computer-readable storage mediums further contain instructions configured to cause the one or more processors to perform operations including:
receiving polling data from one or more sensors, the polling data corresponding to physical characteristics of a physical environment around the first physical peripheral device,
  wherein determining the area to orient the virtual display is further based on the physical characteristics of the physical environment.

9. The system of claim 6 wherein the one or more non-transitory computer-readable storage mediums further contain instructions configured to cause the one or more processors to perform operations including:
detecting a second physical peripheral device within the physical environment;
determining a location of the second physical peripheral device within the physical environment;
establishing a communicative coupling with, and receiving data from the second physical peripheral device; and
coalescing the received data from the first and second physical peripheral devices into aggregate peripheral data,
  wherein the aggregate peripheral data is transferred to the AR/VR-based display via the system instead of the received data from each of the first and second physical peripheral devices.

10. The system of claim 9, wherein the first and second physical peripheral devices include at least one of a keyboard, computer mouse, stylus, AR/VR controller, remote, or presenter device.

* * * * *